(12) United States Patent
Horelik et al.

(10) Patent No.: US 11,818,639 B2
(45) Date of Patent: Nov. 14, 2023

(54) EMERGENCY LOCATION ANALYSIS SYSTEM

(71) Applicant: RapidSOS, Inc., New York, NY (US)

(72) Inventors: Nicholas Edward Horelik, Long Island City, NY (US); Henry Katz, Brookline, MA (US); Gabriel Charles Mahoney, Brooklyn, NY (US); John Thomas Hinton, West New York, NJ (US); Michael John Martin, Long Island City, NY (US)

(73) Assignee: RapidSOS, Inc., New York, NY (US)

( * ) Notice: Subject to any disclaimer, the term of this patent is extended or adjusted under 35 U.S.C. 154(b) by 0 days.

(21) Appl. No.: 17/065,337

(22) Filed: Oct. 7, 2020

(65) Prior Publication Data
US 2021/0204108 A1    Jul. 1, 2021

Related U.S. Application Data

(63) Continuation of application No. 16/271,634, filed on Feb. 8, 2019, now Pat. No. 10,820,181.
(Continued)

(51) Int. Cl.
*H04M 11/04* (2006.01)
*H04W 4/90* (2018.01)
(Continued)

(52) U.S. Cl.
CPC ............. *H04W 4/90* (2018.02); *H04W 4/025* (2013.01); *H04W 4/029* (2018.02); *H04W 4/14* (2013.01); *H04W 64/006* (2013.01); *H04W 76/50* (2018.02)

(58) Field of Classification Search
CPC ....... H04W 4/90; H04W 4/029; H04W 4/025; H04W 4/14; H04W 76/50; H04W 64/006
See application file for complete search history.

(56) References Cited

U.S. PATENT DOCUMENTS 5,379,337 A    1/1995  Castillo et al.
5,479,482 A   12/1995  Grimes
(Continued)

FOREIGN PATENT DOCUMENTS

CA    2662606 A1   10/2009
CA    2697986 A1    9/2010
(Continued)

OTHER PUBLICATIONS

Abel et al. Semantics+Filtering+Search=Twitcident exploring information in social web streams. HT'12—Proceedings of 23rd ACM Conference on Hypertext and Social Media (10 pgs) (Jun. 25-28, 2012).
(Continued)

*Primary Examiner* — Erika A Washington
(74) *Attorney, Agent, or Firm* — FITCH, EVEN, TABIN & FLANNERY LLP

(57) ABSTRACT

Described herein are systems, servers, devices, methods, and media for validating, improving, and predicting emergency locations. In some embodiments, disclosed herein is a method for validating a reported location associated with an emergency request comprises: detecting an emergency request from a first device; identifying a reported location associated with the emergency request; identifying one or more attributes associated with the emergency request; determining a location accuracy metric for the emergency request using the one or more attributes; comparing the location accuracy metric to a first accuracy threshold, wherein the reported location is converted to a validated location when the location accuracy metric meets the first accuracy threshold; and, in response to the location accuracy metric meeting the first accuracy threshold, providing the validated location to one or more recipients comprising a public safety answering point (PSAP).

12 Claims, 22 Drawing Sheets

Related U.S. Application Data

(60) Provisional application No. 62/628,880, filed on Feb. 9, 2018.

(51) Int. Cl.
| | |
|---|---|
| H04W 4/029 | (2018.01) |
| H04W 4/14 | (2009.01) |
| H04W 4/02 | (2018.01) |
| H04W 76/50 | (2018.01) |
| H04W 64/00 | (2009.01) |

(56) References Cited

U.S. PATENT DOCUMENTS

| | | | |
|---|---|---|---|
| 5,563,931 | A | 10/1996 | Bishop et al. |
| 5,596,625 | A | 1/1997 | LeBlanc |
| 5,710,803 | A | 1/1998 | Kowal et al. |
| 5,742,666 | A | 4/1998 | Alpert |
| 6,014,555 | A | 1/2000 | Tendler |
| 6,133,853 | A | 10/2000 | Obradovich et al. |
| 6,167,255 | A | 12/2000 | Kennedy et al. |
| 6,249,674 | B1 | 6/2001 | Verdonk |
| 6,252,943 | B1 | 6/2001 | Johnson et al. |
| 6,256,489 | B1 | 7/2001 | Lichter et al. |
| 6,262,655 | B1 | 7/2001 | Yoshioka et al. |
| 6,363,138 | B1 | 3/2002 | Aprile |
| 6,459,782 | B1 | 10/2002 | Bedrosian et al. |
| 6,477,362 | B1 | 11/2002 | Raith et al. |
| 6,502,030 | B2 | 12/2002 | Hilleary |
| 6,510,315 | B1 | 1/2003 | Arnson |
| 6,556,816 | B1 | 4/2003 | Gafrick et al. |
| 6,571,092 | B2 | 5/2003 | Faccin et al. |
| 6,574,323 | B1 | 6/2003 | Manuel et al. |
| 6,587,545 | B1 | 7/2003 | Antonucci et al. |
| 6,594,666 | B1 | 7/2003 | Biswas et al. |
| 6,600,812 | B1 | 7/2003 | Gentillin et al. |
| 6,628,933 | B1 | 9/2003 | Humes |
| 6,680,998 | B1 | 1/2004 | Bell et al. |
| 6,707,421 | B1 | 3/2004 | Drury et al. |
| 6,731,610 | B2 | 5/2004 | Sajikawa et al. |
| 6,993,118 | B2 | 1/2006 | Antonucci et al. |
| 7,054,611 | B2 | 5/2006 | Eisner et al. |
| 7,058,385 | B2 | 6/2006 | Lauper |
| 7,084,775 | B1 | 8/2006 | Smith |
| 7,177,400 | B2 | 2/2007 | Eisner et al. |
| 7,224,773 | B2 | 5/2007 | Croak et al. |
| 7,271,704 | B2 | 9/2007 | McSheffrey et al. |
| 7,313,402 | B1 | 12/2007 | Rahman |
| 7,324,801 | B2 | 1/2008 | Droste et al. |
| 7,349,706 | B2 | 3/2008 | Kim et al. |
| 7,409,044 | B2 | 8/2008 | Leduc |
| 7,409,428 | B1 | 8/2008 | Brabec et al. |
| 7,436,938 | B2 | 10/2008 | Savaglio et al. |
| 7,437,143 | B1 | 10/2008 | Williams |
| 7,469,138 | B2 | 12/2008 | Dayar et al. |
| 7,483,519 | B2 | 1/2009 | Binning |
| 7,519,351 | B2 | 4/2009 | Malone, III et al. |
| 7,519,372 | B2 | 4/2009 | MacDonald et al. |
| 7,548,158 | B2 | 6/2009 | Titus et al. |
| 7,565,131 | B2 | 7/2009 | Rollender |
| 7,646,854 | B2 | 1/2010 | Anderson |
| 7,676,215 | B2 | 3/2010 | Chin et al. |
| 7,684,782 | B2 | 3/2010 | Ashley, Jr. et al. |
| 7,848,733 | B2 | 12/2010 | Bull et al. |
| 7,937,067 | B2 | 5/2011 | Maier et al. |
| 7,949,326 | B2 | 5/2011 | Gallagher et al. |
| 8,009,810 | B2 | 8/2011 | Seidberg et al. |
| 8,041,335 | B2 | 10/2011 | Khetawat et al. |
| 8,041,341 | B1 | 10/2011 | Malackowski et al. |
| 8,045,954 | B2 | 10/2011 | Barbeau et al. |
| 8,068,881 | B2 | 11/2011 | Schrager |
| 8,102,972 | B2 | 1/2012 | Poremba |
| 8,126,424 | B2 | 2/2012 | Piett et al. |
| 8,150,367 | B1 | 4/2012 | Malladi et al. |
| 8,165,560 | B2 | 4/2012 | Stenquist |
| 8,165,562 | B2 | 4/2012 | Piett et al. |
| 8,185,087 | B2 | 5/2012 | Mitchell, Jr. et al. |
| 8,195,121 | B2 | 6/2012 | Dunn et al. |
| 8,219,135 | B2 | 7/2012 | De Amorim et al. |
| 8,244,205 | B2 | 8/2012 | Wu |
| 8,249,546 | B1 | 8/2012 | Shah et al. |
| 8,249,547 | B1 | 8/2012 | Fellner |
| 8,289,953 | B2 | 10/2012 | Ray et al. |
| 8,306,501 | B2 | 11/2012 | Moodbidri et al. |
| 8,326,260 | B1 | 12/2012 | Bradish et al. |
| 8,369,488 | B2 | 2/2013 | Sennett et al. |
| 8,401,565 | B2 | 3/2013 | Sandberg et al. |
| 8,417,090 | B2 | 4/2013 | Fleming |
| 8,417,212 | B2 | 4/2013 | Cepuran et al. |
| 8,442,481 | B2 | 5/2013 | Maier et al. |
| 8,442,482 | B2 | 5/2013 | Maier et al. |
| 8,472,973 | B2 | 6/2013 | Lin et al. |
| 8,484,352 | B2 | 7/2013 | Piett et al. |
| 8,489,062 | B2 | 7/2013 | Ray et al. |
| 8,494,868 | B2 | 7/2013 | Saalsaa |
| 8,509,729 | B2 | 8/2013 | Shaw |
| 8,516,122 | B2 | 8/2013 | Piett et al. |
| 8,538,370 | B2 | 9/2013 | Ray et al. |
| 8,538,468 | B2 | 9/2013 | Daly |
| 8,588,733 | B2 | 11/2013 | Ferguson et al. |
| 8,594,015 | B2 | 11/2013 | Dunn et al. |
| 8,606,218 | B2 | 12/2013 | Ray et al. |
| 8,625,578 | B2 | 1/2014 | Roy et al. |
| 8,626,112 | B2 | 1/2014 | Ray et al. |
| 8,630,609 | B2 | 1/2014 | Ray et al. |
| 8,644,301 | B2 | 2/2014 | Tamhankar et al. |
| 8,649,806 | B2 | 2/2014 | Cuff et al. |
| 8,682,279 | B2 | 3/2014 | Rudolf et al. |
| 8,682,281 | B2 | 3/2014 | Dunn et al. |
| 8,682,286 | B2 | 3/2014 | Dickinson et al. |
| 8,712,366 | B2 | 4/2014 | Greene et al. |
| 8,747,336 | B2 | 6/2014 | Tran |
| 8,751,265 | B2 | 6/2014 | Piett et al. |
| 8,755,767 | B2 | 6/2014 | Maier et al. |
| 8,760,290 | B2 | 6/2014 | Piett et al. |
| 8,761,721 | B2 | 6/2014 | Li |
| 8,792,867 | B1 | 7/2014 | Negahban et al. |
| 8,811,935 | B2 | 8/2014 | Faccin et al. |
| 8,825,687 | B2 | 9/2014 | Marceau et al. |
| 8,848,877 | B2 | 9/2014 | Seidberg et al. |
| 8,866,606 | B1 | 10/2014 | Will et al. |
| 8,868,028 | B1 | 10/2014 | Kaltsukis |
| 8,880,021 | B2 | 11/2014 | Hawkins |
| 8,890,685 | B1 | 11/2014 | Sookman et al. |
| 8,918,075 | B2 | 12/2014 | Maier et al. |
| 8,948,732 | B1 | 2/2015 | Negahban et al. |
| 8,971,839 | B2 | 3/2015 | Hong |
| 8,983,424 | B2 | 3/2015 | Binning |
| 8,984,143 | B2 | 3/2015 | Serra et al. |
| 9,008,078 | B2 | 4/2015 | Kamdar et al. |
| 9,014,657 | B2 | 4/2015 | Rohde et al. |
| 9,019,870 | B2 | 4/2015 | Khan et al. |
| 9,071,643 | B2 | 6/2015 | Saito et al. |
| 9,077,676 | B2 | 7/2015 | Price et al. |
| 9,078,092 | B2 | 7/2015 | Piett et al. |
| 9,094,816 | B2 | 7/2015 | Maier et al. |
| 9,129,219 | B1 | 9/2015 | Robertson et al. |
| 9,167,379 | B1 | 10/2015 | Hamilton et al. |
| 9,244,922 | B2 | 1/2016 | Marceau et al. |
| 9,258,680 | B2 | 2/2016 | Drucker |
| 9,277,389 | B2 | 3/2016 | Saito et al. |
| 9,351,142 | B2 | 5/2016 | Basore et al. |
| 9,369,847 | B2 | 6/2016 | Borghei |
| 9,384,491 | B1 | 7/2016 | Briggs et al. |
| 9,402,159 | B1 | 7/2016 | Self et al. |
| 9,408,051 | B2 | 8/2016 | Finney et al. |
| 9,420,099 | B1 | 8/2016 | Krishnan et al. |
| 9,426,638 | B1 | 8/2016 | Johnson |
| 9,497,585 | B1 | 11/2016 | Cooley et al. |
| 9,503,876 | B2 | 11/2016 | Saito et al. |
| 9,544,260 | B2 | 1/2017 | Cuff et al. |
| 9,544,750 | B1 | 1/2017 | Self et al. |
| 9,591,467 | B2 | 3/2017 | Piett et al. |
| 9,609,128 | B2 | 3/2017 | Dahan et al. |

(56) References Cited

U.S. PATENT DOCUMENTS

| | | |
|---|---|---|
| 9,629,185 B1 | 4/2017 | Gluckman et al. |
| 9,635,534 B2 | 4/2017 | Maier et al. |
| 9,659,484 B1 | 5/2017 | Mehta et al. |
| 9,693,213 B2 | 6/2017 | Self et al. |
| 9,734,721 B2 | 8/2017 | Stenneth et al. |
| 9,736,670 B2 | 8/2017 | Mehta et al. |
| 9,756,169 B2 | 9/2017 | Mehta et al. |
| 9,805,430 B2 | 10/2017 | Miasnik et al. |
| 9,838,858 B2 | 12/2017 | Anand et al. |
| 9,924,043 B2 | 3/2018 | Mehta et al. |
| 9,942,739 B2 | 4/2018 | Bozik et al. |
| 9,986,404 B2 | 5/2018 | Mehta et al. |
| 9,992,655 B2 | 6/2018 | Anand et al. |
| 9,998,507 B2 | 6/2018 | Mehta et al. |
| 10,002,375 B1 | 6/2018 | Scythes et al. |
| 10,089,854 B2 | 10/2018 | Hender et al. |
| 10,136,294 B2 | 11/2018 | Mehta et al. |
| 10,140,482 B2 | 11/2018 | Mehta et al. |
| 10,140,842 B2 | 11/2018 | Mehta et al. |
| 10,142,213 B1 | 11/2018 | Hart et al. |
| 10,165,431 B2 | 12/2018 | Bozik et al. |
| 10,375,558 B2 | 8/2019 | Katz et al. |
| 10,419,915 B2 | 9/2019 | Mehta et al. |
| 10,425,799 B2 | 9/2019 | Anand et al. |
| 10,447,865 B2 | 10/2019 | Mehta et al. |
| 10,657,799 B2 | 5/2020 | Mehta et al. |
| 10,701,541 B2 | 6/2020 | Mehta et al. |
| 10,701,542 B2 | 6/2020 | Martin et al. |
| 10,771,951 B2 | 9/2020 | Mehta et al. |
| 10,805,786 B2 | 10/2020 | Pellegrini et al. |
| 10,820,181 B2 * | 10/2020 | Horelik ............... H04W 4/029 |
| 10,861,320 B2 | 12/2020 | Martin et al. |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang et al. |
| 2002/0120698 A1 | 8/2002 | Tamargo |
| 2003/0069035 A1 | 4/2003 | Shurvinton |
| 2003/0109245 A1 | 6/2003 | McCalmont et al. |
| 2004/0203572 A1 | 10/2004 | Aerrabotu et al. |
| 2004/0229620 A1 | 11/2004 | Zhao et al. |
| 2004/0266390 A1 | 12/2004 | Faucher et al. |
| 2005/0085215 A1 | 4/2005 | Kokko et al. |
| 2005/0104745 A1 | 5/2005 | Bachelder et al. |
| 2005/0111630 A1 | 5/2005 | Potorny et al. |
| 2005/0151642 A1 | 7/2005 | Tupler et al. |
| 2005/0190892 A1 | 9/2005 | Dawson et al. |
| 2005/0222829 A1 | 10/2005 | Dumas |
| 2005/0282518 A1 | 12/2005 | D'Evelyn et al. |
| 2006/0109960 A1 | 5/2006 | D'Evelyn et al. |
| 2006/0293024 A1 | 12/2006 | Benco et al. |
| 2007/0003024 A1 | 1/2007 | Olivier et al. |
| 2007/0030144 A1 | 2/2007 | Titus et al. |
| 2007/0030146 A1 | 2/2007 | Shepherd |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060097 A1 | 3/2007 | Edge et al. |
| 2007/0161383 A1 | 7/2007 | Caci |
| 2007/0164872 A1 | 7/2007 | Monroe |
| 2007/0171854 A1 | 7/2007 | Chen et al. |
| 2007/0218895 A1 | 9/2007 | Saito et al. |
| 2008/0019268 A1 | 1/2008 | Rollins |
| 2008/0063153 A1 | 3/2008 | Krivorot et al. |
| 2008/0077474 A1 | 3/2008 | Dumas et al. |
| 2008/0081646 A1 | 4/2008 | Morin et al. |
| 2008/0166990 A1 | 7/2008 | Toiv |
| 2008/0194238 A1 | 8/2008 | Kwon |
| 2008/0253535 A1 | 10/2008 | Sherry et al. |
| 2008/0294058 A1 | 11/2008 | Shklarski |
| 2009/0041206 A1 | 2/2009 | Hobby et al. |
| 2009/0134982 A1 | 5/2009 | Robertson et al. |
| 2009/0186596 A1 | 7/2009 | Kaltsukis |
| 2009/0214000 A1 | 8/2009 | Patel et al. |
| 2009/0257345 A1 | 10/2009 | King |
| 2009/0311987 A1 | 12/2009 | Edge et al. |
| 2009/0322513 A1 | 12/2009 | Hwang et al. |
| 2010/0002846 A1 | 1/2010 | Ray et al. |
| 2010/0003964 A1 | 1/2010 | Khare et al. |
| 2010/0093305 A1 | 4/2010 | Reich et al. |
| 2010/0156626 A1 | 6/2010 | Story |
| 2010/0159871 A1 | 6/2010 | Tester |
| 2010/0159976 A1 | 6/2010 | Marocchi et al. |
| 2010/0166153 A1 | 7/2010 | Guleria et al. |
| 2010/0190468 A1 | 7/2010 | Scott et al. |
| 2010/0202368 A1 | 8/2010 | Hans |
| 2010/0238018 A1 | 9/2010 | Kelly |
| 2010/0262668 A1 | 10/2010 | Piett et al. |
| 2011/0009086 A1 | 1/2011 | Poremba et al. |
| 2011/0029600 A1 | 2/2011 | Theimer |
| 2011/0051658 A1 * | 3/2011 | Jin ..................... H04W 4/02 370/328 |
| 2011/0071880 A1 | 3/2011 | Spector |
| 2011/0086607 A1 | 4/2011 | Wang et al. |
| 2011/0103266 A1 | 5/2011 | Andreasen et al. |
| 2011/0134897 A1 | 6/2011 | Montemurro et al. |
| 2011/0153368 A1 | 6/2011 | Pierre et al. |
| 2011/0201357 A1 | 8/2011 | Garrett et al. |
| 2011/0263219 A1 | 10/2011 | Hasenfang et al. |
| 2011/0263319 A1 | 10/2011 | Hamalainen et al. |
| 2012/0002792 A1 | 1/2012 | Chang |
| 2012/0028599 A1 | 2/2012 | Hatton et al. |
| 2012/0029970 A1 | 2/2012 | Stiles et al. |
| 2012/0040636 A1 | 2/2012 | Kazmi |
| 2012/0092161 A1 | 4/2012 | West |
| 2012/0144019 A1 | 6/2012 | Zhu et al. |
| 2012/0157795 A1 | 6/2012 | Chiu et al. |
| 2012/0196557 A1 | 8/2012 | Reich et al. |
| 2012/0196558 A1 | 8/2012 | Reich et al. |
| 2012/0202428 A1 | 8/2012 | Mirbaha et al. |
| 2012/0210325 A1 | 8/2012 | De Lind Van Wijngaarden et al. |
| 2012/0218102 A1 | 8/2012 | Bivens et al. |
| 2012/0256745 A1 | 10/2012 | Piett et al. |
| 2012/0257729 A1 | 10/2012 | Piett et al. |
| 2012/0258680 A1 | 10/2012 | Piett et al. |
| 2012/0289243 A1 | 11/2012 | Tarlow et al. |
| 2012/0295575 A1 | 11/2012 | Nam |
| 2012/0309341 A1 | 12/2012 | Ward |
| 2013/0005295 A1 | 1/2013 | Park et al. |
| 2013/0030825 A1 | 1/2013 | Bagwandeen et al. |
| 2013/0036175 A1 | 2/2013 | Lau |
| 2013/0065569 A1 | 3/2013 | Leipzig et al. |
| 2013/0084824 A1 | 4/2013 | Hursey |
| 2013/0102351 A1 | 4/2013 | Mo |
| 2013/0122932 A1 | 5/2013 | Patel et al. |
| 2013/0138791 A1 | 5/2013 | Thomas et al. |
| 2013/0183924 A1 | 7/2013 | Saigh et al. |
| 2013/0185368 A1 | 7/2013 | Nordstrom et al. |
| 2013/0203373 A1 | 8/2013 | Edge |
| 2013/0203376 A1 | 8/2013 | Maier et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0309994 A1 | 11/2013 | Hellwig et al. |
| 2013/0331055 A1 | 12/2013 | McKown et al. |
| 2013/0331058 A1 | 12/2013 | Harvey |
| 2014/0031000 A1 | 1/2014 | Hanover |
| 2014/0051379 A1 | 2/2014 | Ganesh et al. |
| 2014/0086108 A1 | 3/2014 | Dunn et al. |
| 2014/0087680 A1 | 3/2014 | Luukkala et al. |
| 2014/0095425 A1 | 4/2014 | Sipple |
| 2014/0096195 A1 | 4/2014 | Morgan |
| 2014/0113606 A1 | 4/2014 | Morken et al. |
| 2014/0126356 A1 | 5/2014 | Lee et al. |
| 2014/0134969 A1 | 5/2014 | Jin et al. |
| 2014/0148120 A1 | 5/2014 | Buck |
| 2014/0155017 A1 | 6/2014 | Fan et al. |
| 2014/0155018 A1 | 6/2014 | Fan et al. |
| 2014/0164505 A1 | 6/2014 | Daly et al. |
| 2014/0199959 A1 | 7/2014 | Hassan et al. |
| 2014/0213212 A1 | 7/2014 | Clawson |
| 2014/0248848 A1 | 9/2014 | Mufti et al. |
| 2014/0257846 A1 | 9/2014 | Hermiz et al. |

(56) References Cited

U.S. PATENT DOCUMENTS

| | | |
|---|---|---|
| 2014/0302810 A1 | 10/2014 | Inha et al. |
| 2014/0324351 A1 | 10/2014 | Dannevik et al. |
| 2014/0359008 A1 | 12/2014 | Finney et al. |
| 2014/0368601 A1 | 12/2014 | Decharms |
| 2015/0011176 A1 | 1/2015 | Zhu |
| 2015/0029836 A1 | 1/2015 | Hans et al. |
| 2015/0055453 A1 | 2/2015 | Chaki et al. |
| 2015/0055554 A1 | 2/2015 | Sedlacek et al. |
| 2015/0081209 A1 | 3/2015 | Yeh et al. |
| 2015/0085997 A1 | 3/2015 | Biage et al. |
| 2015/0094095 A1 | 4/2015 | Johnson et al. |
| 2015/0099481 A1 | 4/2015 | Maitre et al. |
| 2015/0109125 A1 | 4/2015 | Kaib et al. |
| 2015/0111524 A1 | 4/2015 | South et al. |
| 2015/0137972 A1 | 5/2015 | Nepo et al. |
| 2015/0172897 A1 | 6/2015 | Mariathasan et al. |
| 2015/0181401 A1 | 6/2015 | Dhandu et al. |
| 2015/0289121 A1 | 10/2015 | Lesage et al. |
| 2015/0304827 A1 | 10/2015 | Price et al. |
| 2015/0317392 A1 | 11/2015 | Fernandez |
| 2015/0317809 A1 | 11/2015 | Chellappan et al. |
| 2015/0319284 A1 | 11/2015 | Leonessi |
| 2015/0350262 A1 | 12/2015 | Rainisto et al. |
| 2015/0350836 A1* | 12/2015 | Smith .................. G01C 21/165 455/456.1 |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0034961 A1 | 2/2016 | May et al. |
| 2016/0057595 A1 | 2/2016 | Ahmed et al. |
| 2016/0065748 A1 | 3/2016 | Li et al. |
| 2016/0088455 A1 | 3/2016 | Bozik et al. |
| 2016/0142894 A1 | 5/2016 | Papakonstantinou et al. |
| 2016/0210581 A1 | 7/2016 | Braun |
| 2016/0219084 A1 | 7/2016 | Abiezzi |
| 2016/0219397 A1 | 7/2016 | Mayor et al. |
| 2016/0227589 A1 | 8/2016 | Marshall et al. |
| 2016/0269535 A1 | 9/2016 | Balabhadruni et al. |
| 2016/0307436 A1 | 10/2016 | Nixon |
| 2016/0315923 A1 | 10/2016 | Riscombe-Burton et al. |
| 2016/0330769 A1 | 11/2016 | Edge |
| 2016/0337831 A1* | 11/2016 | Piett .................. H04W 4/90 |
| 2016/0345171 A1 | 11/2016 | Kulkarni et al. |
| 2016/0353262 A1 | 12/2016 | Acevedo et al. |
| 2016/0353266 A1 | 12/2016 | Winkler et al. |
| 2016/0363931 A1 | 12/2016 | Yang et al. |
| 2016/0371973 A1 | 12/2016 | Holleczek et al. |
| 2017/0004427 A1 | 1/2017 | Bruchal et al. |
| 2017/0012815 A1 | 1/2017 | Nekrestyanov et al. |
| 2017/0046216 A1 | 2/2017 | Stenneth et al. |
| 2017/0075407 A1 | 3/2017 | Kritt et al. |
| 2017/0099579 A1 | 4/2017 | Ryan et al. |
| 2017/0108862 A1 | 4/2017 | Mikkelsen |
| 2017/0124670 A1 | 5/2017 | Becker et al. |
| 2017/0124852 A1 | 5/2017 | Pauws et al. |
| 2017/0140637 A1 | 5/2017 | Thurlow et al. |
| 2017/0142568 A1 | 5/2017 | Saito et al. |
| 2017/0150335 A1 | 5/2017 | Self et al. |
| 2017/0161614 A1 | 6/2017 | Mehta et al. |
| 2017/0180963 A1 | 6/2017 | Cavendish et al. |
| 2017/0180966 A1 | 6/2017 | Piett et al. |
| 2017/0188218 A1 | 6/2017 | Corley et al. |
| 2017/0213251 A1 | 7/2017 | Nunally et al. |
| 2017/0215058 A1* | 7/2017 | Zermeno .................. H04M 11/04 |
| 2017/0238129 A1 | 8/2017 | Maier et al. |
| 2017/0238136 A1 | 8/2017 | Smith |
| 2017/0245113 A1 | 8/2017 | Hooker |
| 2017/0287085 A1 | 10/2017 | Smith et al. |
| 2017/0310827 A1 | 10/2017 | Mehta et al. |
| 2017/0316698 A1 | 11/2017 | Stenneth et al. |
| 2017/0325056 A1 | 11/2017 | Mehta et al. |
| 2017/0359712 A1 | 12/2017 | Meredith et al. |
| 2017/0374538 A1 | 12/2017 | Gellens et al. |
| 2018/0020091 A1 | 1/2018 | Self et al. |
| 2018/0020329 A1* | 1/2018 | Smith .................. H04L 67/12 |
| 2018/0039737 A1 | 2/2018 | Dempers et al. |
| 2018/0077282 A1 | 3/2018 | Herron et al. |
| 2018/0220275 A1* | 8/2018 | Mitchell, Jr. .......... H04W 4/90 |
| 2018/0262544 A1 | 9/2018 | Mehta et al. |
| 2018/0352408 A1 | 12/2018 | Baer et al. |
| 2019/0020993 A1 | 1/2019 | Nguyen |
| 2019/0166480 A1 | 5/2019 | Rauner |
| 2019/0174288 A1 | 6/2019 | Bozik et al. |
| 2019/0281165 A1 | 9/2019 | Mehta et al. |
| 2019/0306664 A1 | 10/2019 | Mehta et al. |
| 2019/0320310 A1 | 10/2019 | Horelik et al. |
| 2019/0327597 A1 | 10/2019 | Katz et al. |
| 2019/0335310 A1 | 10/2019 | Anand et al. |
| 2020/0059776 A1 | 2/2020 | Martin et al. |
| 2020/0100084 A1 | 3/2020 | Martin et al. |
| 2020/0126174 A1 | 4/2020 | Halse et al. |
| 2020/0221279 A1 | 7/2020 | Mehta et al. |
| 2020/0274962 A1 | 8/2020 | Martin et al. |
| 2020/0314240 A1 | 10/2020 | Leavitt et al. |
| 2020/0314623 A1 | 10/2020 | Pellegrini et al. |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CA | 2697986 C | 5/2018 |
| CN | 104487976 A | 4/2015 |
| CN | 104539776 A | 4/2015 |
| CN | 106021508 A | 10/2016 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| KR | 20170100422 A | 9/2017 |
| WO | WO-0022593 A1 | 4/2000 |
| WO | WO-0167419 A2 | 9/2001 |
| WO | WO-2007109599 A2 | 12/2007 |
| WO | WO-2012129561 A1 | 9/2012 |
| WO | WO-2014025563 A1 | 2/2014 |
| WO | WO-2014063121 A1 | 4/2014 |
| WO | WO-2014074420 A1 | 5/2014 |
| WO | WO-2014176646 A1 | 11/2014 |
| WO | WO-2015127867 A1 | 9/2015 |
| WO | WO-2015196155 A1 | 12/2015 |
| WO | WO-2016044540 A1 | 3/2016 |
| WO | WO-2017079354 A1 | 5/2017 |
| WO | WO-2017083571 A1 | 5/2017 |
| WO | WO-2017100220 A1 | 6/2017 |
| WO | WO-2017106775 A1 | 6/2017 |
| WO | WO-2017112820 A1 | 6/2017 |
| WO | WO-2017189610 A2 | 11/2017 |
| WO | WO-2017196753 A1 | 11/2017 |
| WO | WO-2018039142 A1 | 3/2018 |
| WO | WO-2019113129 A1 | 6/2019 |

OTHER PUBLICATIONS

ArcGIS REST Services Directory. Folder: TIGERWeb. Available at https://tigerweb.geo.census.gov/arcgis/rest/services/TIGERweb. (1 pg.) (Accessed Sep. 2017).

Chohlaswood et al. Mining 911 Calls in New York City: Temporal Patterns, Detection and Forecasting. AAAI Conference on Artificial Intelligence Workshop (Apr. 2015).

Chowdhury et al. Tweet4act: Using incident-specific profiles for classifying crisis-related messages. Proceedings of the 10th International ISCRAM Conference (pp. 834-839) (2013).

(56) References Cited

OTHER PUBLICATIONS

Cipolla et al. A tool for Emergency Detection with Deep Learning Neural Networks. KDWeb (2016) How to predict a disaster. ICAR—National Research Council of Italy—Palermo, Italy (Dec. 1, 2016) (10 pgs).
Hodgkiss et al. Spatiotemporal Analysis of 911 Call Stream Data. Proceedings of the 2005 national conference on Digital government research (2005).
Homeland Security Science and Technology. Using Social Media for Enhanced Situational Awareness and Decision Support. Virtual Social Medial Working Group and DHS First Responders Group. (44 pgs.) (Jun. 2014).
Jasso et al. Prediction of 911 Call Volumes for Emergency Event Detection. Proceedings of the 8th Annual International Digital Government Research Conference (2007).
Marcus et al. TwitInfo: Aggregating and Visualizing Microblogs for Event Exploration. ACM CHI Conference May 7-12, 2011, 2011 (10 pgs).
Meier. MatchApp: Next Generation Disaster Response App? iRevolution (12 pgs.) (Feb. 27, 2013).
National Emergency Number Association (NENA). Social Networking in 9-1-1 PSAPs Information Document. Available at https://c.ymcdn.com/sites/www.nena.org/resource/resmgr/Standards/NENA-INF-001.1.1- 2012_Social (18 pgs) (May 8, 2012).
National Emergency Number Association (Nena) Technical Committee Chairs: NENA Functional and Interface Standards for Next Generation 9-1-1 Version 1.0 (i3). (Dec. 18, 2017). Retrieved from the Internet: URL:https://c.ymcdn.com/sites/nena.site-ym.com/resource/collection/2851C951-69FF-40F0-A6B8-36A714CB085D/NENA_08-002-vl_Functional_Interface_Standards_NG911_i3.pdf [retrieved on Feb. 5, 2018] (121 pgs).
PCT/US2015/050609 International Search Report and Written Opinion dated Dec. 16, 2015.
PCT/US2016/060189 International Search Report and Written Opinion dated Feb. 24, 2017.
PCT/US2016/065212 International Search Report and Written Opinion dated Feb. 20, 2017.
PCT/US2016/067366 International Search Report and Written Opinion dated Mar. 31, 2017.
PCT/US2016/068134 International Search Report and Written Opinion dated Apr. 21, 2017.
PCT/US2017/029465 International Search Report and Written Opinion dated Aug. 9, 2017.
PCT/US2017/031605 International Search Report and Written Opinion dated Jul. 31, 2017.
PCT/US2017/047854 International Search Report and Written Opinion dated Nov. 28, 2017.
PCT/US2018/028951 International Search Report and Written Opinion dated Aug. 10, 2018.
PCT/US2018/063935 International Search Report and Written Opinion dated Mar. 22, 2019.
PCT/US2019/027538 International Search Report and Written Opinion dated Aug. 2, 2019.
PCT/US2020/013176 International Search Report and Written Opinion dated May 8, 2020.
Seattle Real Time Fire 911 Calls. Available at https://catalog.data.gov/dataset/seattle-real-time-fire-911-calls-6cdf3 (3 pgs.) (Accessed Sep. 2017).
Song. Next Generation Emergency Call System with Enhanced Indoor Positioning, Columbia University. Thesis [online] [retrieved Apr. 20, 2020 from< url:https://scholar.google.co.kr/citations/?user=h_4uUqAAAAAJ&hl=ko (156 pgs) (2014)</url:<a>.
Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (Jan. 2011).
U.S. Census Bureau. Developers: Population Estimates APIs. Available at https://www.census.gov/data/developers/data-sets/popest-popproj/popest.html (2 pgs.) (Accessed Sep. 2017).
U.S. Appl. No. 14/794,780 Office Action dated Feb. 2, 2016.
U.S. Appl. No. 14/794,780 Office Action dated Mar. 7, 2017.
U.S. Appl. No. 14/794,780 Office Action dated Nov. 15, 2016.
U.S. Appl. No. 14/856,818 Office Action dated Apr. 12, 2017.
U.S. Appl. No. 15/371,117 Office Action dated Apr. 3, 2020.
U.S. Appl. No. 15/371,117 Office Action dated Aug. 5, 2019.
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,379 Office Action dated Nov. 2, 2017.
U.S. Appl. No. 15/436,484 Office Action dated May 8, 2017.
U.S. Appl. No. 15/436,484 Office Action dated Sep. 14, 2017.
U.S. Appl. No. 15/444,133 Office Action dated Apr. 4, 2017.
U.S. Appl. No. 15/444,133 Office Action dated Aug. 17, 2017.
U.S. Appl. No. 15/497,067 Office Action dated Jun. 23, 2017.
U.S. Appl. No. 15/588,343 Office Action dated Feb. 26, 2018.
U.S. Appl. No. 15/589,847 Office Action dated Jun. 23, 2017.
U.S. Appl. No. 15/589,847 Office Action dated Nov. 30, 2017.
U.S. Appl. No. 15/589,847 Office Action dated Nov. 6, 2018.
U.S. Appl. No. 15/667,531 Office Action dated Apr. 5, 2018.
U.S. Appl. No. 15/667,531 Office Action dated Nov. 8, 2017.
U.S. Appl. No. 15/682,440 Office Action dated Jan. 27, 2020.
U.S. Appl. No. 15/682,440 Office Action dated Jul. 10, 2019.
U.S. Appl. No. 15/880,208 Office Action dated Aug. 7, 2018.
U.S. Appl. No. 15/958,186 Office Action dated Oct. 18, 2018.
U.S. Appl. No. 15/958,398 Office Action dated Oct. 12, 2018.
U.S. Appl. No. 15/960,384 Office Action dated Jul. 12, 2018.
U.S. Appl. No. 15/976,600 Office Action dated Jan. 30, 2020.
U.S. Appl. No. 16/150,099 Office Action dated Jun. 25, 2019.
U.S. Appl. No. 16/162,171 Office Action dated Apr. 9, 2020.
U.S. Appl. No. 16/162,171 Office Action dated Nov. 4, 2019.
U.S. Appl. No. 16/178,476 Office Action dated May 30, 2019.
U.S. Appl. No. 16/209,892 Office Action dated Feb. 8, 2019.
U.S. Appl. No. 16/271,634 Office Action dated Dec. 16, 2019.
U.S. Appl. No. 16/271,634 Office Action dated Jun. 13, 2019.
U.S. Appl. No. 16/378,363 Office Action dated Jul. 19, 2019.
U.S. Appl. No. 16/384,600 Office Action dated Apr. 2, 2020.
U.S. Appl. No. 16/421,355 Office Action dated Feb. 4, 2020.
U.S. Appl. No. 16/436,810 Office Action dated Aug. 9, 2019.
U.S. Appl. No. 16/436,810 Office Action dated Dec. 17, 2019.
U.S. Appl. No. 16/526,195 Office Action dated Dec. 27, 2019.
U.S. Appl. No. 16/740,207 Office Action dated Mar. 11, 2020.
U.S. Appl. No. 16/378,363 Office Action dated Jan. 14, 2020.
Weather Company Data for IBM Bluemix APIs. Available at https://twcservice.mybluemix.net/rest-api/ (100 pgs) (Accessed Sep. 2017).

* cited by examiner

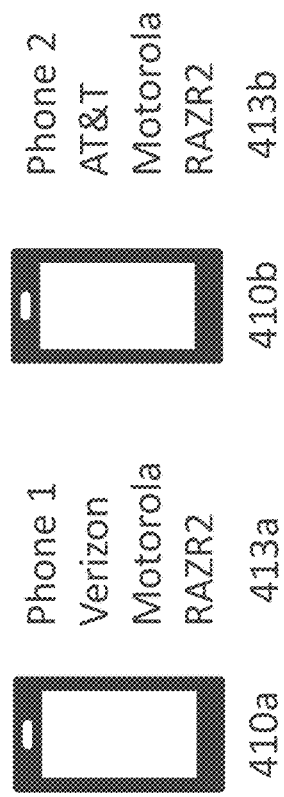
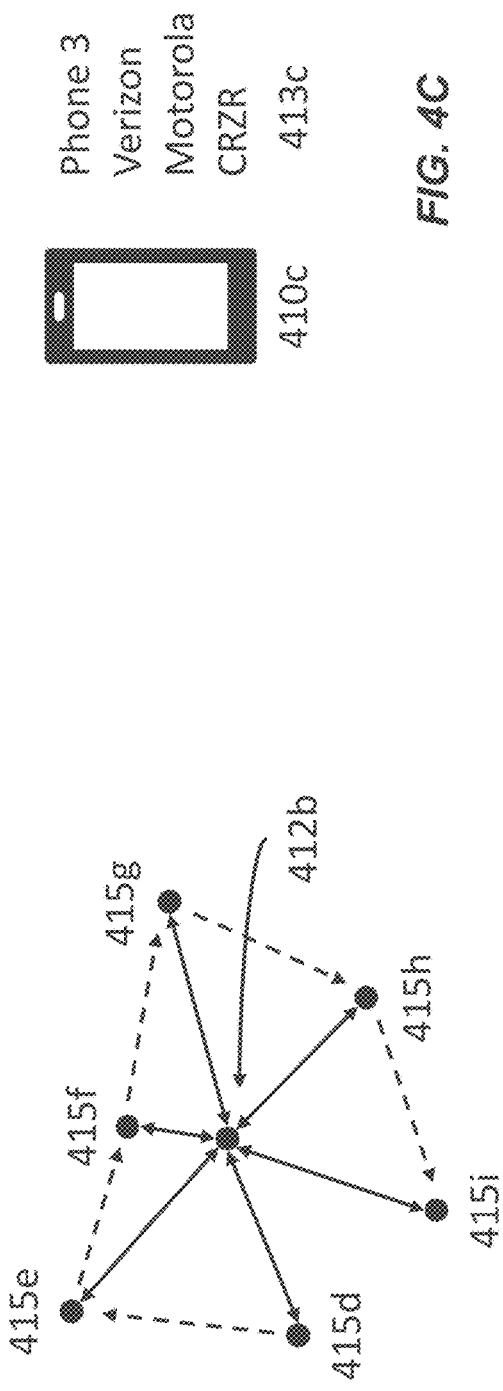
FIG. 4C
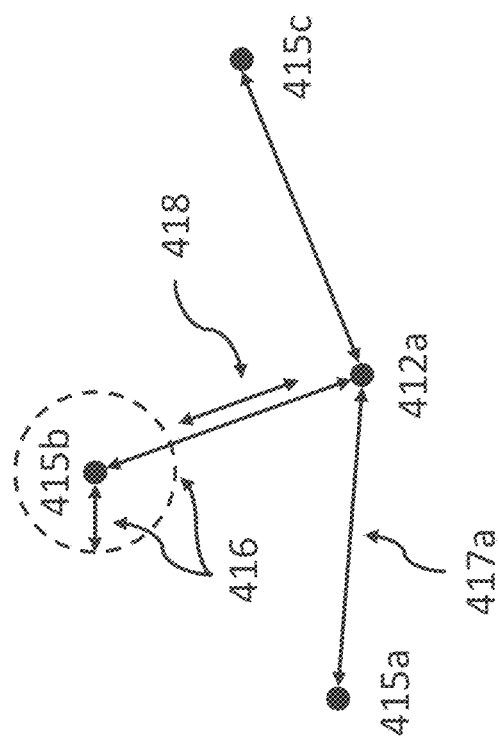
FIG. 4A
FIG. 4B

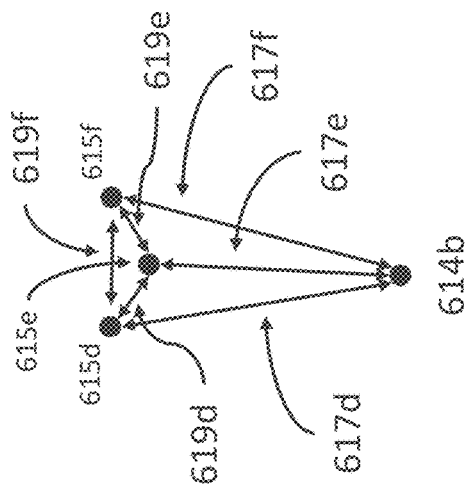
FIG. 6C
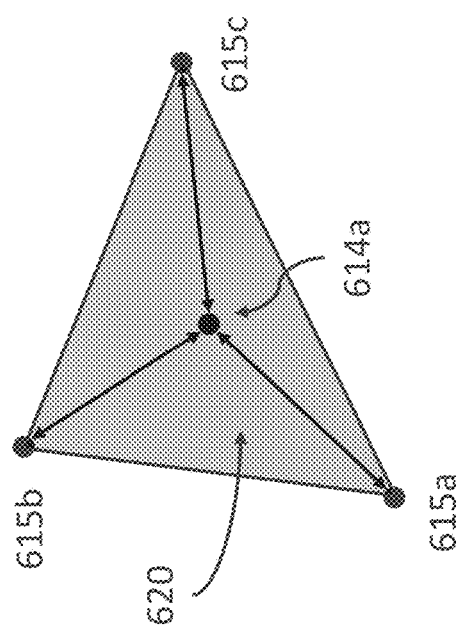
FIG. 6D
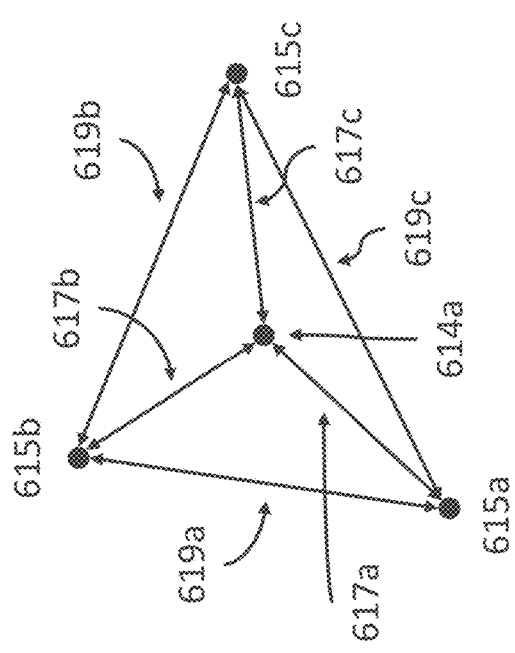
FIG. 6A
FIG. 6B

850

| | Caller | Location Time | Calling | Accuracy Radius | Speed | Altitude |
|---|---|---|---|---|---|---|
| 852a | 555-555-5555 | 12/9/2017 9:45:40 | 4158911911 | 3.9 | 3.39 | -12 |
| 852b | 555-555-5555 | 12/9/2017 9:45:46 | 4158911911 | 3.9 | 3.37 | -13 |
| 852c | 555-555-5555 | 12/9/2017 9:45:51 | 4158911911 | 3.9 | 3.4 | -14 |
| 852d | 555-555-5555 | 12/9/2017 9:45:57 | 4158911911 | 3.9 | 3.36 | -16 |
| 852e | 555-555-5555 | 12/9/2017 9:46:38 | 911 | 43.165 | 0 | 0 |
| 852f | 555-555-5555 | 12/9/2017 9:46:45 | | 53.482 | 0 | 0 |
| 852g | 555-555-5555 | 12/9/2017 9:46:53 | | 65.881 | 0 | 0 |
| 852h | 555-555-5555 | 12/9/2017 9:46:53 | | 65.881 | 0 | 0 |
| 852i | 555-555-5555 | 12/9/2017 9:46:53 | 911 | 65.881 | 0 | 0 |
| 852j | 555-555-5555 | 12/9/2017 9:46:53 | 911 | 65.881 | 0 | 0 |
| 852k | 555-555-5555 | 12/9/2017 9:47:08 | 911 | 23.422 | 0 | 0 |
| 852l | 555-555-5555 | 12/9/2017 9:47:08 | 911 | 23.422 | 0 | 0 |

| JUST IN TIME | | | | | | |
|---|---|---|---|---|---|---|
| OTHER TOOLS | CALL CONTROLS 1420 | | | | ALI DISPLAY 1440 | ? |
| | ☒ Ready | ☒ Answer | ☒ Release | ☒ Redial | ☒ Drop | ANI: 555-555-5555 |
| | ENHANCED DATA 1430 | | | | | DATE: 01/30/2017 15:15:17 |
| | PHONE # | LAST LOCATION UPDATE | | PROBABLE ADDRESS | | NAME: JOHN DOE |
| | 555-555-5555 | 11:56:21 | | 111 S. HILL ST DENVER, CO 80202 | | ADDRESS: NE SECTOR |
| | 1421 — LAT: 39.742991 | | | | | CITY: DENVER, CO |
| | 1423 — LONG: -104.99534 | | | More Information on Location | | ESN: 111 — 1429 |
| | 1425 — CONF: 97 | | | | | COS: WPA2 |
| | RADIUS: 10.22m | | | Give Feedback on Location | | LAT: 39.7430 — 1431 |
| | 1427 — ALTITUDE: 15m | | | | | LONG: -104.8946 |
| | ADDITIONAL INFORMATION | | | | — 1433 | CONF: 95 |
| | | | | | | RADIUS: 300 |
| | | | | | | ALISrvr: A01 |

*FIG. 14A*

EMERGENCY LOCATION ANALYSIS SYSTEM

CROSS-REFERENCE

This application is a continuation of U.S. application Ser. No. 16/271,634, filed Feb. 8, 2019, which issued as U.S. Pat. No. 10,820,181, on Oct. 27, 2020, which claims the benefit of U.S. Provisional Application No. 62/628,880, filed Feb. 9, 2018, which application is incorporated herein by reference.

BACKGROUND OF THE INVENTION

A person in an emergency situation may request help using a mobile communication device such as a cell phone to dial a designated emergency number like 9-1-1 or a direct access phone number for a local emergency service provider (e.g., an emergency dispatch center). This emergency call is assigned to one or more first responders by the emergency service provider. In order to dispatch emergency personnel to aid the person in the emergency situation, the emergency service provider must determine the location of the emergency. However, these communications are typically limited to audio calls with narrow functionality since most emergency service providers that receive emergency calls currently lack the capacity for more sophisticated communications. As a result, emergency service providers are accordingly typically limited to verbally receiving emergency locations from the person in the emergency situation during the emergency call. Unfortunately, there are a great many instances in which a person in an emergency situation does not know or is otherwise incapable of articulating their location. Attempts to locate emergency calls typically use cell tower triangulation, which is a slow and inaccurate, low-resolution process.

SUMMARY OF THE INVENTION

One advantage provided by the systems, servers, devices, methods, and media of the instant application is the ability to deliver device-based hybrid locations to emergency service providers. In some embodiments, an emergency location management system receives a device-based hybrid location and delivers the device-based hybrid location to an emergency service provider by displaying the device-based hybrid location a screen within a public safety answering point (PSAP). In some embodiments, the device-based hybrid location is displayed within a pre-existing PSAP system, such as an Automatic Location Identification (ALI) display. In some embodiments, the device-based hybrid location is accessed by the PSAP through a web browser.

Conventional methods for providing location information to emergency service providers can be characterized by poor location accuracy. For example, cell tower or network-based locationing methods can provide mobile device locations that are off by a magnitude of a mile. By contrast, the present disclosure provides a practical integration of location validation methodologies with emergency communications utilizing modern communication devices such as mobile phones. This practical application of location validation in the context of providing more accurate location (e.g., device-based location as opposed to network-based cell tower location) while also ensuring the delivered location is sufficiently accurate provides the ability to dramatically reduce the emergency response time and signifies a substantial improvement to the technical field of 911 communications.

Therefore, another advantage provided by the systems, servers, devices, methods, and media of the instant application is the ability to validate the location accuracy of a location reported by a communication device. In some aspects, provided herein is an emergency location analysis system capable of validating the location accuracy of a location (e.g., a device-based hybrid location) reported by a communication device during an emergency situation. Although device-based hybrid locations are generally accurate, the accuracy of a device-based hybrid location can depend on a number of factors, such as which technologies were incorporated in generating the location, the hardware used in each, the software or operating system of the mobile device, the network carrier of the mobile device, and other factors that can influence location accuracy. In some embodiments, the emergency location analysis system receives a device-based hybrid location and obtains a list of attributes associated with the device and/or device location encompassing one or more of the aforementioned factors (also referred to as attributes). In some embodiments, the emergency location analysis system analyzes the attributes to generate a location accuracy metric (e.g., an accuracy prediction) of the device-based hybrid location. In some embodiments, the emergency location analysis system determines a location accuracy metric of the device-based hybrid location by analyzing the relevant, associated attributes in reference to an emergency test call database. In some embodiments, the emergency location analysis system forgoes delivering a location to an emergency service provider if a location accuracy metric determined for the location does not meet or exceed an accuracy threshold. In some embodiments, the emergency location analysis system provides instructions or recommendations not to deliver a location to an emergency service provider when the location accuracy metric fails to satisfy the accuracy threshold.

Another advantage provided by the systems, servers, devices, methods, and media of the instant application is the ability to utilize one or more attributes associated with an emergency communication to predict location accuracy. In some aspects, disclosed herein is an emergency test call database to aid the emergency location analysis system in determining a location accuracy or location accuracy metric of a device-based hybrid location. In some embodiments, an emergency test call database is created by executing a plurality of emergency test calls from a plurality of various mobile devices on a plurality of network carriers in a plurality of locations. In some embodiments, an entry is recorded in the emergency test call database for each emergency test call, and a list of attributes associated with the emergency test call and at least two locations are recorded in each entry, including a device-based hybrid location generated by the mobile device on which the emergency call was executed, and a ground-truth location produced by a GPS device communicatively coupled to the mobile device during the emergency test call. In some embodiments, for each entry in the emergency test call database, a distance is calculated between the device-based hybrid location and the ground-truth location to determine the accuracy of the device-based hybrid location.

Another advantage provided by the systems, servers, devices, methods, and media of the instant application is the ability to improve upon reported device-based hybrid locations or predict a subsequent location for a given device-based hybrid location. In some embodiments, after analyzing the aforementioned emergency test call database, the emergency location analysis system can determine a location improvement rule for emergency calls executed under a particular set of attributes. Then, upon recognizing the particular set of attributes with a received device-based hybrid location, the emergency location analysis system may apply the location improvement rule to the received device-based hybrid location to generate an improved or advanced location. In some embodiments, after analyzing the emergency test call database and receiving a device-based hybrid location with a set of attributes, the emergency location analysis system can predict a subsequent location for the device-based hybrid location. For example, in one embodiment, the emergency location analysis system may determine that the mobile device from which a device-based hybrid location was received is currently in motion and predict a location for where the mobile device will be in five minutes.

In one aspect, a method for validating a reported location associated with an emergency alert comprises: a) detecting an emergency alert from a first device; b) identifying a reported location associated with the emergency alert; c) identifying one or more attributes associated with the emergency alert; d) comparing the one or more attributes to one or more flagged characteristics; and e) in response to determining that none of the one or more attributes match any of the one or more flagged characteristics, converting the reported location into a validated location and providing the validated location to one or more emergency service providers (ESPs). In some embodiments, the reported location is a hybrid device-based location. In some embodiments, the reported location is not provided to the one or more recipients in response to determining that any of the one or more attributes match any of the one or more flagged characteristics. In some embodiments, the validated location is not provided to the one or more ESPs if the validated location is not within one or more geofences associated with the one or more ESPs. In some embodiments, detecting the emergency alert from the first device further comprises receiving a payload comprising information regarding the emergency alert; and identifying the one or more attributes associated with the emergency alert further comprises extracting the one or more attributes associated with the emergency alert from the payload comprising information regarding the emergency alert. In some embodiments, the payload comprises an HTTP post or an SMS message. In some embodiments, at least one of the one or more flagged characteristics is a location accuracy threshold, and the method further comprises: a) determining a location accuracy metric for the emergency alert using the one or more attributes and one or more ground-truth locations; and b) comparing the location accuracy metric to the location accuracy threshold. In some embodiments, determining a location accuracy metric for the emergency alert using the one or more attributes and one or more ground truth locations further comprises accessing a database comprising a set of entries, wherein each entry in the set of entries represents a unique phone call and comprises: a) a set of attributes associated with a test device from which the unique phone call was made; b) a test location received from the test device during the unique phone call; and c) a ground-truth location associated with the unique phone call. In some embodiments, the one or more ground-truth locations include locations obtained from a locationing device, locations obtained from a pre-surveyed environment, or locations received from an emergency service provider. In some embodiments, the location accuracy metric is a location accuracy included in a payload associated with the emergency alert. In some embodiments, the method further comprises receiving a location request from the ESP.

In one aspect, a method for validating a reported location associated with an emergency request comprises: a) detecting an emergency request from a first device; b) identifying a reported location associated with the emergency request; c) identifying one or more attributes associated with the emergency request; d) determining a location accuracy metric for the emergency request using the one or more attributes; e) comparing the location accuracy metric to a first accuracy threshold, wherein the reported location is converted to a validated location when the location accuracy metric meets the first accuracy threshold; and f) in response to the location accuracy metric meeting the first accuracy threshold, providing the validated location to a recipient. In some embodiments, the reported location is a hybrid device-based location. In some embodiments, the location accuracy metric is a location accuracy included in a payload associated with the emergency request. In some embodiments, detecting an emergency request from a first device further comprises receiving an HTTP post comprising information regarding the emergency request. In some embodiments, identifying one or more attributes associated with the emergency request further comprises parsing an HTTP post comprising information regarding the emergency request. In some embodiments, detecting an emergency request from a first device further comprises receiving an SMS message comprising information regarding the emergency request. In some embodiments, identifying one or more attributes associated with the emergency request further comprises parsing an SMS message comprising information regarding the emergency request. In some embodiments, the one or more attributes comprise manufacturer and model of the first device, network carrier information, time of emergency request (call), geographical area, zone or population density, outdoor or indoor location, device battery level, type of connection, source of location, reported location accuracy, reported location confidence, operating system of the first device, an identifier of the first device, accelerometer speed of the first device, power saving status of the first device, or WiFi status of the first device, or any combination thereof. In some embodiments, the one or more recipients comprise a public safety answering point (PSAP). In some embodiments, determining the location accuracy metric for the emergency request using the one or more attributes comprises: a) accessing a database comprising a set of entries, wherein each entry in the set of entries represents a unique phone call and comprises: i) a set of attributes associated with a test device from which the unique phone call was made; ii) a test location received from the test device during the unique phone call; and iii) a ground-truth location associated with the unique phone call; b) querying the database for each entry in the set of entries containing an attribute in the set of attributes associated with the test device matching the one or more attributes; c) creating a set of distances by calculating, for each entry in the set of entries containing an attribute in the set of attributes associated with the test device matching the one or more attributes, a distance between the test location and the ground-truth location; and d) calculating, based on the set of distances, the location accuracy metric for the emergency request. In some embodiments, the test location is a hybrid device-based location. In some embodiments, the unique phone call is an emergency call to a PSAP from the test device. In some embodiments, the test location is a carrier-provided location. In some embodiments, the ground-truth location associated with the unique phone call is received from PSAP. In some embodiments, the ground-truth location associated with the unique phone call is generated by an electronic device associated with an emergency responder. In some embodiments, the test location and the ground-truth location are recorded simultaneously and timestamped. In some embodiments, the ground-truth is an indoor location within a pre-surveyed building. In some embodiments, the ground-truth location comprises a z-axis coordinate. In some embodiments, the first accuracy threshold is either assigned the value of a routing accuracy threshold or a dispatching accuracy threshold, wherein the dispatching accuracy threshold is higher than the routing accuracy threshold. In some embodiments, the method further comprises receiving a location request from the PSAP. In some embodiments, the emergency request is an emergency call made by the first device. In some embodiments, the emergency request is an emergency message sent by the first device. In some embodiments, the validated location is displayed on a PSAP display.

In one aspect, a method for validating a reported location associated with an emergency request comprises: a) receiving a reported location associated with the emergency request; b) identifying one or more attributes associated with the emergency request; c) analyzing the one or more attributes to generate a location accuracy metric for the emergency request; d) determining if the location accuracy metric satisfies a first accuracy threshold, wherein the reported location is converted to a validated location when the location accuracy metric satisfies the first accuracy threshold; and e) in response to determining that the location accuracy metric meeting the first accuracy threshold, providing the validated location to a recipient.

In one aspect, a method for validating a reported location associated with an emergency request comprises: a) detecting an emergency request from a first device; b) identifying a reported location associated with the emergency request; c) identifying one or more attributes associated with the emergency request; d) comparing the one or more attributes to a list of flagged attributes; and e) in response to determining that none of the one or more attributes appear on the list of flagged attributes, converting the reported location to a validated location and providing the validated location to one or more recipients. In some embodiments, the one or more attributes comprise manufacturer and model of the first device, network carrier information, time of emergency request (call), geographical area, zone or population density, outdoor or indoor location, device battery level, type of connection, source of location, reported location accuracy, reported location confidence, operating system of the first device, an identifier of the first device, accelerometer speed of the first device, power saving status of the first device, or WiFi status of the first device. In some embodiments, the list of flagged attributes is generated by: a) accessing a database comprising a set of entries, wherein each entry in the set of entries represents a unique phone call and comprises: i) a set of attributes associated with a test device from which the unique phone call was made; ii) a test location received from the test device during the unique phone call; and iii) a ground-truth location associated with the unique phone call; b) calculating, for one or more entries in the set of entries, a respective distance between the test location and the ground-truth location; c) associating, for the one or more entries in the set of entries, the respective distance with each of the attributes in the set of attributes; d) calculating, for one or more attributes in the database, a location accuracy metric based on one or more respective distances associated with the one or more attributes; and e) flagging an attribute as a flagged attribute when the location accuracy metric of the attribute fails to meet an accuracy threshold. In some embodiments, the test location is a hybrid device-based location. In some embodiments, the unique phone call is an emergency call to a PSAP from the test device. In some embodiments, the test location is a carrier-provided location. In some embodiments, the ground-truth location associated with the unique phone call is received from a contributing PSAP. In some embodiments, the ground-truth location associated with the unique phone call is generated by an electronic device associated with an emergency responder. In some embodiments, location accuracy metrics of attributes that appear on the list of flagged attributes are compared to a higher accuracy threshold for location validation than location accuracy metrics of attributes that do not appear on the list of flagged attributes. In some embodiments, the test location and the ground-truth location are recorded simultaneously and timestamped. In some embodiments, the ground-truth is an indoor location within a pre-surveyed building. In some embodiments, the ground-truth location comprises a z-axis coordinate. In some embodiments, detecting an emergency request from a first device further comprises receiving an HTTP post comprising information regarding the emergency request; and identifying one or more attributes associated with the emergency request further comprises parsing the HTTP post comprising information regarding the emergency request. In some embodiments, detecting an emergency request from a first device further comprises receiving an SMS message comprising information regarding the emergency request; and identifying one or more attributes associated with the emergency request further comprises parsing the SMS message comprising information regarding the emergency request. In some embodiments, the method further comprises receiving a location request from the PSAP. In some embodiments, the emergency request is an emergency call made by the first device. In some embodiments, the validated location is displayed on a PSAP display. In some embodiments, the one or more recipients comprise a public safety answering point (PSAP).

In some aspects, disclosed herein is a computer-implemented method for validating a reported location associated with an emergency request, the method comprising: (a) detecting an emergency request from a first device; (b) identifying a reported location associated with the emergency request; (c) identifying one or more attributes associated with the emergency request; (d) determining a location accuracy metric for the emergency request using the one or more attributes; (e) comparing the location accuracy metric to a first accuracy threshold, wherein the reported location is determined to be a validated location when the location accuracy metric meets the first accuracy threshold; and (f) in response to the location accuracy metric meeting the first accuracy threshold, providing the validated location to one or more recipients comprising a public safety answering point (PSAP). In some embodiments, the first accuracy threshold is either assigned the value of a routing accuracy threshold or a dispatching accuracy threshold, wherein the dispatching accuracy threshold is higher than the routing accuracy threshold. In some embodiments, the method further comprises receiving a location request from the PSAP. In some embodiments, the emergency request is an emergency call to a PSAP from the first device. In some embodiments, the method further comprises receiving a location request from the PSAP during the emergency call to the PSAP from the first device. In some embodiments, the validated location is displayed on a PSAP display. In some embodiments, the reported location is a hybrid device-based location. In some embodiments, the reported location is a carrier-provided location. In some embodiments, the one or more attributes comprise manufacturer and model of the first device, network carrier information, time of emergency request (call), geographical area, zone or population density, outdoor or indoor location, device battery level, type of connection, source of location, reported location accuracy, reported location confidence, operating system of the first device, an identifier of the first device, accelerometer speed of the first device, power saving status of the first device, or Wi-Fi status of the first device. In some embodiments: (a) the first threshold is a routing accuracy threshold; and (b) providing the validated location to the one or more recipients in step (f) further comprises delivering an indication to the PSAP that the validated location is suitable for emergency routing. In some embodiments, the method further comprises: (a) comparing the location accuracy metric to a second accuracy threshold, wherein the second accuracy threshold is a dispatching accuracy threshold and comprises a higher degree of accuracy than the first accuracy threshold; and (b) in response to the location accuracy metric meeting the second accuracy threshold, providing the validated location to the one or more recipients as suitable for emergency dispatching. In some embodiments, providing the validated location to the one or more recipients further comprises displaying the validated location on a PSAP display. In some embodiments, determining a location accuracy metric for the emergency request further comprises a machine learning algorithm to a database of emergency calls comprising call attributes, and a distance between the reported location and a ground-truth location, wherein the emergency calls comprise one or more emergency test calls. In some embodiments, determining a location accuracy metric for the emergency request using the one or more attributes further comprises: (a) accessing a database comprising a set of entries, wherein each entry in the set of entries represents a unique phone call and comprises: i) a set of attributes associated with a test device from which the unique phone call was made; ii) a test location received from the test device during the unique phone call; and iii) a ground-truth location associated with the unique phone call; (b) querying the database for each entry in the set of entries containing an attribute in the set of attributes associated with the test device matching the one or more attributes; (c) creating a set of distances by calculating, for each entry in the set of entries containing an attribute in the set of attributes associated with the test device matching the one or more attributes, a distance between the test location and the ground-truth location; and (d) calculating, based on the set of distances, a location accuracy metric. In some embodiments, the ground-truth location associated with the unique phone call is obtained from a locationing device coupled to the test device or a testing assembly. In some embodiments, the ground-truth location associated with the unique phone call is obtained using one or more locationing methods. In some embodiments, the unique phone call is an emergency call to a PSAP from the test device. In some embodiments, the unique phone call is network carrier mock emergency call. In some embodiments, the unique phone call is a voice over internet protocol (VoIP) test call. In some embodiments, calculating a location accuracy metric further comprises comparing the set of distances to a predicted accuracy radius reported by the test device. In some embodiments, calculating a location accuracy metric further comprises comparing the set of distances to a predicted accuracy radius reported by a network carrier of the test device. In some embodiments, the locationing device is a GPS device. In some embodiments, the test location is a carrier-provided phase one location. In some embodiments, the test location is a carrier-provided phase two location. In some embodiments, the test location is a hybrid device-based location. In some embodiments, detecting an emergency request from a first device further comprises receiving an SMS message comprising information regarding the emergency request. In some embodiments, detecting an emergency request from a first device further comprises receiving an HTTP post comprising information regarding the emergency request. In some embodiments, the HTTP post is received from a mobile application installed on the first device. In some embodiments, identifying one or more attributes associated with the emergency request further comprises parsing an SMS message comprising information regarding the emergency request. In some embodiments, identifying one or more attributes associated with the emergency request further comprises parsing an HTTP post comprising information regarding the emergency request. In some embodiments, identifying one or more attributes associated with the emergency request further comprises receiving a hybrid device-based location comprising information regarding the emergency request. In some embodiments, the method further comprises: (a) receiving a ground-truth location pertaining to the emergency request from the PSAP; and (b) pairing the ground-truth location with the reported location in a database. In some embodiments, the method further comprises receiving feedback regarding the validated location provided to the PSAP. In some embodiments, the method further comprises storing the feedback with the validated location in a database. In some embodiments, the feedback is received from an emergency responder. In some embodiments, the feedback is received from the emergency responder after the emergency responder arrives at the validated location. In some embodiments, the feedback is generated from the selection of a feedback button on an electronic device associated with the emergency responder. In some embodiments, the feedback is received from the PSAP. In some embodiments, the feedback is generated from the selection of a feedback button on a PSAP display. In some embodiments, determining a location accuracy metric for the emergency request using the one or more attributes further comprises: (a) accessing a database comprising a set of entries, wherein each entry in the set of entries represents a unique phone call and comprises: i) a set of attributes associated with a test device from which the unique phone call was made; ii) a test location received from the test device during the unique phone call; and iii) a ground-truth location; (b) querying the database for each entry in the set of entries containing an attribute in the set of attributes associated with the test device matching the one or more attributes; (c) creating a set of distances by calculating, for each entry in the set of entries containing an attribute in the set of attributes associated with the test device matching the one or more attributes, a distance between the test location and the ground-truth location; (d) calculating, based on the set of distances, a location accuracy metric. In some embodiments, the ground-truth location is received from a pre-surveyed building. In some embodiments, the ground-truth location includes a z-axis coordinate. In some embodiments, the ground-truth location is a building address. In some embodiments, the ground-truth location is a geographical coordinate. In some embodiments, each entry in the set of entries further comprises a multitude of test locations and a corresponding multitude of ground-truth locations. In some embodiments, creating a set of distances further comprises zipping the multitude of test locations with the corresponding multitude of ground-truth locations into a single file. In some embodiments, each test location in the multitude of test locations is paired into a respective location pair with a corresponding ground-truth location recorded simultaneously. In some embodiments, each location pair is timestamped. In some embodiments, creating a set of differences further comprises calculating a distance between the test location and corresponding ground-truth location for each location pair; and wherein calculating a location accuracy metric further comprises calculating a distance rate of change based on the set of differences and the timestamps of the location pairs. In some embodiments, the multitude of test locations is recorded on a periodic interval during the unique phone call. In some embodiments, the periodic interval is 5 seconds. In some embodiments, the test location and the ground-truth location are recorded simultaneously. In some embodiments, the test location and the ground-truth location are timestamped. In some aspects, disclosed herein is a system configured to perform the method of any of the preceding embodiments. In some aspects, disclosed herein is non-transitory computer readable storage media encoded with at least one computer program including instructions executable by at least one processor to perform the method of any of the preceding embodiments.

In some aspects, disclosed herein is a method for validating a reported location associated with an emergency request, the method comprising: (a) detecting an emergency request from a first device; (b) identifying a reported location associated with the emergency request; (c) identifying one or more attributes associated with the emergency request; (d) comparing the one or more attributes to a list of flagged attributes; (e) in response to determining that none of the one or more attributes appear on the list of flagged attributes, converting the reported location to a validated location and providing the validated location to one or more recipients comprising a public safety answering point (PSAP). In some embodiments, the one or more attributes comprise manufacturer and model of the first device, network carrier information, time of emergency request (call), geographical area, zone or population density, outdoor or indoor location, device battery level, type of connection, source of location, reported location accuracy, reported location confidence, operating system of the first device, an identifier of the first device, accelerometer speed of the first device, power saving status of the first device, or Wi-Fi status of the first device. In some embodiments, the list of flagged attributes is generated by: (a) accessing a database comprising a set of entries, wherein each entry in the set of entries represents a unique phone call and comprises: i) a set of attributes associated with a test device from which the unique phone call was made; ii) a test location received from the test device during the unique phone call; iii) a ground-truth location associated with the unique phone call; (b) calculating, for one or more entries in the set of entries, a respective distance between the test location and the ground-truth location; (c) associating, for the one or more entries in the set of entries, the respective distance with each of the attributes in the set of attributes; (d) calculating, for one or more attributes in the database, a location accuracy metric based on one or more respective distances associated with the one or more attributes; and (e) flagging an attribute as a flagged attribute when the location accuracy metric of the attribute fails to meet an accuracy threshold. In some embodiments, location accuracy metrics of attributes that appear on the list of flagged attributes are compared to a higher accuracy threshold for location validation than location accuracy metrics of attributes that do not appear on the list of flagged attributes. In some aspects, disclosed herein is a system configured to perform the method of any of the preceding embodiments. In some aspects, disclosed herein is non-transitory computer readable storage media encoded with at least one computer program including instructions executable by at least one processor to perform the method of any of the preceding embodiments.

In some aspects, disclosed herein is a method for improving the location accuracy associated with a reported location of an emergency request, the method comprising: (a) detecting an emergency request from a first device; (b) identifying a reported location associated with the emergency request; (c) identifying one or more attributes associated with the emergency request; (d) inputting the one or more attributes into an emergency location analysis system; (e) defining one or more location improvement rules determined by the emergency location analysis system using the one or more attributes associated with the emergency request; (f) applying the one or more location improvement rules to the reported location to generate an improved location; and (g) providing the improved location to one or more recipients comprising a public safety answering point (PSAP). In some embodiments, the one or more attributes comprise manufacturer and model of the first device, network carrier information, time of emergency request (call), geographical area, zone or population density, outdoor or indoor location, device battery level, type of connection, source of location, reported location accuracy, reported location confidence, operating system of the first device, an identifier of the first device, accelerometer speed of the first device, power saving status of the first device, or Wi-Fi status of the first device. In some embodiments, the emergency request is an emergency call to a PSAP from the first device. In some embodiments, the method further comprises receiving a location request from the PSAP during the emergency call. In some embodiments, the method further comprises dynamically updating and redelivering the improved location to the PSAP during the emergency call. In some embodiments, the improved location is dynamically updated on a periodic interval. In some embodiments, providing the improved location to one or more recipients comprising a public safety answering point (PSAP) further comprises delivering an indication to the PSAP that the improved location is distinct from the reported location. In some embodiments, the one or more location improvement rules include a vector transformation. In some embodiments, applying the one or more location improvement rules to the reported location to generate an improved location further comprises applying a vector transformation to the reported location. In some embodiments, defining one or more location improvement rules determined by the emergency location analysis system using the one or more attributes associated with the emergency request further comprises: (a) accessing a database comprising a set of entries, wherein each entry in the set of entries represents a unique phone call and comprises: i) a set of attributes associated with a test device from which the unique phone call was made; ii) a test location received from the test device during the unique phone call; iii) a ground-truth location associated with the unique phone call; (b) querying the database for each entry in the set of entries containing an attribute in the set of attributes associated with the test device matching the one or more attributes; (c) creating a set of vectors by calculating, for each entry in the set of entries containing an attribute in the set of attributes associated with the test device matching the one or more attributes, a distance and direction between the test location and the ground-truth location; and (d) determining, based on the set of vectors, a location improvement rule defined by the one or more attributes. In some embodiments, each entry in the set of entries further comprises a multitude of test locations and a corresponding multitude of ground-truth locations. In some embodiments, the multitude of test locations is recorded on a periodic interval during the unique phone call. In some embodiments, the periodic interval is 5 seconds. In some embodiments, each test location in the multitude of test locations is paired into a respective location pair with a corresponding ground-truth location recorded simultaneously. In some embodiments, each location pair is timestamped. In some embodiments: (a) creating a set of vectors further comprises calculating a distance and a direction between the test location and corresponding ground-truth location for each location pair; and (b) defining one or more location improvement rules further comprises calculating a vector rate of change based on the set of differences and the timestamps of the location pairs. In some embodiments, applying the one or more location improvement rules to the reported location to generate an improved location further comprises: (a) calculating a distance between the reported location and a user-defined location; (b) comparing the distance to a proximity threshold; and (c) in response to the distance meeting the proximity threshold, generating the improved location by snapping the reported location to the user-defined location. In some embodiments, the user-defined location is stored on the first device. In some embodiments, the user-defined location is received through a mobile application installed on the first device. In some embodiments, the user-defined location is a home or work address of a user associated with the first device. In some embodiments, the method further comprises: (a) receiving a ground-truth location pertaining to the emergency request; and (b) pairing the ground-truth location with the improved location in a database. In some embodiments, the ground-truth location is received from the PSAP. In some embodiments, the ground-truth location is received from an emergency responder. In some embodiments, the ground-truth location is sent from an electronic device associated with the emergency responder. In some aspects, disclosed herein is a system configured to perform the method of any of the preceding embodiments. In some aspects, disclosed herein is non-transitory computer readable storage media encoded with at least one computer program including instructions executable by at least one processor to perform the method of any of the preceding embodiments.

In some aspects, disclosed herein is a method for generating a predicted location associated with an emergency request, the method comprising: (a) detecting an emergency request from a first device; (b) identifying a reported location associated with the emergency request; (c) identifying one or more attributes associated with the emergency request; (d) inputting the one or more attributes into an emergency location analysis system to generate a predicted location for the emergency request; (e) providing the predicted location to one or more recipients, wherein the recipients comprise a public safety answering point (PSAP). In some embodiments, the one or more attributes comprise manufacturer and model of the first device, network carrier information, time of emergency request (call), geographical area, zone or population density, outdoor or indoor location, device battery level, type of connection, source of location, reported location accuracy, reported location confidence, operating system of the first device, an identifier of the first device, accelerometer speed of the first device, power saving status of the first device, or Wi-Fi status of the first device. In some embodiments, the predicted location is generated on a real-time or near-time basis after the emergency request is detected. In some embodiments, the method further comprises determining, based on the one or more attributes, that the reported location is likely to be dynamic. In some embodiments, step (d) comprises applying one or more machine learning algorithms to generate the predicted location. In some embodiments, testing data comprising emergency calls or non-emergency calls with associated ground-truth locations is used for generating a prediction algorithm for generating the predicted location. In some embodiments, step (d) comprises applying statistical analysis to generate the predicted location. In some embodiments, testing data comprising emergency calls or non-emergency calls with associated ground-truth locations is used for generating a prediction model for generating the predicted location. In some embodiments, applying the one or more attributes to an emergency location prediction system to generate a predicted location for the emergency request further comprises: (a) accessing a database comprising a set of entries, wherein each entry in the set of entries represents a unique phone call and comprises: i) a set of attributes associated with a test device from which the unique phone call was made; ii) a test location received from the test device during the unique phone call; iii) a ground-truth location associated with the unique phone call; (b) querying the database for each entry in the set of entries containing an attribute in the set of attributes associated with the test device matching the one or more attributes; (c) creating a set of vectors by calculating, for each entry in the set of entries containing an attribute in the set of attributes associated with the test device matching the one or more attributes, a distance and direction between the test location and the ground-truth location; (d) determining, based on the set of vectors, a location prediction rule defined by the one or more attributes; (e) applying the location prediction rule to the reported location to generate the predicted location. In some embodiments, determining a location prediction rule further comprises applying the set of vectors to a machine learning prediction algorithm. In some embodiments, each entry in the set of entries further comprises a multitude of test locations and a corresponding multitude of ground-truth locations. In some embodiments, each test location in the multitude of test locations is paired into a respective location pair with a corresponding ground-truth location recorded simultaneously. In some embodiments, each location pair is timestamped. In some embodiments: (a) creating a set of vectors further comprises calculating a distance and a direction between the test location and corresponding ground-truth location for each location pair; and (b) determining a location prediction rule further comprises calculating a vector rate of change based on the set of differences and the timestamps of the location pairs. In some embodiments, applying the one or more attributes to an emergency location prediction system to generate a predicted location for the emergency request further comprises applying a machine learning prediction algorithm to a database of emergency calls comprising call attributes, and a distance between the reported location and a ground-truth location, wherein the emergency calls comprise one or more emergency test calls. In some embodiments, the method further comprises dynamically updating the predicted location on a periodic interval. In some aspects, disclosed herein is a system configured to perform the method of any of the preceding embodiments. In some aspects, disclosed herein is non-transitory computer readable storage media encoded with at least one computer program including instructions executable by at least one processor to perform the method of any of the preceding embodiments.

In some aspects, disclosed herein is a method for validating a reported location, the method comprising: (a) detecting a reported location sent from a first device; (b) identifying one or more attributes associated with the first device; (c) determining a location accuracy metric for the reported location using the one or more attributes; (d) comparing the location accuracy metric to an accuracy threshold, wherein the reported location is determined to be a validated location when the location accuracy metric meets the accuracy threshold; and (e) in response to the location accuracy metric meeting the accuracy threshold, providing the validated location to one or more recipients. In some embodiments, the one or more attributes comprise manufacturer and model of the first device, network carrier information, time of emergency request (call), geographical area, zone or population density, outdoor or indoor location, device battery level, type of connection, source of location, reported location accuracy, reported location confidence. In some embodiments, the one or more recipients comprise a rideshare driver or deliveryman. In some embodiments, determining a location accuracy metric for the reported location using the one or more attributes further comprises a machine learning algorithm to a database of emergency calls comprising call attributes, and a distance between the reported location and a ground-truth location, wherein the emergency calls comprise one or more emergency test calls. In some embodiments, determining a location accuracy metric for the reported location using the one or more attributes further comprises: (a) accessing a database comprising a set of entries, wherein each entry in the set of entries represents a unique phone call and comprises: i) a set of attributes associated with a test device from which the unique phone call was made; ii) a test location received from the test device during the unique phone call; and iii) a ground truth location; (b) querying the database for each entry in the set of entries containing an attribute in the set of attributes associated with the test device matching the one or more attributes; (c) creating a set of distances by calculating, for each entry in the set of entries containing an attribute in the set of attributes associated with the test location and ground-truth location; and (d) calculating, based on the set of differences, a location accuracy metric. In some embodiments, the method further comprises detecting a request from the first device. In some embodiments, the request from the first device is a request for a rideshare or a delivery. In some embodiments, the method further comprises, in response to the location accuracy metric failing to meet the accuracy threshold, delivering a prompt to contact a user associated with the first device to the one or more recipients. In some embodiments, the prompt is delivered when the one or more recipients enter within a location radius of the reported location. In some embodiments, the method further comprises, in response to the location accuracy metric failing to meet the accuracy threshold, delivering a notification to the first device indicating that the reported location failed to be validated. In some aspects, disclosed herein is a system configured to perform the method of any of the preceding embodiments. In some aspects, disclosed herein is non-transitory computer readable storage media encoded with at least one computer program including instructions executable by at least one processor to perform the method of any of the preceding embodiments.

In some aspects, disclosed herein is a method for generating a location accuracy metric for emergency requests, the method comprising: (a) making one or more emergency calls using a calling device wherein each call comprises a call begin time, a call duration, and a call recipient; (b) obtaining at least one reported location for the emergency call at one or more times during the duration of the one or more emergency calls; (c) obtaining at least one ground-truth location for the one or more emergency calls at one or more times during the duration of the one or more emergency calls; (d) obtaining one or more attributes of the one or more emergency calls or the calling device; (e) calculating a distance between the at least one reported location and the at least one ground-truth location; (f) calculating one or more location accuracy metrics for the one or more emergency calls; and (g) associating the one or more location accuracy metrics for the one or more emergency calls with the at least one reported location, the at least one ground-truth location, and the one or more attributes. In some embodiments, the at least one reported location is a hybrid device-based location. In some embodiments, the at least one reported location is a carrier-provided location. In some embodiments, the at least one ground-truth location is obtained from a GPS device. In some embodiments, the at least one location accuracy metrics for the one or more emergency calls are saved as entries in an emergency test call database. In some embodiments, additional information is obtained and associated with the one or more emergency calls. In some aspects, disclosed herein is a system configured to perform the method of any of the preceding embodiments. In some aspects, disclosed herein is non-transitory computer readable storage media encoded with at least one computer program including instructions executable by at least one processor to perform the method of any of the preceding embodiments.

In some aspects, disclosed herein is a system for validating a reported location associated with an emergency request, the system comprising: (a) a first device configured to generate an emergency request; (b) an emergency location validation system (ELAS) configured to: i. determine a location accuracy metric for the emergency request using one or more attributes associated with the emergency request; (c) a public safety answering point (PSAP); and (d) an emergency management system (EMS) configured to: i) detect the emergency request generated by the first device; ii) identify a reported location associated with the emergency request; iii) identify the one or more attributes associated with the emergency request; iv) obtain a location accuracy metric for the emergency request from the emergency location analysis system; v) compare the location accuracy metric to a first accuracy threshold, wherein the reported location is determined to be a validated location when the location accuracy metric meets the first accuracy threshold; and vi) in response to the location accuracy metric meeting the first accuracy threshold, provide the validated location to one or more recipients comprising the public safety answering point (PSAP). In some embodiments, the emergency location analysis system (ELAS) is further configured to apply the one or more attributes associated with the emergency request to a machine learning algorithm by analyzing a database of emergency test calls comprising attributes, and a distance between the reported location and a ground-truth location. In some embodiments, the emergency location analysis system is further configured to: (a) access a database comprising a set of entries, wherein each entry in the set of entries represents a unique phone call and comprises: i) a set of attributes associated with a test device from which the unique phone call was made; ii) a test location received from the test device during the unique phone call; and iii) a ground-truth location associated with the unique phone call; (b) query the database for each entry in the set of entries containing an attribute in the set of attributes associated with the test device matching the one or more attributes; (c) create a set of distances by calculating, for each entry in the set of entries containing an attribute in the set of attributes associated with the test device matching the one or more attributes, a distance between the test location and the ground-truth location; and (d) calculate, based on the set of distances, a location accuracy metric. In some embodiments, the emergency location analysis system further comprises: (a) a pre-processing module configured to engineer features, augment missing attributes, and remove unreliable attributes; (b) a data division module configured to segregate test data for validation; (c) a design module configured to design machine learning models and select hyper-parameters; (d) a training module configured to train machine learning algorithms on training data; (e) a validation module configured to validate prediction algorithms on segregated validation data; and (f) a testing module configured to apply prediction algorithms.

In some aspects, disclosed herein is a method for validating a reported location associated with an emergency request by an emergency location analysis system (ELAS), the method comprising: (a) detecting an emergency request from a first device; (b) obtaining a reported location associated with the emergency request; (c) determining one or more attributes associated with the emergency request; (d) applying the one or more attributes to an emergency location validation system to obtain a location accuracy metric for the reported location; (e) comparing the location accuracy metric to a first accuracy threshold and tagging the reported location as a validated location when the location accuracy metric satisfies the first accuracy threshold; and (f) providing the validated location to a public safety answering point (PSAP). In some embodiments, the first accuracy threshold is a routing accuracy threshold or a dispatching accuracy threshold, wherein the dispatching accuracy threshold has a higher value than the routing accuracy threshold. In some embodiments, the method further comprises receiving a location request from the PSAP. In some embodiments, the validated location is provided to the PSAP in step (f) after receiving a location request from the PSAP for the first device. In some embodiments, the emergency request is an emergency call to a PSAP from the first device. In some embodiments, the method further comprises receiving a location request from the PSAP during the emergency call to the PSAP from the first device. In some embodiments, the validated location is displayed on a PSAP display. In some embodiments, the validated location is indicated on a digital map displayed on the PSAP display. In some embodiments, the reported location is a hybrid device-based location. In some embodiments, the hybrid device-based location is not determined using a carrier-based location detection method. In some embodiments, the hybrid device-based location is determined using location information provided by two or more device sensors. In some embodiments, the two or more device sensors include one or more of GPS, network-based technologies, Wi-Fi access points, Bluetooth beacons, barometric pressure sensors, dead reckoning using accelerometers and gyrometers. In some embodiments, the reported location is a carrier-provided location. In some embodiments, the carrier-provided location utilizes cell tower ID, cell tower triangulation, cell tower trilateration, or a combination thereof. In some embodiments, the one or more attributes comprise manufacturer and model of the first device, network carrier information, time of emergency request, geographical area, zone or population density, outdoor or indoor location, device battery level, type of connection, source of location, reported location accuracy, reported location confidence, operating system of the first device, an identifier of the first device, accelerometer speed of the first device, power saving status of the first device, Wi-Fi status of the first device, or a combination thereof. In some embodiments, the one or more attributes comprise at least one attribute determined using GPS. In some embodiments: (a) the first threshold is a routing accuracy threshold; and (b) providing the validated location to the one or more recipients in step (f) further comprises delivering an indication to the PSAP that the validated location is suitable for emergency routing. In some embodiments, the method further comprises: (a) comparing the location accuracy metric to a second accuracy threshold, wherein the second accuracy threshold is a dispatching accuracy threshold and comprises a higher degree of accuracy than the first accuracy threshold; and (b) in response to the location accuracy metric meeting the second accuracy threshold, providing the validated location to the PSAP and indicating the validated location is suitable for emergency dispatching. In some embodiments, providing the validated location to the PSAP further comprises displaying the validated location on a PSAP display. In some embodiments, the method further comprises providing the validated location to one or more recipients. In some embodiments, the one or more recipients comprise a first responder, an emergency contact associated with the first device, or a combination thereof. In some embodiments, applying the one or more attributes to a location validation system to obtain a location accuracy metric comprises analyzing the one or more attributes using an algorithm. In some embodiments, the algorithm is a machine learning algorithm. In some embodiments, the machine learning algorithm is trained using past calls comprising call attributes and location accuracy metrics. In some embodiments, the past calls used to train the machine learning algorithm comprise test calls. In some embodiments, the past calls used to train the machine learning algorithm comprise non-test calls. In some embodiments, the past calls used to train the machine learning algorithm comprise emergency calls. In some embodiments, the machine learning algorithm utilizes at least one machine learning model. In some embodiments, the at least one machine learning model comprises at least one of an artificial neural network, a support vector machine, and a decision tree. In some embodiments, applying the one or more attributes to an emergency location validation system further comprises: (a) accessing a database comprising a set of entries, wherein each entry in the set of entries represents a unique phone call and comprises: i) a set of attributes associated with a test device from which the unique phone call was made; ii) a test location received from the test device during the unique phone call; and iii) a ground-truth location associated with the unique phone call; (b) querying the database for each entry in the set of entries containing an attribute in the set of attributes associated with the test device matching the one or more attributes; (c) creating a set of distances by calculating, for each entry in the set of entries containing an attribute in the set of attributes associated with the test device matching the one or more attributes, a distance between the test location and the ground-truth location; and (d) calculating, based on the set of distances, a location accuracy likelihood. In some embodiments, the ground-truth location associated with the unique phone call is obtained from a locationing device coupled to the test device or a testing assembly. In some embodiments, the ground-truth location associated with the unique phone call is obtained using one or more locationing methods. In some embodiments, the unique phone call is an emergency call to a PSAP from the test device. In some embodiments, the unique phone call is network carrier mock emergency call. In some embodiments, the unique phone call is a voice over internet protocol (VoIP) test call. In some embodiments, calculating a location accuracy likelihood further comprises comparing the set of distances to a predicted accuracy radius reported by the test device. In some embodiments, calculating a location accuracy likelihood further comprises comparing the set of distances to a predicted accuracy radius reported by a network carrier of the test device. In some embodiments, the locationing device is a GPS device. In some embodiments, the test location is a carrier-provided phase one location. In some embodiments, the test location is a carrier-provided phase two location. In some embodiments, the test location is a hybrid device-based location. In some embodiments, detecting an emergency request from a first device further comprises receiving an SMS message comprising information regarding the emergency request. In some embodiments, detecting an emergency request from a first device further comprises receiving an HTTP post comprising information regarding the emergency request. In some embodiments, the HTTP post is received from a mobile application installed on the first device. In some embodiments, identifying one or more attributes associated with the emergency request further comprises parsing an SMS message comprising information regarding the emergency request. In some embodiments, identifying one or more attributes associated with the emergency request further comprises parsing an HTTP post comprising information regarding the emergency request. In some embodiments, identifying one or more attributes associated with the emergency request further comprise receiving a hybrid device-based location comprising information regarding the emergency request. In some embodiments, the method further comprises: (a) receiving a ground-truth location pertaining to the emergency request from the PSAP; and (b) pairing the ground-truth location with the reported location in a database. In some embodiments, the method further comprises receiving feedback regarding the validated location provided to the PSAP. In some embodiments, the method further comprises storing the feedback with the validated location in a database. In some embodiments, the feedback is received from an emergency responder. In some embodiments, the feedback is received from the emergency responder after the emergency responder arrives at the validated location. In some embodiments, the feedback is generated from the selection of a feedback button on an electronic device associated with the emergency responder. In some embodiments, the feedback is received from the PSAP. In some embodiments, the feedback is generated from the selection of a feedback button on a PSAP display. In some embodiments, applying the one or more attributes to an emergency location validation system further comprises: (a) accessing a database comprising a set of entries, wherein each entry in the set of entries represents a unique phone call and comprises: i) a set of attributes associated with a test device from which the unique phone call was made; ii) a test location received from the test device during the unique phone call; and iii) a ground-truth location; (b) querying the database for each entry in the set of entries containing an attribute in the set of attributes associated with the test device matching the one or more attributes; (c) creating a set of distances by calculating, for each entry in the set of entries containing an attribute in the set of attributes associated with the test device matching the one or more attributes, a distance between the test location and the ground-truth location; (d) calculating, based on the set of distances, a location accuracy likelihood. In some embodiments, the ground-truth location is received from a pre-surveyed building. In some embodiments, the ground-truth location includes a z-axis coordinate. In some embodiments, the ground-truth location is a building address. In some embodiments, the ground-truth location is a geographical coordinate. In some embodiments, each entry in the set of entries further comprises a multitude of test locations and a corresponding multitude of ground-truth locations. In some embodiments, creating a set of distances further comprises zipping the multitude of test locations with the corresponding multitude of ground-truth locations into a single file. In some embodiments, each test location in the multitude of test locations is paired into a respective location pair with a corresponding ground-truth location recorded simultaneously. In some embodiments, each location pair is timestamped. In some embodiments: (a) creating a set of differences further comprises calculating a distance between the test location and corresponding ground-truth location for each location pair; and (b) calculating a location accuracy likelihood further comprises calculating a distance rate of change based on the set of differences and the timestamps of the location pairs. In some embodiments, the multitude of test locations is recorded on a periodic interval during the unique phone call. In some embodiments, the periodic interval is 5 seconds. In some embodiments, the test location and the ground-truth location are recorded simultaneously. In some embodiments, the test location and the ground-truth location are timestamped. In some aspects, disclosed herein is a system configured to perform the method of any of the preceding embodiments. In some aspects, disclosed herein is non-transitory computer readable storage media encoded with at least one computer program including instructions executable by at least one processor to perform the method of any of the preceding embodiments.

In some aspects, disclosed herein is a method for validating a reported location associated with an emergency request by an emergency location analysis system (ELAS), the method comprising: (a) detecting an emergency request from a first device; (b) identifying a reported location associated with the emergency request; (c) identifying one or more attributes associated with the emergency request; (d) comparing the one or more attributes to a list of flagged attributes; (e) in response to determining that none of the one or more attributes appear on the list of problematic attributes, converting the reported location to a validated location and providing the validated location to one or more recipients comprising a public safety answering point (PSAP). In some embodiments, the one or more attributes comprise manufacturer and model of the first device, network carrier information, time of emergency request (call), geographical area, zone or population density, outdoor or indoor location, device battery level, type of connection, source of location, reported location accuracy, reported location confidence, operating system of the first device, an identifier of the first device, accelerometer speed of the first device, power saving status of the first device, or Wi-Fi status of the first device. In some embodiments, the list of flagged attributes is generated by: (a) accessing a database comprising a set of entries, wherein each entry in the set of entries represents a unique phone call and comprises: i) a set of attributes associated with a test device from which the unique phone call was made; ii) a test location received from the test device during the unique phone call; iii) a ground-truth location associated with the unique phone call; (b)

calculating, for one or more entries in the set of entries, a respective distance between the test location and the ground-truth location; (c) associating, for the one or more entries in the set of entries, the respective distance with each of the attributes in the set of attributes; (d) calculating, for one or more attributes in the database, a location accuracy likelihood based on one or more respective distances associated with the one or more attributes; and (e) flagging an attribute as a flagged attribute when the location accuracy likelihood of the attribute fails to meet an accuracy threshold. In some embodiments, location accuracy likelihoods of attributes that appear on the list of flagged attributes are compared to a higher accuracy threshold for location validation than location accuracy likelihoods of attributes that do not appear on the list of flagged attributes. In some aspects, disclosed herein is a system configured to perform the method of any of the preceding embodiments. In some aspects, disclosed herein is non-transitory computer readable storage media encoded with at least one computer program including instructions executable by at least one processor to perform the method of any of the preceding embodiments.

In some aspects, disclosed herein is a method for improving the location accuracy associated with a reported location of an emergency request, the method comprising: (a) detecting an emergency request from a first device; (b) identifying a reported location associated with the emergency request; (c) identifying one or more attributes associated with the emergency request; (d) inputting the one or more attributes into an emergency location analysis system; (e) defining one or more location improvement rules determined by the emergency location analysis system using the one or more attributes associated with the emergency request; (f) applying the one or more location refinement rules to the reported location to generate an improved location; and (g) providing the improved location to one or more recipients comprising a public safety answering point (PSAP). 192. The method of embodiment 191, wherein the one or more attributes comprise manufacturer and model of the first device, network carrier information, time of emergency request (call), geographical area, zone or population density, outdoor or indoor location, device battery level, type of connection, source of location, reported location accuracy, reported location confidence, operating system of the first device, an identifier of the first device, accelerometer speed of the first device, power saving status of the first device, or Wi-Fi status of the first device. In some embodiments, the emergency request is an emergency call to a PSAP from the first device. In some embodiments, the method further comprises receiving a location request from the PSAP during the emergency call. In some embodiments, the method further comprises dynamically updating and redelivering the improved location to the PSAP during the emergency call. In some embodiments, the improved location is dynamically updated on a periodic interval. In some embodiments, providing the improved location to one or more recipients comprising a public safety answering point (PSAP) further comprises delivering an indication to the PSAP that the improved location is distinct from the reported location. In some embodiments, the location refinement rule defined by the one or more attributes is a vector transformation. In some embodiments, applying the one or more location refinement rules to the reported location to generate an improved location further comprises applying a vector transformation to the reported location. In some embodiments, defining one or more location improvement rules determined by the emergency location analysis system using the one or more attributes associated with the emergency request further comprises: (a) accessing a database comprising a set of entries, wherein each entry in the set of entries represents a unique phone call and comprises: i) a set of attributes associated with a test device from which the unique phone call was made; ii) a test location received from the test device during the unique phone call; iii) a ground-truth location associated with the unique phone call; (b) querying the database for each entry in the set of entries containing an attribute in the set of attributes associated with the test device matching the one or more attributes; (c) creating a set of vectors by calculating, for each entry in the set of entries containing an attribute in the set of attributes associated with the test device matching the one or more attributes, a distance and direction between the test location and the ground-truth location; and (d) determining, based on the set of vectors, a location improvement rule defined by the one or more attributes. In some embodiments, each entry in the set of entries further comprises a multitude of test locations and a corresponding multitude of ground-truth locations. In some embodiments, the multitude of test locations is recorded on a periodic interval during the unique phone call. In some embodiments, the periodic interval is 5 seconds. In some embodiments, each test location in the multitude of test locations is paired into a respective location pair with a corresponding ground-truth location recorded simultaneously. In some embodiments, each location pair is time-stamped. In some embodiments: (a) creating a set of vectors further comprises calculating a distance and a direction between the test location and corresponding ground-truth location for each location pair; and (b) defining one or more location improvement rules further comprises calculating a vector rate of change based on the set of differences and the timestamps of the location pairs. In some embodiments, applying the one or more location improvement rules to the reported location to generate a refined location further comprises: (a) calculating a distance between the reported location and a user-defined location; (b) comparing the distance to a proximity threshold; and (c) in response to the distance meeting the proximity threshold, generating the refined location by snapping the reported location to the user-defined location. In some embodiments, the user-defined location is stored on the first device. In some embodiments, the user-defined location is received through a mobile application installed on the first device. In some embodiments, the user-defined location is a home or work address of a user associated with the first device. In some embodiments, the method further comprises: (a) receiving a ground-truth location pertaining to the emergency request; and (b) pairing the ground-truth location with the refined location in a database. In some embodiments, the ground-truth location is received from the PSAP. In some embodiments, the ground-truth location is received from an emergency responder. In some embodiments, the ground-truth location is sent from an electronic device associated with the emergency responder. In some aspects, disclosed herein is a system configured to perform the method of any of the preceding embodiments. In some aspects, disclosed herein is non-transitory computer readable storage media encoded with at least one computer program including instructions executable by at least one processor to perform the method of any of the preceding embodiments.

In some aspects, disclosed herein is a method for generating a predicted location associated with an emergency request by an emergency location analysis system (ELAS), the method comprising: (a) detecting an emergency request from a first device; (b) identifying a reported location associated with the emergency request; (c) identifying one or more attributes associated with the emergency request; (d) inputting the one or more attributes into an emergency location analysis system to generate a predicted location for the emergency request; (e) providing the predicted location to one or more recipients, wherein the recipients comprise a public safety answering point (PSAP). In some embodiments, the one or more attributes comprise manufacturer and model of the first device, network carrier information, time of emergency request (call), geographical area, zone or population density, outdoor or indoor location, device battery level, type of connection, source of location, reported location accuracy, reported location confidence, operating system of the first device, an identifier of the first device, accelerometer speed of the first device, power saving status of the first device, or Wi-Fi status of the first device. In some embodiments, the predicted location is generated on a real-time or near-time basis after the emergency request is detected. In some embodiments, the method further comprises determining, based on the one or more attributes, that the reported location is likely to be dynamic. In some embodiments, step (d) comprises applying one or more machine learning algorithms to generate the predicted location. In some embodiments, testing data comprising emergency calls or non-emergency calls with associated ground-truth locations are used for generating a prediction algorithm for generating the predicted location. In some embodiments, step (d) comprises applying statistical analysis to generate the predicted location. In some embodiments, testing data comprising emergency calls or non-emergency calls with associated ground-truth locations are used for generating a prediction model for generating the predicted location. In some embodiments, applying the one or more attributes to an emergency location prediction system to generate a predicted location for the emergency request further comprises: (a) accessing a database comprising a set of entries, wherein each entry in the set of entries represents a unique phone call and comprises: i) a set of attributes associated with a test device from which the unique phone call was made; ii) a test location received from the test device during the unique phone call; iii) a ground-truth location associated with the unique phone call; (b) querying the database for each entry in the set of entries containing an attribute in the set of attributes associated with the test device matching the one or more attributes; (c) creating a set of vectors by calculating, for each entry in the set of entries containing an attribute in the set of attributes associated with the test device matching the one or more attributes, a distance and direction between the test location and the ground-truth location; (d) determining, based on the set of vectors, a location prediction rule defined by the one or more attributes; (e) applying the location prediction rule to the reported location to generate the predicted location. In some embodiments, determining a location prediction rule further comprises applying the set of vectors to a machine learning prediction algorithm. In some embodiments, each entry in the set of entries further comprises a multitude of test locations and a corresponding multitude of ground-truth locations. In some embodiments, each test location in the multitude of test locations is paired into a respective location pair with a corresponding ground-truth location recorded simultaneously. In some embodiments, each location pair is timestamped. In some embodiments: (a) creating a set of vectors further comprises calculating a distance and a direction between the test location and corresponding ground-truth location for each location pair; and (b) determining a location prediction rule further comprises calculating a vector rate of change based on the set of differences and the timestamps of the location pairs. In some embodiments, applying the one or more attributes to an emergency location prediction system to generate a predicted location for the emergency request further comprises applying the one or more attributes to a machine learning prediction algorithm by analyzing a database of emergency test calls comprising call attributes, and a distance between the reported location and a ground-truth location. In some embodiments, the method further comprises dynamically updating the predicted location on a periodic interval. In some aspects, disclosed herein is a system configured to perform the method of any of the preceding embodiments. In some aspects, disclosed herein is non-transitory computer readable storage media encoded with at least one computer program including instructions executable by at least one processor to perform the method of any of the preceding embodiments.

In some aspects, disclosed herein is a method for validating a reported location by a location analysis system (LAS), the method comprising: (a) detecting a reported location sent from a first device; (b) identifying one or more attributes associated with the first device; (c) applying the one or more attributes to a location analysis system to obtain a location accuracy likelihood of the reported location; (d) comparing the location accuracy likelihood to an accuracy threshold wherein the reported location is converted to a validated location when the location accuracy likelihood meets the accuracy threshold; and (e) in response to the location accuracy likelihood meeting the accuracy threshold, providing the validated location to one or more recipients. In some embodiments, the one or more attributes comprise manufacturer and model of the first device, network carrier information, time of emergency request (call), geographical area, zone or population density, outdoor or indoor location, device battery level, type of connection, source of location, reported location accuracy, reported location confidence. In some embodiments, the one or more recipients comprise a rideshare driver or deliveryman. In some embodiments, applying the one or more attributes to a location validation system to obtain a location accuracy likelihood further comprises applying the one or more attributes to a machine learning algorithm by analyzing a database of emergency test calls comprising call attributes, and a distance between the reported location and a ground-truth location. In some embodiments, applying the one or more attributes to a location validation system to obtain a location accuracy likelihood further comprises: (a) accessing a database comprising a set of entries, wherein each entry in the set of entries represents a unique phone call and comprises: i) a set of attributes associated with a test device from which the unique phone call was made; ii) a test location received from the test device during the unique phone call; and iii) a ground truth location; (b) querying the database for each entry in the set of entries containing an attribute in the set of attributes associated with the test device matching the one or more attributes; (c) creating a set of distances by calculating, for each entry in the set of entries containing an attribute in the set of attributes associated with the test location and ground-truth location; and (d) calculating, based on the set of differences, a location accuracy likelihood. In some embodiments, the method further comprises detecting a request from the first device. In some embodiments, the request from the first device is a request for a rideshare or a delivery. In some embodiments, the method further comprises, in response to the location accuracy likelihood failing to meet the accuracy threshold, delivering a prompt to contact a user associated with the first device to the one or more recipients. In some embodiments, the prompt is delivered when the one or more recipients enter within a location radius of the reported location. In some embodiments, the method further comprises, in response to the location accuracy likelihood failing to meet the accuracy threshold, delivering a notification to the first device indicating that the reported location failed to be validated. In some aspects, disclosed herein is a system configured to perform the method of any of the preceding embodiments. In some aspects, disclosed herein is non-transitory computer readable storage media encoded with at least one computer program including instructions executable by at least one processor to perform the method of any of the preceding embodiments.

In some aspects, disclosed herein is a method for generating a location accuracy likelihood for emergency requests, the method comprising: (a) making one or more emergency calls using a calling device wherein each call comprises a call begin time, a call duration, and a call recipient; (b) obtaining at least one reported location for the emergency call at one or more times during the duration of the one or more emergency calls; (c) obtaining at least one ground-truth location for the one or more emergency calls at one or more times during the duration of the one or more emergency calls; (d) obtaining one or more attributes of the one or more emergency calls or the calling device; (e) calculating a distance between the at least one reported location and the at least one ground-truth location; (f) calculating one or more location accuracy likelihoods for the one or more emergency calls; and (g) associating the one or more location accuracy likelihoods for the one or more emergency calls with the at least one reported location, the at least one ground-truth location, and the one or more attributes. In some embodiments, the at least one reported location is a hybrid device-based location. In some embodiments, the at least one reported location is a carrier-provided location. In some embodiments, the at least one ground-truth location is obtained from a GPS device. In some embodiments, the at least one location accuracy likelihoods for the one or more emergency calls are saved as entries in an emergency test call database. In some embodiments, additional information is obtained and associated with the one or more emergency calls. In some aspects, disclosed herein is a system configured to perform the method of any of the preceding embodiments. In some aspects, disclosed herein is non-transitory computer readable storage media encoded with at least one computer program including instructions executable by at least one processor to perform the method of any of the preceding embodiments.

In some aspects, disclosed herein is a system for validating a reported location associated with an emergency request by an emergency location analysis system (ELAS), the system comprising: (a) a first device; (b) an emergency location validation system (ELAS); (c) a public safety answering point (PSAP); and (d) an emergency management system (EMS) configured to: i) detect an emergency request from the first device; ii) identify a reported location associated with the emergency request; iii) identify one or more attributes associated with the emergency request; iv) apply the one or more attributes to the emergency location validation system to obtain a location accuracy likelihood for the emergency request; v) compare the location accuracy likelihood to a first accuracy threshold wherein the reported location is converted to a validated location when the location accuracy likelihood meets the first accuracy threshold; and vi) in response to the location accuracy likelihood meeting the first accuracy threshold, provide the validated location to one or more recipients comprising the public safety answering point (PSAP). In some embodiments, the emergency location analysis system (ELAS) is further configured to apply the one or more attributes associated with the emergency request to a machine learning algorithm by analyzing a database of emergency test calls comprising attributes, and a distance between the reported location and a ground-truth location. In some embodiments, the emergency location analysis system is further configured to: (a) access a database comprising a set of entries, wherein each entry in the set of entries represents a unique phone call and comprises: i) a set of attributes associated with a test device from which the unique phone call was made; ii) a test location received from the test device during the unique phone call; and iii) a ground-truth location associated with the unique phone call; (b) query the database for each entry in the set of entries containing an attribute in the set of attributes associated with the test device matching the one or more attributes; (c) create a set of distances by calculating, for each entry in the set of entries containing an attribute in the set of attributes associated with the test device matching the one or more attributes, a distance between the test location and the ground-truth location; and (d) calculate, based on the set of distances, a location accuracy likelihood. In some embodiments, the emergency location analysis system further comprises: (a) a pre-processing module configured to engineer features, augment missing attributes, and remove unreliable attributes; (b) a data division module configured to segregate test data for validation; (c) a design module configured to design machine learning models and select hyper-parameters; (d) a training module configured to train machine learning algorithms on training data; (e) a validation module configured to validate prediction algorithms on segregated validation data; and (f) a testing module configured to apply prediction algorithms.

BRIEF DESCRIPTION OF THE DRAWINGS

The novel features of the present invention of the instant application are set forth with particularity in the appended claims. A better understanding of the features and advantages of the present invention will be obtained by reference to the following detailed description that sets forth illustrative embodiments, in which the principles of the present invention are utilized, and the accompanying drawings of which:

FIGS. 4A, 4B, and 4C illustrate embodiments of emergency test calls;

FIGS. 6A, 6B, 6C, and 6D show illustrative examples of analyses of emergency test calls;

FIG. 8 depicts an embodiment of an emergency test call database;

FIG. 14A and FIG. 14B depict views of information displayed at an emergency dispatch center (e.g., a public safety answering point).

DETAILED DESCRIPTION

Figure 1A:
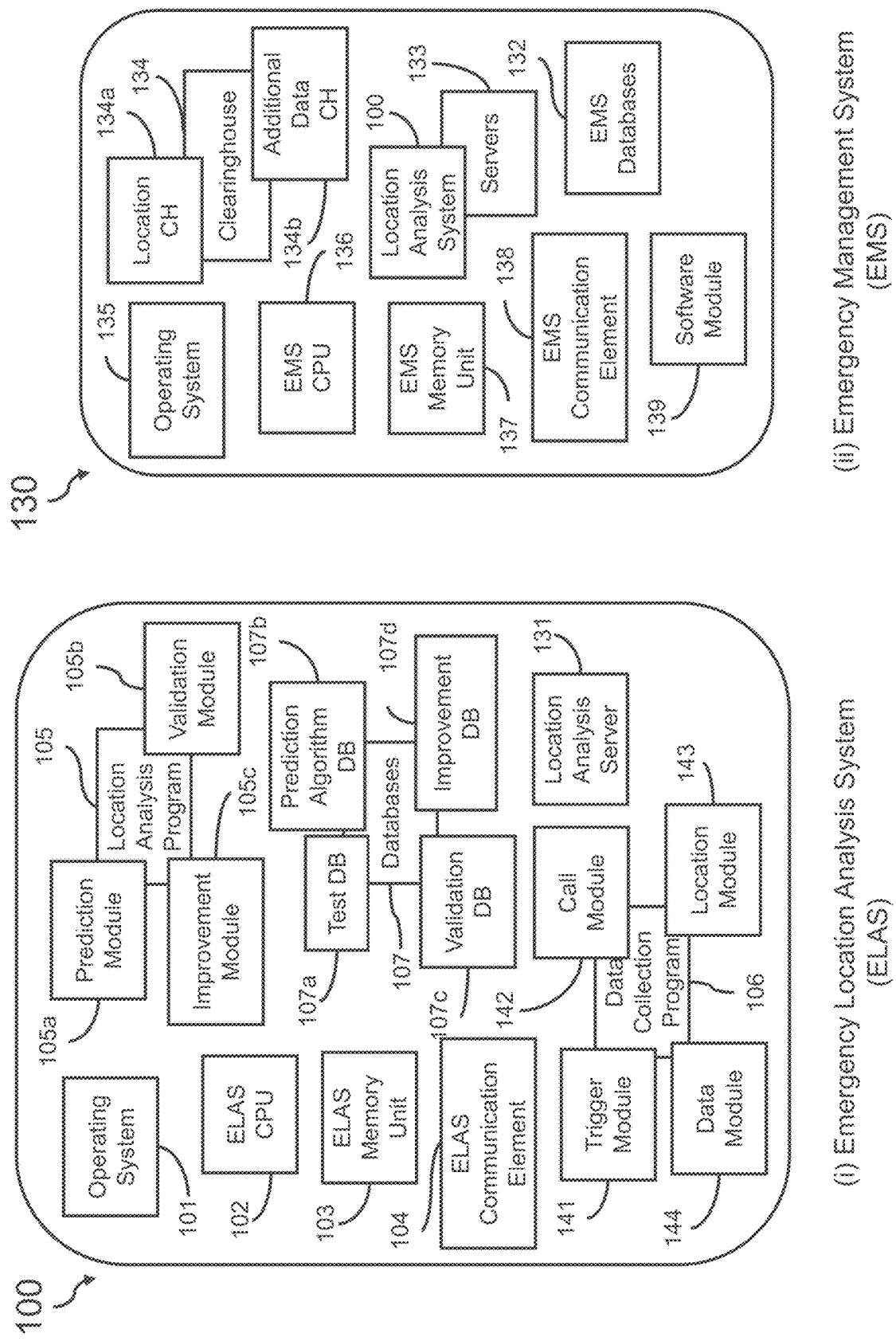
FIG. 1A depicts an embodiment of an emergency location analysis system (ELAS) and an emergency management system (EMS)

In some aspects, the present disclosure leverages recent technological advancements to generate accurate locations for emergency communications such as, for example, GPS, Wi-Fi, and Bluetooth that are usable for generating device-based hybrid locations. Device-based hybrid locations are locations calculated on an electronic or communication device, as opposed to locations calculated using a network (e.g., carrier network triangulation). Device-based hybrid locations can be generated using one or more of GPS, network-based technologies, Wi-Fi access points, Bluetooth beacons, barometric pressure sensors, dead reckoning using accelerometers and gyrometers, and a variety of crowd-sourced and proprietary databases that device operating systems providers are running to enhance location technology. These device-based hybrid locations can be quickly generated during emergency calls. Using device-based hybrid locations, emergency service providers are able to more efficiently find and aid persons implicated in emergency situations.

Location Analysis Overview

The systems, methods, and media provided in the present disclosure as described herein allow for the application of one or more rules and/or algorithms towards communication data (e.g., caller or calling device data for emergency requests and responses) to generate one or more prediction models for making predictions. In some embodiments, a prediction comprises a predicted distance from ground truth (e.g., the actual location). In some embodiments, a prediction corresponds to a predicted location. As an example, a prediction comprises a predicted location at XX.XXX/YY.YYYY (latitude/longitude). In some embodiments, the prediction model is based on a particular emergency type and makes predictions corresponding to the emergency type. Alternatively, in some embodiments, the prediction model is not based on a particular emergency type and represents a generalized prediction model.

In some embodiments, an emergency type is a police emergency. In some embodiments, an emergency type is a fire emergency. In some embodiments, an emergency type is a medical emergency. In some embodiments, an emergency type is a vehicle emergency (e.g., a traffic accident). In some embodiments, an emergency type includes more than one of a police emergency, fire emergency, or medical emergency. In some embodiments, an emergency type includes more than one of a police emergency, a fire emergency, a medical emergency, or a vehicle emergency. In some embodiments, emergency data comprises one or more emergency types defined by an emergency dispatch center from which the emergency data is obtained. In some embodiments, an emergency type is a terrorism emergency, a natural disaster emergency, or an industrial accident emergency.

In some embodiments, the systems, methods, and media described herein are customizable by an admin, a user, an emergency management system (EMS), or an emergency dispatch center (EDC) to automatically provide one or more predictions on a regular basis. In some embodiments, the systems, methods, and media described herein are customized instructions on whether to send or hold a reported location from a device. In some embodiments, the customized instructions comprise one or more rules for reporting the device location. In some embodiments, the admin, user, EMS, or EDC generates the instructions by choosing from a selection of options (e.g., rules). As an example, a rule may specify that the location is to be reported only when the prediction indicates the location meets an accuracy threshold (e.g., a threshold of at least an 80% likelihood of being within 20 meters of the ground truth location).

In some embodiments, the systems, methods, and media of the present disclosure enable an EMS or ELAS to provide a validated location for the emergency response. In some embodiments, the accuracy threshold is indicative of a minimum location accuracy percentage. In some embodiments, the accuracy threshold is at least 10%, 15%, 20%, 25%, 30%, 35%, 40%, 45%, 50%, 60%, 70%, 80%, 90%, 95%, or 99% or more, including increments therein. In some embodiments, one or more defined thresholds are assigned a value set by an administrator, user, EMC, EDC, or subject.

Regression Analysis

In some embodiments, regression analysis is used to generate predictions such as, for example, estimated distance from ground-truth for an emergency request. Regression analysis is a class of modeling techniques that uses data to establish a mathematical relationship between different variables (regression features). Regression analysis includes techniques that usually focus on understanding how the values of a "dependent or response" variable change when one or more "independent or predictor" variables change. In some embodiments, regression analysis is used to determine a dependent variable such as location accuracy based on predictor variables obtained from emergency request data. In some embodiments, predictor variables include one or more of attributes listed in Table 1.

In some embodiments, regression analysis is linear regression. In linear regression, the dependent variable is a numerical outcome. Predictions for the dependent variable are modeled using a linear combination of the predictor variables (or transformed predictor variables). The unknown model parameters are then estimated from the data. In some embodiments, linear regression analysis is used when at least one of the following assumptions can be made: 1) the predictor variables should be in a linear relationship with the numerical dependent variable; 2) errors (residuals) should be independent and normally distributed; 3) there should be no or little multicollinearity (the predictor variables should not be in a linear relationship among themselves); 4) the variance of the errors (residuals) should be approximately the same across all levels of the predictor functions (homoscedasticity). In some embodiments, data for the predictor variables and the data for the dependent variable are the inputs of the model. In some embodiments, the output is a linear equation, fitted via Ordinary Least Squares (OLS), relating the predictor and response variables (or functions).

In some embodiments, regression analysis is logistic regression. In logistic regression, the dependent variable is a binary outcome (e.g., yes/no, usually coded as I/O). A logistic model is used to estimate the probability of the binary outcomes (instead of the exact outcome) based on one or more predictor variables. In some embodiments, for example, logistic regression allows a determination as to whether the presence of a feature (variable) increases the probability of a given outcome by a specific percentage. In some embodiments, a logarithm of the odds-ratio (which is the probability of the outcome of interest divided by the probability of the other outcome) is modeled as a linear combination of the predictor variables. In some embodiments, logistic regression is used when at least one of the following assumptions can be made: 1) the predictor variables should be in a linear relationship with the logarithm of the odds ratio; 2) errors (residuals) should be independent and follow a logistic distribution; 3) there should be little multicollinearity (the predictor variables should not be in a linear relationship among themselves). In some embodiments, data for the dependent variables and the data for the predictor variables are the inputs of the model. In some embodiments, the output is a linear equation, fitted via Maximum Likelihood Estimation (MLE), relating the predictor variables and the logarithm of the odds-ratio. In some embodiments, multinomial and/or ordinal logistic regression is used for regression analysis when the dependent variables have more than two outcomes. In some embodiments, probit regression is used for regression analysis. Probit regression is similar to logistic regression, with a main difference being that the error term follows a logistic distribution with mean zero in the logistic model, whereas the error follows a normal distribution with mean zero in the probit model.

In some embodiments, a non-regression-based analysis is used in the systems, methods, and media described herein. An example of a non-regression-based analysis is time series analysis. Time series analysis comprises methods for analyzing time series data in order to extract meaningful statistics and other characteristics of the data. Time series forecasting uses a model to predict future values based on previously observed values.

Prediction Algorithms

In some embodiments, the systems, methods, and media described herein use one or more algorithms for making predictions such as location accuracy metrics associated with emergency communications. In some embodiments, machine learning algorithms are used for training prediction models and/or making predictions.

Various algorithms can be used to generate models that predict the accuracy of a location. In some instances, machine learning methods are applied to the generation of such models. In some cases, a model predicts a location accuracy metric with higher accuracy than a heuristic method, and optionally provides a confidence level of the prediction.

In some embodiments, a machine learning algorithm uses a supervised learning approach. In supervised learning, the algorithm generates a function from labeled training data. Each training example is a pair consisting of an input object and a desired output value. In some embodiments, an optimal scenario allows for the algorithm to correctly determine the class labels for unseen instances. In some embodiments, a supervised learning algorithm requires the user to determine one or more control parameters. These parameters are optionally adjusted by optimizing performance on a subset, called a validation set, of the training set. After parameter adjustment and learning, the performance of the resulting function is optionally measured on a test set that is separate from the training set. Regression methods are commonly used in supervised learning. Accordingly, supervised learning allows for a model or classifier to be generated or trained with training data in which the expected output is known in advance such as when the ground truth location for a communication is known.

In some embodiments, a machine learning algorithm uses an unsupervised learning approach. In unsupervised learning, the algorithm generates a function to describe hidden structures from unlabeled data (e.g., a classification or categorization is not included in the observations). Since the examples given to the learner are unlabeled, there is no evaluation of the accuracy of the structure that is output by the relevant algorithm. Approaches to unsupervised learning include: clustering, anomaly detection, and neural networks.

In some embodiments, a machine learning algorithm uses a semi-supervised learning approach. Semi-supervised learning combines both labeled and unlabeled data to generate an appropriate function or classifier. Semi-supervised learning is usually used in data augmentation.

In some embodiments, a machine learning algorithm uses a reinforcement learning approach. In reinforcement learning, the algorithm learns a policy of how to act given an observation of the world. Every action has some impact in the environment, and the environment provides feedback that guides the learning algorithm.

In some embodiments, a machine learning algorithm learns in batches based on the training dataset and other inputs for that batch. In other embodiments, the machine learning algorithm performs on-line learning where the weights and error calculations are constantly updated.

In some embodiments, a machine learning algorithm uses a transduction approach. Transduction is similar to supervised learning, but does not explicitly construct a function. Instead, tries to predict new outputs based on training inputs, training outputs, and new inputs.

In some embodiments, a machine learning algorithm uses a "learning to learn" approach. In learning to learn, the algorithm learns its own inductive bias based on previous experience.

In some embodiments, a machine learning algorithm is applied to new or updated emergency data to be re-trained to generate a new prediction model. In some embodiments, a machine learning algorithm or model is re-trained periodically. In some embodiments, a machine learning algorithm or model is re-trained non-periodically. In some embodiments, a machine learning algorithm or model is re-trained at least once a day, a week, a month, or a year or more. In some embodiments, a machine learning algorithm or model is re-trained at least once every 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days or more.

In some instances, machine learning methods are applied to select, from a plurality of models generated, one or more particular models that are more applicable to certain attributes. In some embodiments, different models are generated depending on the distinct sets of attributes obtained for various communications. As an example, different models are used to calculate a location accuracy metric or prediction depending on the emergency type associated with the communication (e.g., police, fire, medical, or vehicular). Alternatively or in combination, the threshold and/or rule(s) used to determine whether to provide a location to the recipient (e.g., EDC, PSAP) are altered based on attributes associated with a communication. In some embodiments, a relatively higher threshold for reporting a detected location to the PSAP is used in circumstances when reporting an inaccurate location to the PSAP is likely to be more detrimental than in alternative circumstances. As a non-limiting illustrative example, a lower threshold is used when the communication pertains to an ongoing violent crime because the presence of first responders may help mitigate continued violence even if the responders are arriving at a location that is inaccurate (e.g., the sound of police sirens may scare off the assailant).

In some embodiments, the classifier or trained algorithm of the present disclosure comprises one feature space. In some cases, the classifier comprises two or more feature spaces. In some embodiments, the two or more feature spaces are distinct from one another. In various embodiments, each feature space comprise types of attributes associated with a communication such as network carrier, make/model of the communication device, reported geographic location, or other information relevant to location accuracy. In some embodiments, the accuracy of the classification or prediction is improved by combining two or more feature spaces in a classifier instead of using a single feature space. The attributes generally make up the input features of the feature space and are labeled to indicate the classification of each communication for the given set of input features corresponding to that communication. In many cases, the classification is the location accuracy metric or a prediction of location accuracy.

In some embodiments, a machine learning algorithm is provided with unlabeled or unclassified data for unsupervised learning, which leaves the algorithm to identify hidden structure amongst the cases (e.g., clustering). In some embodiments, unsupervised learning is used to identify the representations that are most useful for classifying raw data (e.g., identifying features that help separate communications into separate cohorts that may be analyzed using different models and/or evaluated with different thresholds or rules). For example, unsupervised learning is capable of identifying hidden patterns such as relationships between certain features from the data in the knowledge base that would not be readily apparent to a human.

In some embodiments, one or more sets of training data are generated and provided to an emergency location validation system comprising one or more algorithms for making predictions. In some embodiments, an algorithm utilizes a predictive model such as a neural network, a decision tree, a support vector machine, or other applicable model. Using the training data, an algorithm is able to form a classifier for generating a classification or prediction according to relevant features. The features selected for classification can be classified using a variety of viable methods. In some embodiments, the trained algorithm comprises a machine learning algorithm. In some embodiments, the machine learning algorithm is selected from at least one of a supervised, semi-supervised and unsupervised learning, such as, for example, a support vector machine (SVM), a Naïve Bayes classification, a random forest, an artificial neural network, a decision tree, a K-means, learning vector quantization (LVQ), regression algorithm (e.g., linear, logistic, multivariate), association rule learning, deep learning, dimensionality reduction and ensemble selection algorithms. In some embodiments, the machine learning algorithm is a support vector machine (SVM), a Naïve Bayes classification, a random forest, or an artificial neural network. Machine learning techniques include bagging procedures, boosting procedures, random forest algorithms, and combinations thereof.

In some embodiments, a machine learning algorithm such as a classifier is tested using data that was not used for training to evaluate its predictive ability. In some embodiments, the predictive ability of the classifier is evaluated using one or more metrics. These metrics include accuracy, specificity, sensitivity, positive predictive value, negative predictive value, which are determined for a classifier by testing it against a set of independent cases (e.g., communications). In some instances, an algorithm has an accuracy of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein. In some instances, an algorithm has a specificity of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein. In some instances, an algorithm has a sensitivity of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein. In some instances, an algorithm has a positive predictive value of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein. In some instances an algorithm has a negative predictive value of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein.

In some embodiments, the machine learning algorithm is a classifier or trained algorithm. In some embodiments, the trained algorithm of the present disclosure is used for making one or more predictions pertaining to location accuracy (e.g., generates a location accuracy metric). In some embodiments, the prediction comprises stratifying an emergency communication into two or more location accuracy categories. As an example, a prediction classifies an emergency phone call into a low location accuracy, medium location accuracy, or high location accuracy category based on one or more attributes associated with the call. In some embodiments, one or more selected feature spaces such as the associated attribute data are provided to a trained algorithm. In some embodiments, algorithms include methods that analyze numerous variables directly and are selected from a non-limiting group of algorithms including methods based on machine learning processes.

Data Augmentation

In some embodiments, the systems, methods, and media described herein provide for data augmentation. In some embodiments, data augmentation comprises predicting attributes for emergency request data and incorporating or adding the predicted attributes to the unlabeled emergency data to generate augmented emergency data. Fragmentation of emergency services often results in variation in the type of emergency data available in different areas. Moreover, the combination of public and private emergency service providers can lead to distinct pools of emergency data in the same emergency jurisdiction (e.g., a county or city). The lack of standardization and/or harmonization of these data pools poses a challenge to generating effective models. Consequently, the data pools have to be modeled separately, which can result in a loss of predictive power if a given data pool lacks sufficient data to generate a robust model. Moreover, in some instances, a data pool that is unlabeled cannot be used for certain models for generating predictions based on data labels. Accordingly, data augmentation allows unlabeled data to be enhanced with label predictions, thereby expanding the pool of available "labeled" data for further analysis and/or modeling. For example, in some embodiments, labeled data is matched with unlabeled data to generate matched data. In some embodiments, the matched data is used to train a prediction algorithm.

In some embodiments, a machine learning algorithm is trained to predict labels for unlabeled data based on training data. This allows for gaps in actual data to be filled in where possible. For example, the algorithm is able to detect that the presence of a certain attribute A has high correlation with another attribute B, and accordingly generates a prediction of the presence of B whenever A is identified, and vice versa. Accordingly, a more complete data set comprising relevant attributes is generated from unlabeled data. In some embodiments, a machine learning algorithm for predicting location accuracy incorporates the augmentation status (e.g., whether the attribute is an actual value or a predicted value) of an attribute as a feature (since data augmentation may have an impact on location accuracy).

In some embodiments, data augmentation comprises supplementing or augmenting emergency data with additional data/information from another source. In some embodiments, attributes are augmented, which may affect location accuracy. For example, in addition to type of location and whether the reported location is indoor or outdoor, other environmental data is added to augment the data set such as weather (cloud coverage, precipitation, temperature, etc.).

Data Summary

As used herein, "data" refers to a collection of information about one or more entities (e.g., user of a user communication device) and/or an environment that pertains to characteristics of the one or more entities. In some embodiments, an entity is a person. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by the current emergency situation. As an example, two unrelated users are involved in a vehicular collision, and each user sends a separate emergency request (for traffic accident) using his/her communication device. In this example, the separate emergency requests are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location information from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

In some embodiments, data associated with a communication such as an emergency call is used to extract attributes relevant to location accuracy.

In some embodiments, data is emergency data or "emergency request data." In some embodiments, emergency data comprises data for emergency communications such as, for example, emergency time (e.g., time of emergency call), emergency location (e.g., location of caller), emergency type (e.g., fire, police, or medical emergency), or any combination thereof. In some embodiments, emergency data is proprietary emergency data. In some embodiments, emergency data is unlabeled emergency data. Unlabeled emergency data has limited information such as, for example, emergency time and emergency location while lacking attributes such as device manufacturer, operating system, carrier information, carrier-provided location, etc. In some embodiments, unlabeled emergency data has missing labels or attributes or unknown attributes. In some embodiments, emergency data is included in emergency alerts generated by communication devices, such as in response to a user sending an emergency request. For example, in some embodiments, when a user sends an emergency request by calling 9-1-1 on a communication device, the communication device generates an emergency alert including emergency data. The communication device can then transmit the emergency alert to one or more recipients.

In some embodiments, data comprises electronic information stored on a server. In some embodiments, data comprises information obtained from communication devices such as, for example, a landline phone. In some embodiments, data comprises information obtained from wireless mobile devices such as, for example, a smart phone. In some embodiments, data comprises information stored in a database. In some embodiments, data comprises information for environmental conditions ("environment data") such as, for example, dense cloud conditions.

In some embodiments, unlabeled emergency data is augmented by merging, combining, or incorporating label information from labeled emergency data. Augmented emergency data comprises data from both unlabeled emergency data and labeled emergency data. In some embodiments, unlabeled or labeled emergency data is augmented with additional information such as, for example, environment data. In some embodiments, environment data corresponding to emergency data is identified based on emergency time and emergency location. For example, environment data such as weather is capable of being identified based on a specific time and location.

Emergency data refers to information about emergencies that have occurred or are on-going including the location of the emergency (e.g., latitude/longitude, altitude, etc.), the time of the emergency (e.g., date and time), or any combination thereof.

In some cases, the emergency data comprises an emergency call log with basic information such as a timestamp, GPS coordinates, and type of emergency (e.g., as indicated by the subject). In some embodiments, the emergency data comprises a ground-truth. In some embodiments, emergency data is sourced from one or more EMS that receives, routes, monitors, or bridges emergency calls. In some embodiments, the EMS serves as a conference bridge for emergency alerts and calls from subjects with emergency dispatch center(s) such as PSAPs. In addition, the emergency data is obtained from publicly available data about emergencies.

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

Modern communication devices, for example, smart phones, tablet computers, wearable communication devices, smart sensor devices and/or systems are often equipped with a variety of features for determining location information of the communication device using, for example, GPS, or triangulation with cellular phone towers. Modern communication devices also often include functionality to store data regarding a user of the communication device, for example, health information about the user.

In some embodiments, the communication device (or communication module of the device) communicates with a recipient through one or more data channels. In some embodiments, the recipient is an emergency management system. In some embodiments, the EMS routes communications to an EDC. In further embodiments, the EMS establishes a first data channel with the communication device and a second data channel between the EMS and the EDC, wherein the EMS bridges the first and second data channels to enable the communication device and the EDC to communicate. In some embodiments, the EMS converts data (e.g., data set) from the communication device into a format suitable for the EDC (e.g., analog or digital, audio, SMS, data, etc.) before sending or routing the formatted data to the EDC. In some embodiments, the EMS routes communications to a device associated with a first responder. In some embodiments, the communication device relays additional communications, information, and/or data sent or shared between member devices in the group of devices to the EMS or EDC after a request for assistance has been sent. In further embodiments, the additional information is relayed to the EMS or EDC after the request for assistance has been sent in order to provide current information that is relevant to the request. For example, in some instances, communications between member devices contain information relevant to the emergency (e.g., information that the user of member device who is experiencing a medical emergency suffers from diabetes). Accordingly, in some embodiments, the information is sent autonomously, at request of a user of the communication device, or at request of the recipient of the communication (e.g., EMS, EDC, first responder, etc.).

Devices, Programs, and Systems

Figure 1B:
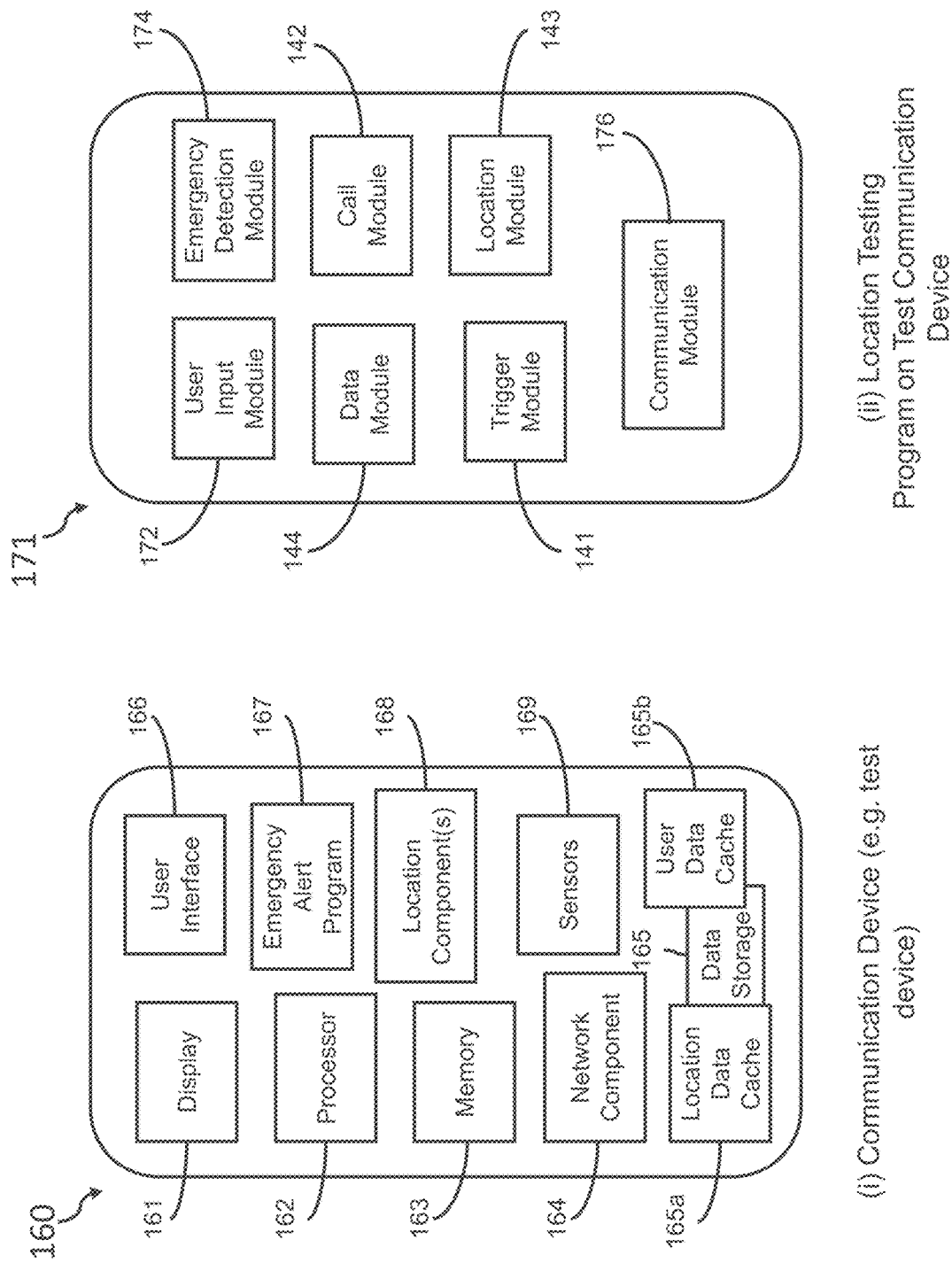
FIG. 1B depicts an embodiment of a communication device and a location testing program.
Figure 1C:
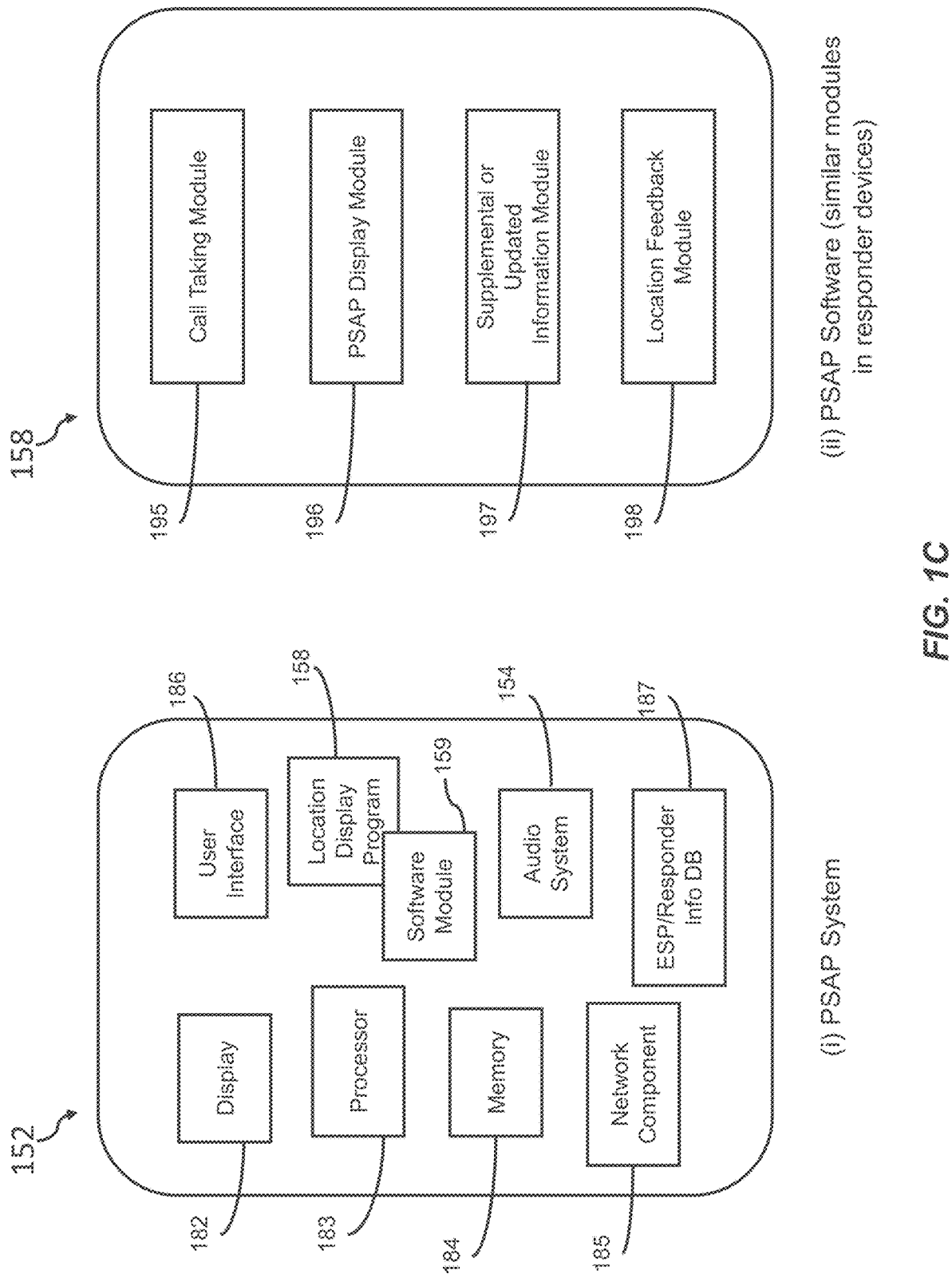
FIG. 1C depicts an embodiment of a public safety answering point (PSAP) system and PSAP software.

FIGS. 1A-1C depict embodiments of (i) an emergency location analysis system (ELAS) 100, (ii) an emergency management system (EMS) 130, (iii) a communication device 160, (iv) an emergency location analysis program 171 installed on a communication device 160, (v) a 152 public safety answering point (PSAP), and (vi) 158 PSAP software. In some embodiments, as depicted in FIG. 1A, the emergency location analysis system 100 includes an operating system 101, an ELAS central processing unit (CPU) 102, an ELAS memory unit 103, and an ELAS communication unit 104. In some embodiments, the ELAS CPU 102 is implemented as one or more microprocessors, microcomputers, microcontrollers, digital signal processors, central processing units, state machines, logic circuitries, and/or devices that manipulate signals based on operational instructions. Among other capabilities, the ELAS CPU 102 is configured to fetch and execute computer-readable instructions stored in the ELAS memory unit 103. The ELAS memory unit 103 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The ELAS memory unit 103 may include modules, routines, programs, objects, components, data structures, etc., which perform particular tasks or implement particular abstract data types.

In some embodiments, the ELAS 100 includes a location analysis program 105 comprising of one or more modules, such as a prediction module 105*a*, a validation module 105*b*, and an improvement module 105*c* configured to predict locations, validate locations, and improve locations, respectively. In some embodiments, as depicted in FIG. 1A, the ELAS 100 additionally or alternatively comprises a data collection program 106 and one or more databases 107. In some embodiments, the data collection program 106 includes a trigger module 141 configured to remotely trigger a test communication device to execute an emergency test call, a call module 142 configured to dictate and record any and all call functions executed by the test communication device, a location module 143 configured to record at least one location (e.g., a device-based hybrid location) generated by a test communication device and at least one location (e.g., a ground-truth location) during an emergency test call, and a data module 144 configured to record any and all data generated during an emergency test call, as described below. In some embodiments, the one or more databases 107 include a test database 107a, a location prediction algorithm database 107b, a location validation database 107c, a location improvement database 107d, or any combination thereof. In some embodiments, the ELAS 100 includes a location analysis server 131. In some embodiments, some or all of the components of the ELAS 100 are stored on the location analysis server 131. In some embodiments, the data collection program 106 is configured to collect emergency test call or emergency call data and store the data in the one or more databases 107. In some embodiments, the location analysis program 105 is configured to access the one or more databases 107 and analyze the data stored within the one or more databases using the one or more modules of the location analysis program 105.

In some embodiments, as depicted in FIG. 1A, the emergency management system (EMS) 130 comprises an EMS operating system 135, an EMS CPU 136, an EMS memory unit 137, an EMS communication element 138, and one or more software modules 139. In some embodiments, the EMS CPU 136 is implemented as one or more microprocessors, microcomputers, microcontrollers, digital signal processors, central processing units, state machines, logic circuitries, and/or devices that manipulate signals based on operational instructions. Among other capabilities, the EMS CPU 136 is configured to fetch and execute computer-readable instructions stored in the EMS memory unit 137. In some embodiments, the EMS memory unit 137 includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. In some embodiments, the EMS memory unit 137 includes modules, routines, programs, objects, components, data structures, etc., which perform particular tasks or implement particular abstract data types.

In some embodiments, the EMS 130 includes one or more EMS databases 132, one or more servers 133, and a clearinghouse 134. In some embodiments, the one or more servers 133 include the location analysis server 131. In some embodiments, the clearinghouse 134 is an input/output (I/O) interface configured to manage communications and data transfers to and from the EMS 130 and external systems and devices. In some embodiments, the clearinghouse 134 includes a variety of software and hardware interfaces, for example, a web interface, a graphical user interface (GUI), and the like. In some embodiments, the clearinghouse 134 enables the EMS 130 to communicate with other computing devices, such as web servers and external data servers (not shown). In some embodiments, the clearinghouse 134 facilitates multiple communications within a wide variety of networks and protocol types, including wired networks, for example, LAN, cable, etc., and wireless networks, such as WLAN, cellular, or satellite. In some embodiments, the clearinghouse 134 includes one or more ports for connecting a number of devices to one another or to another server. In some embodiments, the clearinghouse 134 includes one or more clearinghouses, such as location clearinghouse 134a and additional data clearinghouse 134b, configured to manage the transfer of locations and additional data, respectively.

In some embodiments, as depicted in FIG. 1B, a communication device 160 includes a display 161, a processor 162, a memory 163 (e.g., an EPROM memory, a RAM, or a solid-state memory), a network component 164 (e.g., an antenna and associated components, Wi-Fi adapters, Bluetooth adapters, etc.), a data storage 165, a user interface 166, an emergency alert program 167, one or more location components 168, and one or more sensors 169, or any combinations thereof. In some embodiments, the communication device 160 is a wireless mobile device or a smartphone. In some embodiments, the processor 162 is implemented as one or more microprocessors, microcomputers, microcontrollers, digital signal processors, central processing units, state machines, logic circuitries, and/or devices that manipulate signals based on operational instructions. Among other capabilities, the processor 162 is configured to fetch and execute computer-readable instructions stored in the memory 163.

In some embodiments, the display 161 is part of the user interface 166 (e.g., a touchscreen is both a display and a user interface in that it provides an interface to receive user input or user interactions). In some embodiments, the user interface 166 includes physical buttons such as an on/off button or volume buttons. In some embodiments, the display 161 and/or the user interface 166 comprises a touchscreen (e.g., a capacitive touchscreen), which is capable of displaying information and receiving user input. In some embodiments, the communication device includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, a hematology analyzer, or any combination thereof. In some embodiments, the data storage 165 includes a location data cache 165a and a user data cache 165b. In some embodiments, the location data cache 165a is configured to store locations generated by the one or more location components 168.

In some embodiments, the emergency alert program 167 is an emergency response application or emergency response mobile application. In some embodiments, the emergency alert program 167 is configured to record user data, such as a name, address, or medical data of a user associated with the communication device 160. In some embodiments, the emergency alert program 167 is configured to detect when an emergency request is generated or sent by the communication device 160 (e.g., when a user uses the communication device 160 to make an emergency call). In some embodiments, in response to detecting an emergency request generated or sent by the communication device 160, the emergency alert program is configured to deliver a notification (hereinafter, "emergency alert") to the EMS 130. In some embodiments, the emergency alert is an HTTP post containing information regarding the emergency request. In some embodiments, the emergency alert includes a location (e.g., a device-based hybrid location) generated by or for the communication device 160. In some embodiments, in response to detecting an emergency request generated or sent by the communication device 160, the emergency alert program is configured to deliver user data or emergency data to the EMS 130 within an emergency alert.

In some embodiments, as depicted in FIG. 1B, an emergency location analysis program 169 installed on a test communication device (e.g., a communication device 160 used to execute emergency test calls, as described below) includes a user data module 172, a notification module 174, and a communication module 176. In some embodiments, the user data module 172 is configured to collect data from the communication device 160, such as from the user data cache 165b. In some embodiments, the notification module 174 is configured to receive a notification from the communication device 160 (e.g., from the emergency alert program 167) and deliver the notification to the ELAS 100 or the EMS 130. In some embodiments, the emergency location analysis program installed on the test communication device may additionally or alternatively include a trigger module 141 configured to remotely trigger a test communication device to execute an emergency test call, a call module 142 configured to dictate and record any and all call functions executed by the test communication device, a location module 143 configured to record at least one location (e.g., a device-based hybrid location) generated by a test communication device and at least one location (e.g., a ground-truth location) during an emergency test call, and a data module 144 configured to record any and all data generated during an emergency test call (as described below).

In some embodiments, as depicted in FIG. 1C, a public safety answering point (PSAP) system 152 includes one or more of a display 182, a user interface 186, at least one central processing unit or processor 183, a network component 185, an audio system 154 (e.g., microphone, speaker and/or a call-taking headset), and a computer program such as a PSAP Emergency Display Application or Location Display Program 158. In some embodiments, the PSAP application or program 158 comprises one or more software modules 159. In some embodiments, the PSAP system 152 comprises a database of emergency responders 156, such as medical assets, police assets, fire response assets, rescue assets, safety assets, etc.

In some embodiments, as depicted in FIG. 1C, the PSAP application or program 158 installed on a PSAP system 152 comprises a software module is a call taking module 195, a PSAP display module 196, a supplemental or updated information module 197, a location feedback module 198, or a combination thereof. In some embodiments, the PSAP application 158 displays the information on a map (e.g., on the display 182). In some embodiments, the location feedback module 198 is configured to provide feedback from the PSAP to the EMS 130, as described below. In some embodiments, location and supplemental information may be displayed for emergency service providers (e.g., police, fire, medical, etc.) and/or responders on their devices. In some embodiments, responder devices have installed a responder device program (not shown) similar to a PSAP display module 198. In some embodiments, the responder device program displays the emergency location on a map.

Figure 2A:
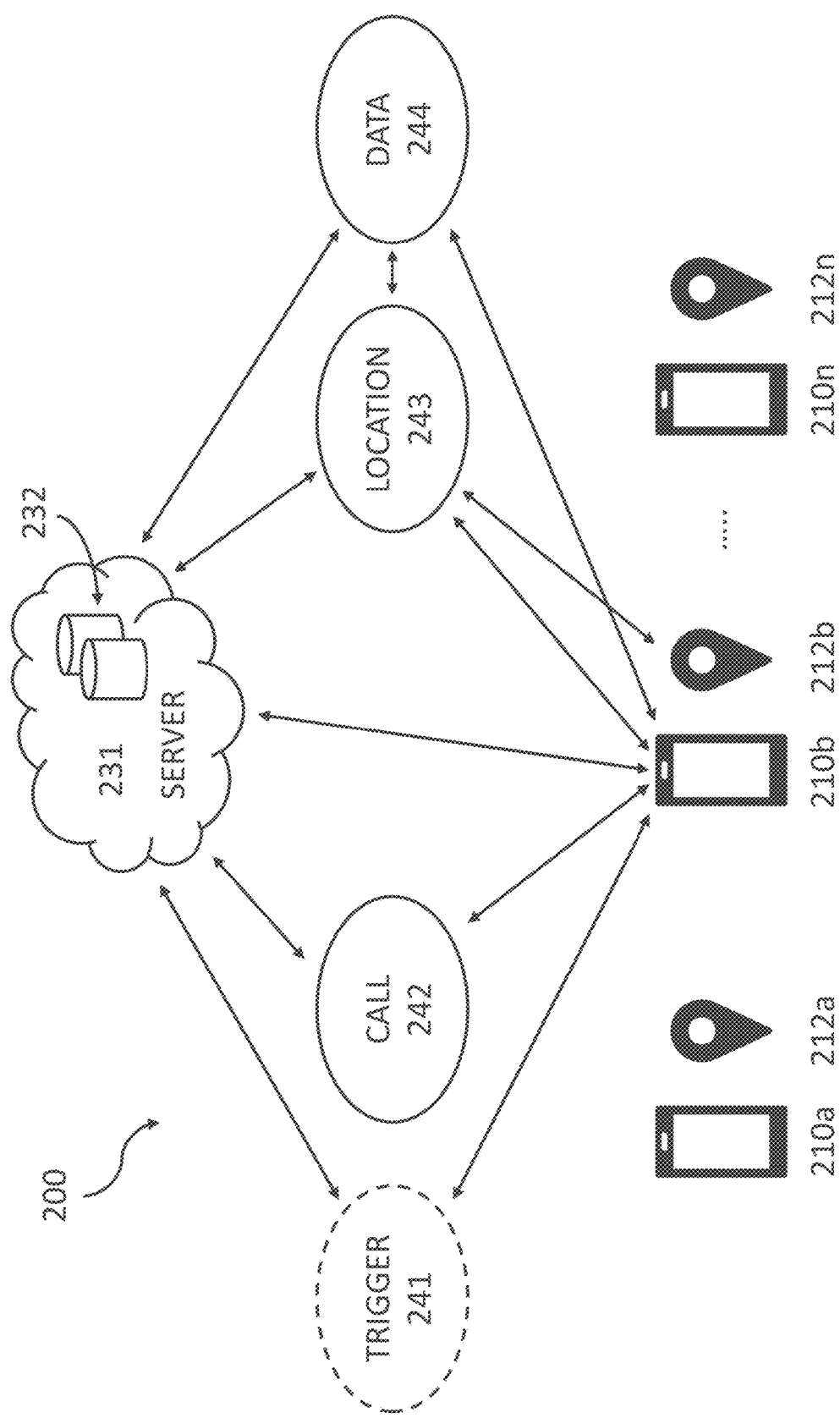
FIG. 2A depicts an embodiment of a system for executing emergency test calls.

Emergency Test Calls and Emergency Test Call Database
Emergency Test Call System In some embodiments of an emergency location analysis system, a plurality of emergency test calls is executed from a plurality of communication devices on a plurality of network carriers in a plurality of locations to create emergency test call data that is stored on an emergency test call database. FIG. 2A depicts an embodiment of a system 200 for executing emergency test calls. In some embodiments, emergency test calls are executed from one or more test communication devices 210. In some embodiments, the test communication devices 210 include a plurality of communication devices. In some embodiments, the test communication devices 210 include distinct makes and models of various communication devices. As an illustrative example, the test communication devices 210 include an Apple iPhone 5, an Apple iPhone 5S, an Apple iPhone 6, an Apple iPhone 6S, an Apple iPhone 7, an Apple iPhone 8, and an Apple iPhone X. Alternatively or in combination, for example, the test communication devices 210 include an Apple iPhone 8 and an Apple iPhone 8 Plus. In another example, the test communication devices 210 may include an Apple iPhone 7 and an Apple iPad device. In yet another example, the test devices 210 include an Apple iPhone 8, a Samsung Galaxy S8, and a Google Pixel 2. In some embodiments of the system 200, each test communication device 210 is communicatively coupled to a locationing device (not depicted). In some embodiments, the locationing device is global positioning system (GPS) device. In some embodiments, the locationing device is a Bad Elf GPS Receiver. In some embodiments, each test communication device 210 is communicatively coupled to its own respective locationing device. In some embodiments, multiple test communication devices 210 are communicatively coupled to a shared locationing device. In some embodiments, the locationing device is built into or otherwise included in the test communication device 210.

In some embodiments of the system 200, the system 200 includes a trigger module 241, a call module 242, a location module 243, and a data module 244. In some embodiments, the trigger module 241, call module 242, location module 243, and data module 244 are each optionally partially or entirely located on the test communication device 210 or a server 231 (also referred to as "Emergency Management System (EMS) server") communicatively coupled to an emergency management system (EMS) 230 (not depicted). In some embodiments, the server 231 and EMS 230 are communicatively coupled to a database 232. In some embodiments, the trigger module 241 is configured to remotely trigger the test communication device 210 to execute an emergency test call. In some embodiments, the trigger module 241 automatically triggers the test communication device 210 to execute an emergency test call on a regular, periodic interval. In some embodiments, the trigger module 241 triggers the test communication device 210 to execute an emergency test call in response to a manual input or request from the EMS or from a physical input on the test communication device user interface. In some embodiments, the call module 242 is configured to dictate and record any and all call functions executed by the test communication device 210. For example, in some embodiments, the call module 242 dictates the telephone number or voice over internet protocol (VoIP) address dialed by the test communication device 210 when an emergency test call is executed. In some embodiments, the call module 242 dictates the length of an emergency test call executed by a test communication device 210. In some embodiments, the call module 242 records the telephone number dialed during an emergency test call, the duration of an emergency test call, an identifier of the test communication device 210, or the day and time of an emergency test call.

The location module 243 is configured to record at least one location (e.g., a device-based hybrid location) generated by a test communication device 210 and at least one location 212 (also referred to as "a ground-truth location") from a locationing device communicatively coupled to the test communication device 210 during an emergency test call. In some embodiments, the location module 243 records a day and time for each location recorded during an emergency test call. For example, in some embodiments, the location module 243 timestamps each location recorded from the test communication device 210 and the locationing device. In some embodiments, for a single emergency test call, the location module 243 records a single location from the locationing device and a single location from the test communication device 210. In some embodiments, for a single emergency test call, the location module 243 records a single location from the locationing device and multiple locations from the test communication device 210. In some embodiments, for a single emergency test call, the location module 243 records a plurality (or multitude) of locations from the test communication device 210 and an equal plurality of locations from the locationing device, wherein each location recorded from the test communication device (hereinafter, "test location") is paired into a location pair with a corresponding ground-truth location 212 recorded simultaneously from the locationing device coupled to the test communication device 210. In some embodiments, the location module 243 records locations or locations pairs on a periodic interval during the emergency test call. For example, in some embodiments, the location module 243 records locations or locations pairs on a periodic interval such as, for example, every 1, 5, 10, or 15 seconds. In some embodiments, during an emergency test call, the location module 243 records a test location and a corresponding ground-truth location 212 simultaneously. In some embodiments, the location module 243 denotes whether a location was recorded indoors or outdoors. In some embodiments, the location module 243 additionally records or denotes the geographical region or area that a location was received from. In some embodiments, the location module 243 receives a user submission of a ground truth location 212. For example, in some instances, a user knows the location based at least in part on environmental information (e.g., a known intersection is denoted by street signs). As another example, a user enters a ground truth location 212 for an indoor location (e.g., address, building, floor, room, etc.) when the locationing device is unable to provide an accurate ground truth location. In some embodiments, the methods used to generate the emergency test call data comprises one or more rules for requesting user entry of a ground truth location 212 based on one or more attributes associated with the communication (e.g., requesting user entry of location when the call is made from an indoor location).

The data module 244 is configured to record any and all data generated during an emergency test call (hereinafter, "emergency test call data") and store the emergency test call data in the database 232, thereby generating a dataset of emergency test call data. In some embodiments of the system 200, the data module 244 is communicatively coupled to the trigger module 241, the call module 242, and the location module 243. In some embodiments, the data module 244 is communicatively coupled to the test communication device 210. In some embodiments, the data module 244 is communicatively coupled to the test communication device 210 and the locationing device. In some embodiments, when a particular emergency test call is executed by a test communication device 210, the data module creates a database entry in the database 232 corresponding to the particular emergency test call. The data module 244 then records attributes (also referred to as "metadata") associated with the test communication device 210, including, but not limited to: manufacturer and model of the test communication device 210, the network carrier on which the emergency test call was executed, the battery level of the test communication device 210, and the type of wireless connection or network on which the emergency test call was executed.

In some embodiments, the data module 244 records attributes including, but not limited to: manufacturer and model of a test communication device 210, network carrier information, time of an emergency test call, geographical area, zone or population density, outdoor or indoor location, device battery level, type of connection, source of location, reported location accuracy, reported location confidence, operating system of a test communication device 210, an identifier of a test communication device 210, accelerometer speed, power saving status, or Wi-Fi status of a test communication device 210. Table 1 (shown below) details a non-exhaustive list of attributes that may be recorded by the data module 244, wherein "Gt" stands for "ground-truth," "imsi" stands for "International Mobile Subscriber Identity," "imei" stands for "International Mobile Equipment Identity," "mcc" stands for "Mobile Country Code," and "mnc" stands for "Mobile Network Code."

TABLE 1

Example Attributes

| Name | Values | Description |
| --- | --- | --- |
| V | 2 | Version |
| Emergency_number | 911 | Emergency number dialed |
| Source | Call | Source of activation (call, sms) |
| Time | 150 . . . | Timestamp of beginning of call (unix time in ms) |
| Gt_location_latitude | | Ground truth latitude (optional, for testing) |
| Gt_location_longitude | | Ground truth longitude (optional, for testing) |
| Location_latitude | 39.7430 | Latitude |
| Location_longitude | −104.8946 | Longitude |
| Location_time | 150 . . . | Timestamp of location (unix time in ms) |
| Location_altitude | 215 | Altitude (meters above WGS84 ellipsoid) |
| Location_floor | 9 | Floor number |
| Location_accuracy | 24 | Accuracy radius (meters for 1 standard deviation) |
| Device_number | 555555555 | Device phone number |
| Device_model | Samsung S7 | Device model |
| Device_imsi | 310 . . . | IMSI |
| Device_imei | 351 . . . | IMEI |

TABLE 1-continued

Example Attributes

| Name | Values | Description |
| --- | --- | --- |
| Cell_carrier | AT&T | Carrier name |
| Cell_network_mcc | 310 | ...Network MCC |
| Cell_network_mnc | 016 | ...Network MNC |
| Cell_home_mcc | 310 | ...Home MCC |
| Cell_home_mnc | 016 | ...Home MNC |
| Place_name | RapidSOS | Place name |
| Place_id | Chi | ...Place id (from Google Places API) |
| Place_likelihood | 98 | Place likelihood estimate (percentage between 0-100) |
| Place_address | 234 | ...Place address (full string) |
| Place_latitude | 39 | ...Place latitude |
| Place_longitude | −104 | ...Place longitude |
| Place_number | N/A | Place phone number (e.g., front desk of office) |
| Place_website | http:// | ...Place website |

In some embodiments, the data module 244 records the attributes in the database entry along with data recorded or generated by the trigger module 241, the call module 242, and the location module 243. For example, in some embodiments, the data module 244 records the locations received from the test communication device 210 and the locationing device at the location module 243. In some embodiments, the data module 244 records the emergency test call data dictated or recorded by the call module 242. As an example, the data module 244 records the telephone number or voice over internet protocol (VoIP) addressed dialed by a test communication device 210, the length of an emergency call executed by a test communication device 210, the telephone number dialed during an emergency test call, the duration of an emergency test call, an identifier of the test communication device 210, or the day and time of an emergency test call from the call module 242. In some embodiments, the data module 244 records any combination of data, emergency test call data, and attributes or metadata in a database entry in the database 232 (hereinafter, "emergency test call database"). In some embodiments, the data module 244 zips test locations and corresponding ground-truth locations into a single file before storing the locations in the database 232. A sample emergency test call database is shown below in Table 2A and 2B.

TABLE 2A

Sample Emergency Test Call Database

|   | A | B | C | D | E | F | G | H |
| --- | --- | --- | --- | --- | --- | --- | --- | --- |
| 1 | 1504847777230 | Sprint | iPhone8,4 | 16462715146 | 111.4 | https | iphone | 10.3.2 |
| 2 | 1504847777230 | Sprint | iPhone8,4 | 16462715146 | 111.4 | https | iphone | 10.3.2 |
| 3 | 1504847777237 | Sprint | iPhone8,4 | 16462715146 | 111.4 | https | iphone | 10.3.2 |
| 4 | 1504847783582 | Sprint | iPhone8,4 | 16462715146 | 112.8 | https | iphone | 10.3.2 |
| 5 | 1504847783582 | Sprint | iPhone8,4 | 16462715146 | 112.8 | https | iphone | 10.3.2 |
| 6 | 1504847784570 | Sprint | iPhone8,4 | 16462715146 | 112.2 | https | iphone | 10.3.2 |
| 7 | 1504847785056 | Sprint | iPhone8,4 | 16462715146 | 114.8 | https | iphone | 10.3.2 |
| 8 | 1504847786053 | Sprint | iPhone8,4 | 16462715146 | 112.9 | https | iphone | 10.3.2 |
| 9 | 1504847787068 | Sprint | iPhone8,4 | 16462715146 | 111.2 | https | iphone | 10.3.2 |
| 10 | 1504847789055 | Sprint | iPhone8,4 | 16462715146 | 114 | https | iphone | 10.3.2 |
| 11 | 1504847790067 | Sprint | iPhone8,4 | 16462715146 | 113.9 | https | iphone | 10.3.2 |
| 12 | 1504847791111 | Sprint | iPhone8,4 | 16462715146 | 112.1 | https | iphone | 10.3.2 |
| 13 | 1504847792046 | Sprint | iPhone8,4 | 16462715146 | 108.5 | https | iphone | 10.3.2 |
| 14 | 1504847793043 | Sprint | iPhone8,4 | 16462715146 | 107.6 | https | iphone | 10.3.2 |
| 15 | 1504847794060 | Sprint | iPhone8,4 | 16462715146 | 109.7 | https | iphone | 10.3.2 |
| 16 | 1504847795043 | Sprint | iPhone8,4 | 16462715146 | 110.3 | https | iphone | 10.3.2 |
| 17 | 1504847796066 | Sprint | iPhone8,4 | 16462715146 | 108.6 | https | iphone | 10.3.2 |
| 18 | 1504847797046 | Sprint | iPhone8,4 | 16462715146 | 110.7 | https | iphone | 10.3.2 |
| 19 | 1504847798071 | Sprint | iPhone8,4 | 16462715146 | 110.5 | https | iphone | 10.3.2 |
| 20 | 1504847799051 | Sprint | iPhone8,4 | 16462715146 | 113.3 | https | iphone | 10.3.2 |
| 21 | 1504847801043 | Sprint | iPhone8,4 | 16462715146 | 115.9 | https | iphone | 10.3.2 |
| 22 | 1504847802045 | Sprint | iPhone8,4 | 16462715146 | 116.8 | https | iphone | 10.3.2 |
| 23 | 1504847803042 | Sprint | iPhone8,4 | 16462715146 | 116.9 | https | iphone | 10.3.2 |
| 24 | 1504847804060 | Sprint | iPhone8,4 | 16462715146 | 116.9 | https | iphone | 10.3.2 |

TABLE 2B

Sample Emergency Test Call Database Continued

|   | I | J | K | L | M | N | O | P |
| --- | --- | --- | --- | --- | --- | --- | --- | --- |
| 1 | False | False | 65 | 40.791792 | −72.476898 | 41.791905 | −74.476799 | 15.07764911 |
| 2 | False | False | 65 | 40.791792 | −72.476898 | 41.791905 | −74.476799 | 15.07764911 |
| 3 | False | False | 65 | 40.791792 | −72.476898 | 41.791905 | −74.476799 | 15.07764911 |
| 4 | False | False | 10 | 40.791807 | −72.476881 | 41.791905 | −74.476799 | 12.89929653 |

TABLE 2B-continued

Sample Emergency Test Call Database Continued

| | I | J | K | L | M | N | O | P |
|---|---|---|---|---|---|---|---|---|
| 5 | False | False | 10 | 40.791807 | −72.476881 | 41.791905 | −74.476799 | 12.89929653 |
| 6 | False | False | 10 | 40.791807 | −72.476881 | 41.791905 | −74.476799 | 12.89929653 |
| 7 | False | False | 10 | 40.791881 | −72.476891 | 41.791905 | −74.476799 | 8.191966527 |
| 8 | False | False | 5 | 40.791881 | −72.476891 | 41.791905 | −74.476799 | 8.191966527 |
| 9 | False | False | 5 | 40.791881 | −72.476891 | 41.791905 | −74.476799 | 8.191966527 |
| 10 | False | False | 30 | 40.791851 | −72.476915 | 41.791905 | −74.476799 | 11.4639742 |
| 11 | False | False | 10 | 40.791851 | −72.476915 | 41.791905 | −74.476799 | 11.4639742 |
| 12 | False | False | 10 | 40.791851 | −72.476915 | 41.791905 | −74.476799 | 11.4639742 |
| 13 | False | False | 5 | 40.791899 | −72.476862 | 41.791905 | −74.476799 | 5.345948542 |
| 14 | False | False | 5 | 40.79191 | −72.476845 | 41.791905 | −74.476799 | 3.911969824 |
| 15 | False | False | 5 | 40.79191 | −72.476845 | 41.791905 | −74.476799 | 3.911969824 |
| 16 | False | False | 5 | 40.791923 | −72.476824 | 41.791905 | −74.476799 | 2.904454501 |
| 17 | False | False | 5 | 40.791929 | −72.476813 | 41.791905 | −74.476799 | 2.91684029 |
| 18 | False | False | 5 | 40.791935 | −72.476806 | 41.791905 | −74.476799 | 3.387200111 |
| 19 | False | False | 5 | 40.791944 | −72.476799 | 41.791905 | −74.476799 | 4.335945404 |
| 20 | False | False | 5 | 40.791952 | −72.476794 | 41.791905 | −74.476799 | 5.241241058 |
| 21 | False | False | 5 | 40.791952 | −72.476794 | 41.791905 | −74.476799 | 5.241241058 |
| 22 | False | False | 5 | 40.791952 | −72.476794 | 41.791905 | −74.476799 | 5.241241058 |
| 23 | False | False | 5 | 40.792 | −72.476797 | 41.791905 | −74.476799 | 10.56469892 |
| 24 | False | False | 5 | 40.792 | −72.476797 | 41.791905 | −74.476799 | 10.56469892 |

TABLE 2C

Key for Tables 2A and 2B

| | |
|---|---|
| A | Current Time |
| B | Cell Carrier |
| C | Device Model |
| D | Device Number |
| E | Location Altitude |
| F | Method |
| G | Operating System |
| H | Operating System Build |
| I | Is Power Saving? |
| J | Is Wi-Fi Connected? |
| K | Location Accuracy |
| L | Location Latitude |
| M | Location Longitude |
| N | Ground-Truth Latitude |
| O | Ground-Truth Longitude |
| P | Distance |

Executing Emergency Test Calls

In some embodiments, to create an emergency test call database or generate data for the database, a plurality of emergency test calls is executed from a plurality of various communication devices on a plurality of network carriers in a plurality of locations. An emergency test call is executed on a test communication device 210 when an emergency call (e.g., dialing 9-1-1 in the United States) or a functionally equivalent mock emergency call is made from the test communication device 210. In some embodiments, each emergency test call made from a test communication device 210 is a live emergency call made to an emergency dispatch center, such as a public safety answering point (PSAP). In some embodiments, an emergency test call made from a test communication device 210 is either a live emergency call or a mock emergency call. In some embodiments, each emergency test call made from a test communication device 210 is a mock emergency call. In some embodiments, a mock emergency call is an emergency test call in which a test communication device 210 acts during the emergency test call in a manner functionally equivalent to the manner in which the test communication device 210 acts during a live emergency call. In some embodiments, network carriers, such as AT&T and Verizon, provide mock emergency telephone numbers that serve as functional equivalents to live emergency call telephone numbers (e.g., 9-1-1 in the United States). In some embodiments, such mock emergency telephone numbers are used to make mock emergency calls from a test communication device 210. In some embodiments, various makes and models of communication devices, such as a particular Apple iPhone model (e.g., an Apple iPhone 6) or a particular Samsung Galaxy model (e.g., Samsung Galaxy S7) enter into an "emergency call mode"—not to be confused with an "emergency mode" that may be activated automatically or by a user of the device when the user is experiencing an emergency (e.g., a user may activate an "emergency mode" on their device when trapped in an elevator to preserve battery life)—that is automatically activated when the communication devices detect that a user has made an emergency call. In some embodiments, the emergency call mode affects various components of the communication device, which can impact the communication device's ability to generate a device-based hybrid location or an otherwise accurate location. In some embodiments, a communication device is configured such that the device is forced into emergency call mode upon detection an emergency communication. In some embodiments, a communication device is forced or tricked into entering emergency call mode, which allows any telephone number or voice over internet protocol (VoIP) address dialed from the communication device in emergency call mode to serve as a mock emergency call. In some embodiments, activation of the emergency mode is detected in a communication sent by a communication device. In further embodiments, emergency mode activation is an attribute used in generating a prediction such as a location accuracy metric.

In some embodiments, when an emergency test call is made from a test communication device 210 (such as when triggered by trigger module 241), a test location (e.g., a device-based hybrid location) is generated by or for the test communication device 210. In some embodiments, the test location generated by or for the test communication device 210 is a device-based hybrid location generated by the test communication device 210. In some embodiments, a device-based hybrid location is determined or generated by the test communication device 210 using various components of the test communication device either separately or in combination. The various components of a test communication device 210 that can be used to generate a device-based hybrid location include, but are not limited to: a GPS component, a Wi-Fi component, a Bluetooth component, and a cellular component. One or more of the aforementioned components can be analyzed, aggregated, calculated, or otherwise utilized to generate a device-based hybrid location. In some embodiments, the test location generated by or for the test communication device 210 is a network carrier-provided phase one location (e.g., a cell tower address, generally not considered a "dispatchable location," as described below). In some embodiments, the test location generated by or for the test communication device 210 is a network carrier-provided phase two location (e.g., network-based mechanisms including cell tower triangulation and a variety of mathematical calculations that approximate a caller's location based on which cell towers a phone is in communication with). In some embodiments, each of a device-based hybrid location, a network carrier-provided phase one location, and a network carrier-provided phase two location is generated for or by the test communication device 210 during an emergency test call. In some embodiments, when an emergency test call is made from a test communication device 210, in addition to the test location, a ground-truth location is generated by a locationing device (e.g., a GPS device) communicatively coupled to the test communication device 210 during the emergency test call. In some embodiments, test locations and ground-truth locations generated during an emergency test call are recorded by the location module 243.

In some embodiments, when an emergency test call is made from a test communication device 210, a multitude of test locations are generated for or by the test communication device 210 and a single location is generated from the locationing device. In some embodiments, a multitude of test locations are generated for or by the test communication device 210 and a multitude of ground-truth locations of equal number are generated by the locationing device, wherein each test location is paired into a location pair with a corresponding ground-truth location recorded simultaneously. In some embodiments, test locations and ground-truth locations (or location pairs) are generated on a periodic interval during the emergency test call. For example, in some embodiments, test locations and ground-truth locations (or location pairs) may be generated on a period interval such as every 1, 5, 10, or 15 seconds. In some embodiments, at least five test locations are generated for each emergency test call. In some embodiments, a test location and corresponding ground-truth location (or a location pair) are generated simultaneously. In some embodiments, a test location or ground-truth location includes a z-axis coordinate or other indicator of height, such as an altitude or floor level of a building. In some embodiments, the ground-truth location is a building address. In some embodiments, a test location or ground-truth location is a geographical coordinate.

In some embodiments of the system 200, ground-truth locations (e.g., the true location from where an emergency call is made) are determined using surveyed buildings. For example, in some embodiments, when an emergency test call is made from a test communication device 210 within a building, a test location is generated for or by the test communication device 210, and a ground-truth location is generated or determined based on a pre-determined (or pre-surveyed) location within the building. GPS devices are limited in their ability to ascertain locations within buildings and in city-like environments due to buildings interfering with the connection between the GPS devices and satellites overhead (e.g., the "line of sight" between the GPS device and overhead satellites is impeded). GPS devices are thus less effective in generating ground-truth locations for indoor locations. In some embodiments, locations within a building may be pre-determined by a survey team and used as ground-truth locations to circumvent the limitations of a locationing device.

Figure 2B:
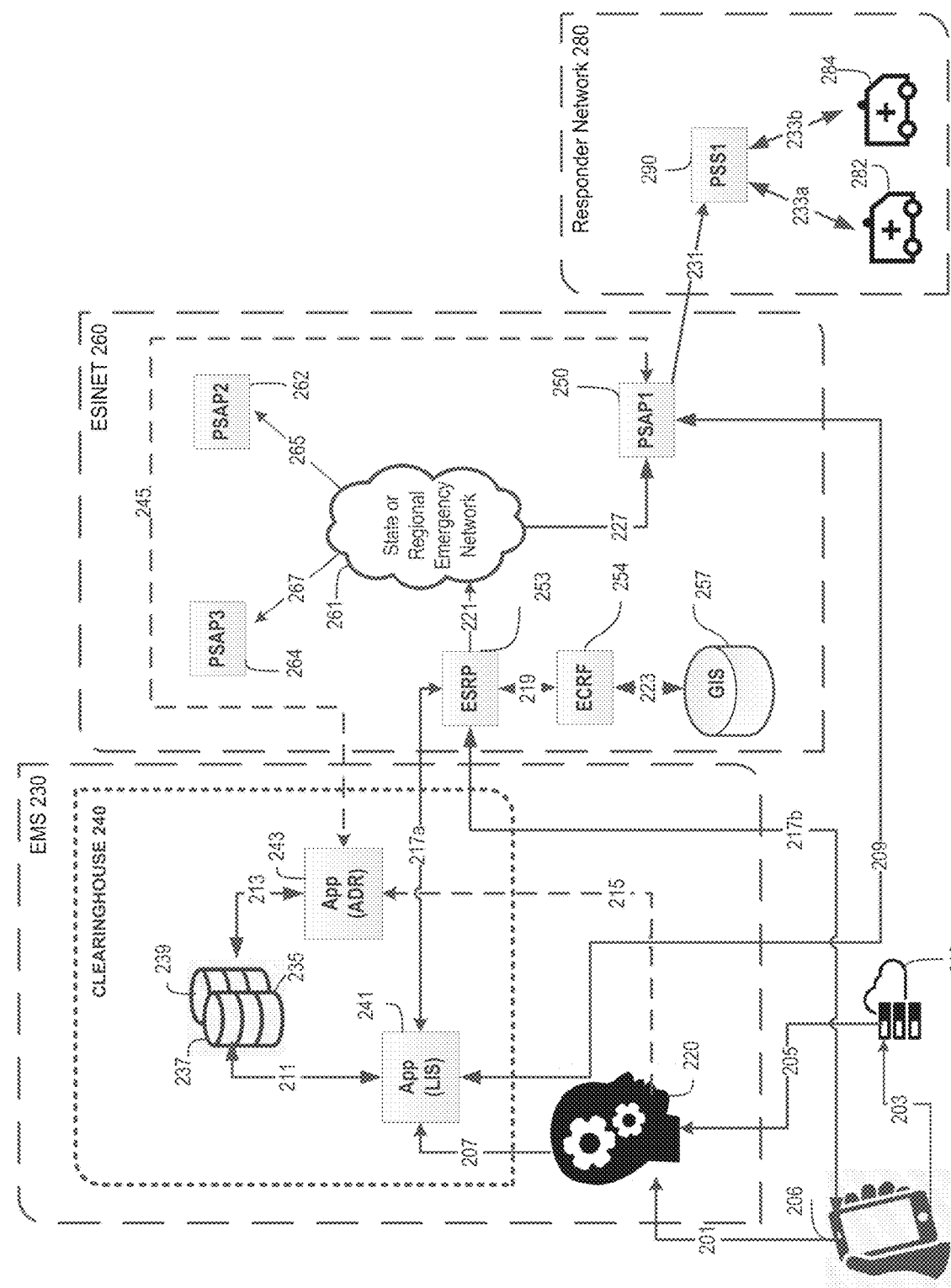
FIG. 2B depicts an embodiment of a system for providing a location to a recipient (e.g., a PSAP)

FIG. 2B depicts one embodiment of a system for providing location to a recipient (e.g., PSAP1 250). As shown, a user 200 uses a communication device 206 to make an emergency call (or conduct an emergency session) for requesting emergency assistance. In some embodiments, the device 206 determines the device-based hybrid location (which takes into account inputs from one or more location sensors), which is the reported location 210 (not shown). Specifically, in some embodiments, the reported location 210 is determined on the device 206 using one or more sensors such as GPS, received location data from cellular base station signal triangulation, Wi-Fi location data, Bluetooth beacon data, or any other form of location information stored at the communication device. In some embodiments, the altitude or elevation (z-direction coordinate) is determined using GPS, barometric sensor, accelerometer, or other sensor readings.

In some embodiments, the reported location comprises lat-lon (latitude and longitude x, y coordinates) and altitude (z-direction). In some embodiments, the lat-lon coordinates includes 5-13 decimal places. In some embodiments, the lat-lon coordinates includes 6 decimal places. In some embodiments, the reported location includes reported accuracy radius and confidence percentage. In some embodiments, the reported location is a street address (e.g., a dispatchable address). In some embodiments, the reported location includes a location within a campus or building (e.g. a floor number, a suite number, an apartment number, or other details about the location within a building or area).

In some embodiments, the ELAS 220 validates the reported location 210 and provides it to the PSAP 250 via clearinghouse 240. In some embodiments, the ELAS 220 may provide an improved or predicted location to the PSAP1 250 via clearinghouse 240.

The reported location may be generated on device 206 and transmitted to the EMS 230 or ELAS 220 in various ways. In some embodiments, the reported location 210 is transmitted directly to the ELAS 220 (via communication link 201). In some embodiments, the reported location 210 is transmitted via a third-party server 216 in the form of an HTTP post text SMS or data SMS, or other type of message. In some embodiments, the reported location 210 is processed by the EMS 230 and then forwarded to the ELAS 220.

In addition to location data, in some embodiments, the device 206 sends additional data such as user data, emergency data, sensor data, or other data relevant to the emergency. In some embodiments, data from device 206 is saved in a clearinghouse 240 (specifically in databases 235).

In some embodiments, the ELAS 220 obtains attributes from the emergency call or session and update the LIS and ADR databases 235 in the clearinghouse 240. For example, attributes in the emergency call data (e.g., timestamp and location) can be added to the LIS database 237 via link 211. In the same way, appropriate data from the emergency request (e.g., an emergency alert) message can be saved in the ADR (additional data) database 239 (e.g., historical location) via link 213. By provisioning in these databases 235, the information is made accessible by an authorized recipient (such as PSAP1 250). For example, PSAP1 250 may send a data query with credentialing information and user identifier to the LIS App 241 or the ADR App 243. Based on the query, PSAP1 250 may be provided access to the return data for the user identifier from the clearinghouse 240B (with active and valid credentials).

In some embodiments, the EMS 230 houses a clearinghouse 240 with one or more databases 235 for storing data, such as a location database 237 and an additional information database 239 (also referred to as the user data database). In other embodiments, the user and location data are saved in one or more databases in a distributed manner. In some embodiments, the clearinghouse 240 is housed in an external server that is accessible to the EMS 430. In some embodiments, the data in the clearinghouse 240 is obtained from one or more types of communication devices such as mobile phones (e.g., via communication link 207, 215), wearable devices, laptop, desktop, personal assistants, vehicle consoles, home security systems, IoT devices, camera feeds, vehicle telematics sources, and other data sources. Specifically, in some embodiments, location data is determined on the device(s) using GPS, received location data from cellular base station signal triangulation, Wi-Fi location data, Bluetooth beacon data, or any other form of location data stored at the communication device.

In some embodiments, the device 206 sends an emergency alert to an EMS 230 through channel 217a (e.g., a data connection, cellular voice connection, etc.). For example, for voice over long term evolution (VoLTE), the session border controller sends a SIP INVITE to device 206. In some embodiments, the device 206 sends the emergency alert via the cellular network via an alternate channel 217b. Both pathways are able to establish an emergency session or emergency call with Emergency Services IP Network or ESINet 260. Among other ESINets (not shown), ESINet 260 is the emergency services network that has the jurisdiction for serving the user's 200 location. Specifically, PSAP1 250, which is a services provider in the ESINet 260 is the "appropriate" emergency service provider serving the location.

In some embodiments, the EMS 230 comprises an access network with an internal ESINet compatible with National Emergency Number Association (NENA) standards (not shown). Specifically, in some embodiments, the EMS 230 includes or has access to non-authoritative copies of an Emergency Services Routing Proxy ESRP 243, an Emergency Call Routing Function ECRF 244, and a Geographic Information System GIS 247 (not shown) for determining which ESINet to send the emergency call or check the routing. For this determination, the location data (e.g., validated location, improved location, and/or predicted location) of the device 206 may be used by the ESRP 243 and ECRF 244 by referring to the jurisdictional boundaries for the ESINet in the GIS 257.

In some embodiments, the non-authoritative ECRF 244 makes a non-authoritative determination and it is synchronized with the authoritative determination by the ECRF 254 in the ESINet 260. The non-authoritative determination may be helpful for several reasons. In some embodiments, the EMS 230 makes the initial determination of which ESINet to send the call. In some embodiments, when the emergency call has been initiated via alternated channel 217b, the ECRF in the EMS 230 checks that the routing the emergency call was correct. In some embodiments, because it can generate quick estimates, the ECRF 244 is capable of being queried repeatedly with updated location data enabling access to updated location data to PSAP 250. In some embodiments, once the ECRF 244 syncs with ECRF 254 via link 217, the determination is validated.

On the ESINet 260 side, in some embodiments, the emergency session (e.g., an emergency call) is sent to the ESRP 253 (via link 217a), which queries the ECRF 254. In some embodiments, the ESRP 253, ESRF 254 and GIS 357 are used to make a determination of which ESINet, and/or PSAP the clearinghouse 240 for location data and/or additional data. The ECRF 254 is best situated to make the authoritative determination on routing based on the validated location. In some embodiments, the validated location has been obtained using a location accuracy for validation.

In some embodiments, the ECRF 254 within the ESINet 260 has up-to-date information about jurisdictional boundaries within its jurisdiction. In some embodiments, the ECRF 254 also has up-to-date information about resources, staffing, local conditions, etc. at the PSAPs in its region. Once a determination the "appropriate" PSAP is found, in some embodiments, the emergency session or call is routed through the state or regional emergency network 2 to the appropriate PSAP (here, PSAP1 250). In some embodiments, the network 261 includes several PSAPs such as, for example, PSAP2 262, PSAP3 264, etc.

As shown, PSAP1 250 are able to respond to the emergency call or emergency session by dispatching one or more emergency responders 282, 284 to the emergency location to provide assistance. For this purpose, the location for dispatching needs a degree of accuracy to be helpful. An inaccurate location and delay the response time by sending responders to the wrong location. In some embodiments, the location accuracy for dispatching is defined to be higher that location accuracy for routing. In some embodiments, the dispatching process is carried out through an Emergency Service Providers (ESPs), such as a public safety services (PSS) (e.g., PSS1 290) in the Responder Network 280. In some embodiments, PSP1 290 is a hospital and responders 282 is an ambulance with paramedics that is dispatched to respond to the emergency. In other embodiments, PSS1 290 is a police station and responders 282 are police officer or squad cars.

In some embodiments, an emergency is triggered by the user 200 via a user interface of the communication device 206 (e.g., by pressing a soft button, a physical button, voice command, or gesture). In other embodiments, the emergency is triggered autonomously based on sensor data (e.g., smoke alarms or via the trigger module in test devices). In some embodiments, the user 200 confirms the emergency and/or provides authorization for sending the emergency alert. In addition to mobile phones, emergency calls are made by telematics equipped vehicles, medical monitoring devices and wearable devices. In some embodiments, the EMS 230 formats the location data into a type that is compatible with industry standards for storing and sharing location data. For example, in some embodiments, the reported location 210 is formatted to be compatible with NENA standards.

In some embodiments, the reported location 210 of the device 206 is saved in the clearinghouse 240 (in database 239). In some embodiments, when queries (such as a GET request) following the Location Information Server (LIS) protocol are sent by requesting parties (e.g., PSAPs, call centers, operations center, family and friends, etc.), a LIS application 241 in the clearinghouse 240 sends an appropriate response via encrypted pathway 209. Within the Clearinghouse 240, the LIS App 241 queries in the LIS database 237 to respond to the query. In some embodiments, one or more LIS queries are in HTTP-Enabled Location Delivery (HELD), and the responses are in Presence Information Data Format Location Object (PIDF-LO).

In some embodiments, additional information is formatted and saved in the database(s) 1035. In some embodiments, when queries following the Additional Data Repository (ADR) protocol are sent by requesting parties (e.g., PSAPs, other authorized third parties), an application 243 in the Clearinghouse 230 sends an appropriate response via encrypted pathway 245. In some embodiments, an authorization code is included in the body, header or meta-data of the query and the Clearinghouse 240 checks that the authorization is active before providing access. In some embodiments, the categories of data available by ADR queries are selected from the group consisting of: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments.

In some embodiments, the data is tagged with tags for specific types of data such as "demographics" or "medical data." For example, in some embodiments, gender, height, weight, ethnicity, profile picture (image-url) are tagged as demographic data. In some embodiments, medical data protected under HIPAA and other laws are tagged as "HIPAA" or "private." In some embodiments, medical data includes information on one or more of allergies, medical condition(s) or illness(es), medication(s), disabilities, blood type, medical note(s), and other medical information. In some embodiments, medical information protected under HIPAA are encrypted and/or anonymized. In some embodiments, some data are tagged as "general" or another similar tag, wherein access is not specifically restricted.

In some embodiments, for LIS and/or ADR queries, authorization and credential management allow differential access to requesting parties. In some embodiments, data is queried over public networks by using API access keys or credentials. In some embodiments, Transport layer Security (TLS) is used in the queries for encryption. In some embodiments, authorization is provided in the "Authorization" header of the query using HTTP Basic Authentication. For example, in some embodiments, authorization is base64-encoded user name and password for the account.

Figure 14B:
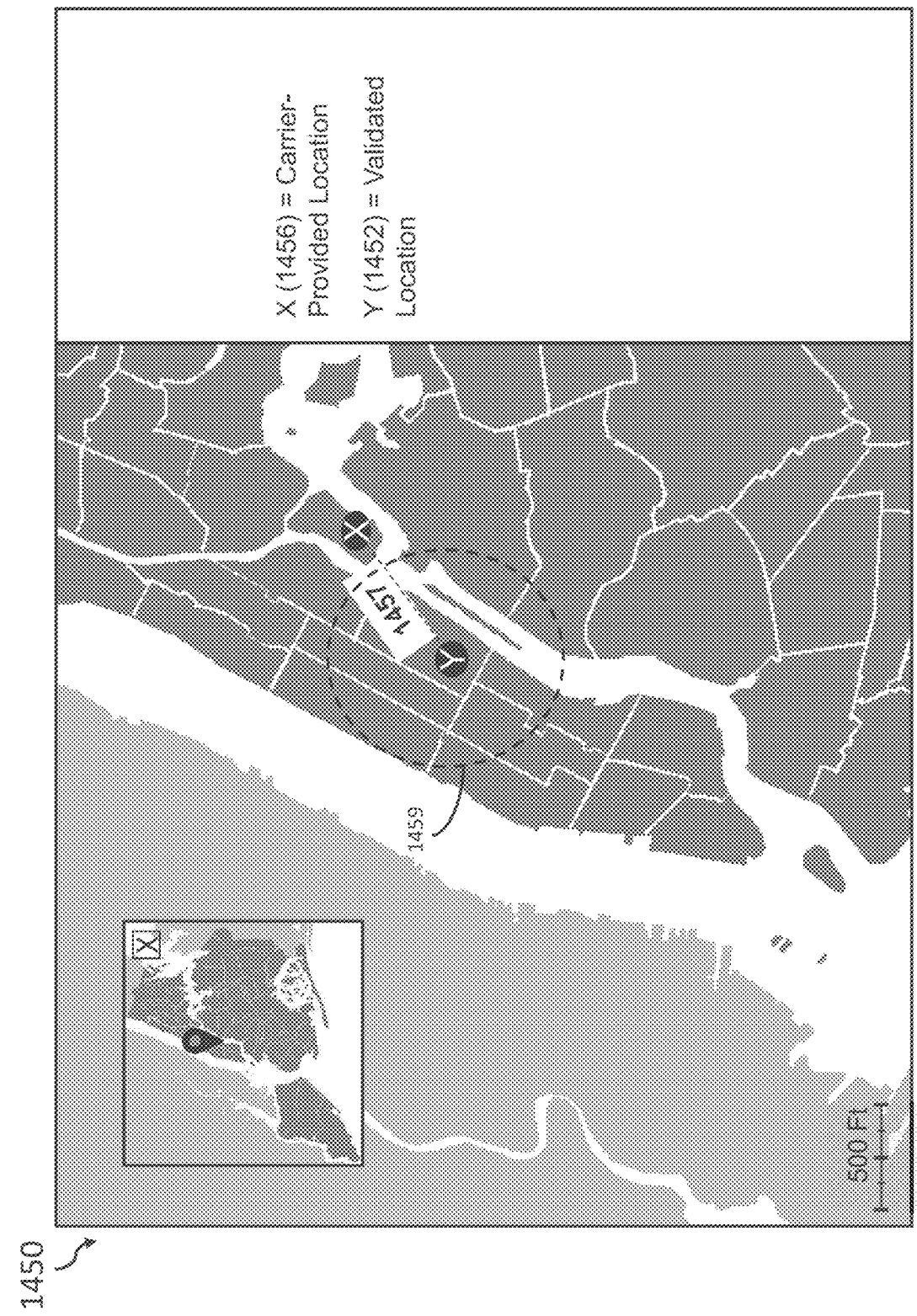

In some embodiments, on the PSAP side, the PSAP 250 includes a PSAP system 251 (not shown) including hardware and software. In some embodiments, the PSAP system 251 includes a call-handling application, CPE App 252 (not shown) with a software module 269 for sending LIS/ADR queries. In some embodiments, when the PSAP requires data about a user or a device (such as current location data), the operator interacts with the CPE App 252 to send the request. In some embodiments, the response is displayed in a PSAP display as depicted in FIG. 14B.

In some embodiments, the PSAPs or other requesting parties require credentials or access keys. In some embodiments, access keys are activated by completing due diligence by phone, email or mail verification. In some embodiments, access keys expire and have to be renewed. In some embodiments, access is rate limited to a certain number of queries in a specified time limit (e.g., 1000 requests per minute) and monitored for abuse. In some embodiments, if a request with inactive or expired credentials is received, access is denied, and an error is generated. In some embodiments, if an account or site has been compromised, the associated access keys are temporarily or permanently disabled. In some embodiments, access keys or credentials allow for differential access to different requesting parties. For example, in some embodiments, the access key notes the access level of the third party, and some data is excluded from the ADR response based on the access level. In the case of LIS, in some embodiments, an access key is excluded based on user preferences or other reasons from receiving current location data. Thus, in some embodiments, the access key for PSAP systems are different from ambulance consoles, wherein ambulance personnel are given access to data tagged as "medical data" but PSAPs are not granted access to said data. Thus, in such embodiments, when the PSAP operators send an ADR request for data, data tagged as "medical data", are excluded due to the PSAP lacking an access key for the data.

In some embodiments, the clearinghouse 240 provides differential access to emergency data depending on factors such as credentials and/or role of the requester, administrator preferences, type of data, etc. In some embodiments, the clearinghouse 240 provides return data that is geofenced. For example, the PSAP1 250 may have an authoritative jurisdiction defined by one or more geofences and the clearinghouse 240 will return data if it falls within the geofence of the requesting party.

In some embodiments, when the location database stored at a third party server receives a request for information from the EMS 230 only, as a database query, the location database (not shown) formats the reported location data and stores this information in the alternate database, and forwards either a database query response or a reference to the alternate database for accessing the location data requested by the EMS 230 or PSAP 250, which is provided to the PSAP 250, over a hybrid analog and/or a data communication channel, depending on the capabilities of PSAP 250.

In some embodiments, the clearinghouse 240 stores the reported location requested from the location database either by the EMS 230 or PSAP 250 or directly by a switching center, for a certain period after receiving the request for the location data regarding a user 200 and any communication devices 206 (following data purging policies). In some embodiments, this period is a timer value (e.g., a timer countdown or a set time point) defined by the EMS 230 or clearinghouse 240 and the LIS (or location) database 237 in conjunction with each other prior to the addition of the information at the location database. In some embodiments, once the timer value has passed and no new requests for the location data pertaining to the particular user 200 and the communication device 206 and other devices associated to the user 200 are received by the location database, then the location database marks the particular entries to be deleted and waits for another, different, time-out interval. In some embodiments, once this particular second time-out interval has also been completed and no new requests for location data for the particular user 200 or associated communication devices 206 is received by the location database, the location database removes the specific marked entries in the next cycle of updates.

In some embodiments, after adding the location data in the clearinghouse 240, the location data is updated on a periodic, or as-needed basis, for the purpose of keeping the location data about the user 200 current for providing the most recent and accurate location data to the EMS 230, and the PSAP 250 for the purposes of responding to a request for emergency assistance. During the emergency, an updated current location may be used as a reported location 210 for validation, improvement and prediction in ELAS 220. In some embodiments, when the user 200 is in a moving vehicle during an emergency call, the device 206 provides an updated location, which is usable as a reported location 210 for validation, improvement and prediction in ELAS 220.

In some non-emergency situations, there is a need to access location data, user data, emergency data or sensor data. For example, in some embodiments, a user grants authorization to family members to access location data for the user. Accordingly, when a family member requests location data for a user, access is granted if there is proper authorization. As another example, in some embodiments, a taxi operations company requests and obtains location data of one or more fleet members.

Figure 3:
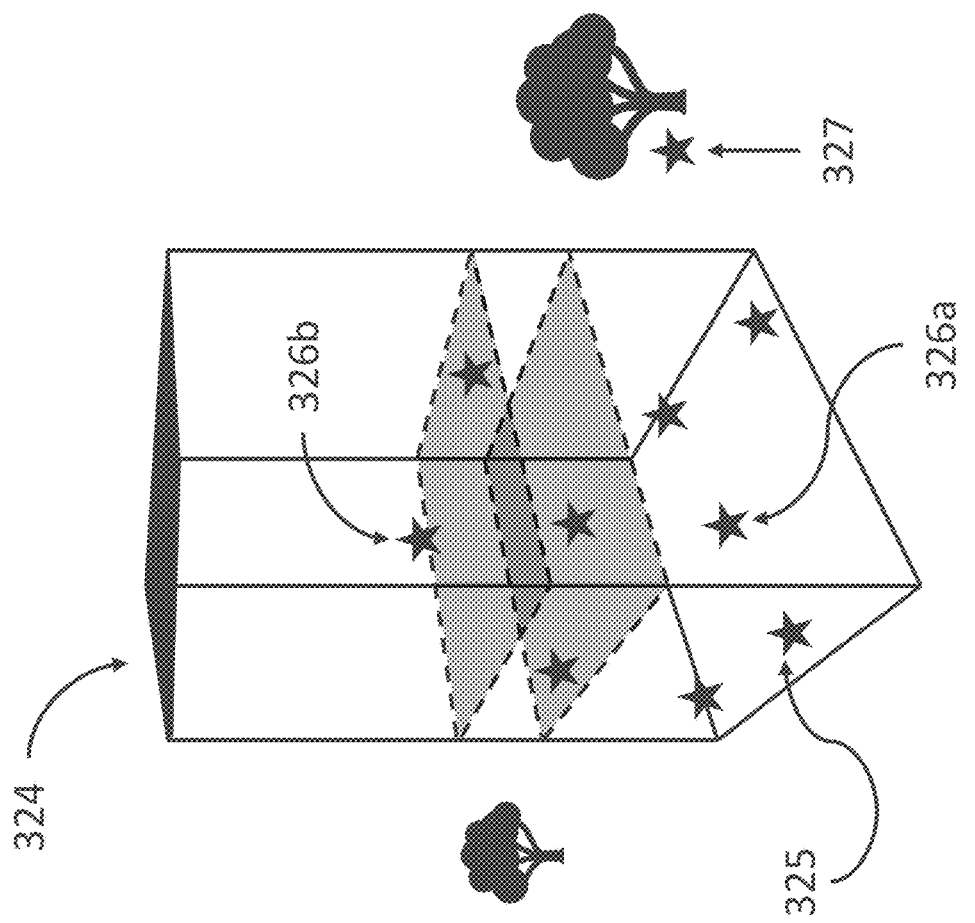
FIG. 3 depicts an embodiment of a location surveyed building.

FIG. 3 depicts an embodiment of a location surveyed (or pre-surveyed) building 324. In some embodiments, different types of locations (e.g., ground-truth locations) are predetermined within a location surveyed building 324, such as "indoor outside" locations 325, inside locations 326, and outside locations 327. In some embodiments, "indoor outside" locations 325 are locations inside the surveyed building 324 that approximate outside locations (e.g., the locations are as close to being outside of the building while still being inside). In some embodiments, locations within a location surveyed building include locations on different levels or floors within the building, such as inside location 326a (as depicted on the first or ground floor) and inside location 326b (as depicted on the third floor of the surveyed building 324). However, any environment (indoor or outdoor) may be pre-surveyed for the purpose of providing ground-truth locations.

In some embodiments, test locations, ground-truth locations, and their accompanying attributes are delivered to the emergency location analysis system by the emergency management system. In some embodiments, test locations, ground-truth locations, and their accompanying attributes are delivered from a test communication device to the emergency location analysis system. In some embodiments, test locations, ground-truth locations, and their accompanying attributes are received by the emergency management system or the emergency location analysis system via an emergency alert (e.g., a short message service (SMS) message, multimedia messaging service (MMS) message, or HTTP post). In some embodiments, the emergency management system or emergency location analysis system identifies one or more attributes associated with the test communication device or the emergency test call made from the test communication device by parsing through an SMS message, MMS message, or HTTP post containing information regarding the emergency test call.

Emergency Location Analysis System

In some embodiments of the present invention, an emergency location analysis system (also referred to as a "location analysis system") analyzes an emergency test call database storing emergency test call data generated from a plurality of emergency test calls executed from a plurality of various communication devices on a plurality of network carriers in a plurality of locations, as described above. The emergency location analysis system analyzes the emergency test call database for various reasons, including, but not limited to: identifying problematic communication devices or combinations of devices and attributes that produce inaccurate locations (e.g., particular makes and models of cell phones that generate device-based hybrid locations that are inconsistent with their corresponding ground-truths), improving upon locations generated by or for communication devices, and predicting locations of communication devices subsequent to locations received from the communication devices. Described herein are various methods that the emergency location analysis system may analyze the emergency test call database. However, the following methods should not be considered exhaustive or limiting in any way.

Recording Emergency Test Call Data

FIGS. 4A, 4B, and 4C illustrate embodiments of emergency test calls made from test communication devices 410. In regard to FIG. 4A, depicted is an emergency test call in which three test locations 415a-415c (e.g., three device-based hybrid locations) were generated for or by a test communication device 410, and a ground-truth location 412a was generated by a locationing device communicatively coupled to the test communication device 410 during the emergency test call. In some embodiments, the emergency location analysis system calculates a distance between a test location 415 and a ground-truth location 412 for an emergency test call. In some embodiments, the emergency location analysis system calculates a distance between each test location and corresponding ground-truth location (or location pair) generated or recorded in an emergency test call. For example, in some embodiments, for the emergency test call depicted in FIG. 4A, the emergency location analysis system calculates a distance 417 between each of the test locations 415a-415c and the ground-truth location 412a, producing three distances for the emergency test call depicted in FIG. 4A, including the distance between test location 415a and ground-truth location 412a, distance 417a. In some embodiments, the emergency location analysis system calculates a weighted distance 418 by calculating the distance between a ground-truth location 412 and a corresponding test location 415 (such as test location 415b) and subtracting the radius of uncertainty 416 reported with the test location 415.

In some embodiments, the emergency location analysis system can additionally or alternatively calculate a vector between a test location 415 and a corresponding ground-truth location 412. For example, the emergency location analysis system may calculate that a test location 415 is 30 meters away from its corresponding ground-truth location 412 and 30 degrees in the southwest direction. As mentioned above, in some embodiments, test locations are time-stamped. In such embodiments, the emergency location analysis system calculates a vector between each chronologically sequential test location and tracks the development of the test locations generated for or by a test communication device 410, as depicted in FIG. 4B.

Calculating Location Accuracy

Figure 5:
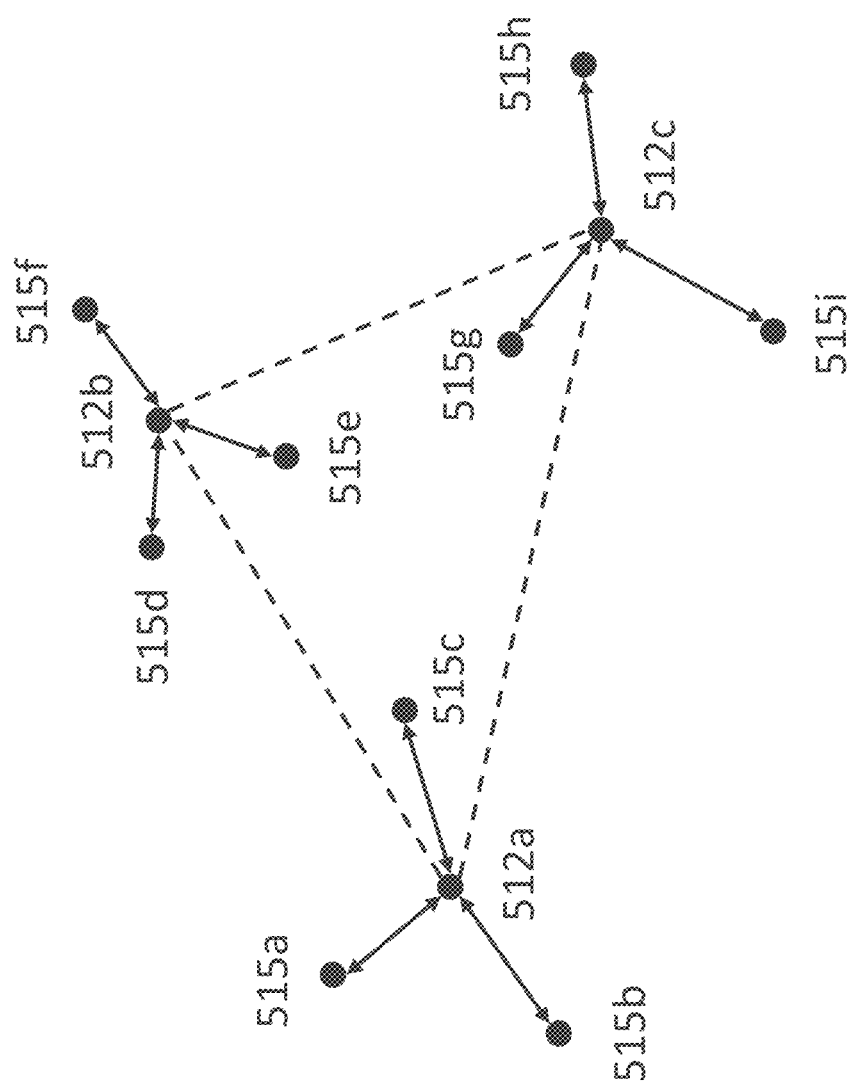
FIG. 5 illustrates an embodiment of an emergency test call.

In some embodiments, the emergency location analysis system can calculate an average of the distances 417 between each of the test locations and corresponding ground-truth locations (or location pairs) generated or recorded for a particular emergency test call to produce a location accuracy (e.g., how close the test location generated for or by the test communication device 410 was to the ground-truth location generated by the locationing device coupled to the test communication device 410 during the emergency test call) of the particular emergency test call. For an emergency test call for which only one test location 415 and corresponding ground-truth location 412 (or location pair) is generated or recorded, the emergency location analysis system may calculate only one distance 417 to produce a location accuracy for the emergency test call. After the emergency location analysis system produces a location accuracy for an emergency test call, the emergency location analysis system can associate, in the emergency test call database, the location accuracy of the emergency test call with one or more of the attributes in a list of attributes 413 associated with the test communication device 410 from which the emergency test call was made. In some embodiments, the emergency location analysis system can associate the location accuracy with each of the attributes in the list of attributes 413 associated with a test communication device 410. For example, as depicted in FIG. 4C, test communication device 410a is associated with a list of attributes 413a including "Verizon" (the network carrier of test communication device 410a), "Motorola" (the device manufacturer of test communication device 410a), and "RAZR2" (the model of test communication device 410a). For an emergency test call made from test communication device 410a resembling the emergency test call depicted in FIG. 4B, the emergency location analysis system can calculate six distances 417 (a distance between ground-truth location 412b and each of test locations 415d-415i) and calculate an average of the six distances to produce a location accuracy for the emergency test call. The emergency location analysis system can then associate the location accuracy with each of "Verizon," "Motorola," and "RAZR2" in the emergency test call database. Any number of emergency test calls may be made from test communication device 410a to generate more location accuracy data points for the attributes associated with test communication device 410a, as depicted in FIG. 5, wherein each of the ground-truth locations 512a-512c represent separate emergency test calls made from the same test communication device, such as test communication device 410a, and wherein multiple test locations (such as test locations 515a-515c) are generated and recorded for each emergency test call. The emergency location analysis can then calculate location accuracies for a multitude of emergency test calls for each attribute associated with a particular test communication device 410. The emergency location analysis system can repeat this analysis process for each emergency test call recorded in the emergency test call database and each test communication device. However, the emergency location analysis system can calculate a location accuracy for an emergency test call using any method.

For example, FIGS. 6A, 6B, 6C, and 6D illustrate various additional analysis methods that may be employed by the emergency location analysis system. However, the methods illustrated by FIGS. 6A, 6B, 6C, and 6D should not be considered exhaustive or limiting in any way. FIGS. 6A and 6C illustrate different degrees of accuracy and precision within test locations recorded for a single emergency test call. In some embodiments, in addition to calculating the distance 617 between test locations 615 and corresponding ground-truth locations 612, the emergency location analysis system can also calculate a distance 619 between a test location and each other test location recorded for the same emergency test call. The emergency location analysis system can then additionally calculate an average of the distance 619 between the test locations 615 recorded for a single emergency test call and incorporate the average into the calculation of the location accuracy for the emergency test call. For example, although the average distance 617 (the average of 617a-617c) between the test locations 615a-615c and ground-truth location 612a of FIG. 6A may be similar to the average distance 617 (the average of 617d-617f) between the test locations 615d-615f and ground-truth location 612b of FIG. 6C, the average distance 619 (the average of 619a-619c) between the test locations 615a-615c is much greater than the average distance 619 (the average of 619d-619f) between the test locations 615d-615f. Thus, the test locations of the emergency test call depicted in FIG. 6C can be considered similarly accurate but far more precise than the test locations of the emergency call depicted in FIG. 6A.

In some embodiments, the emergency location analysis system uses these calculations to determine that the location accuracy of the emergency test call depicted in FIG. 6C is greater than the location accuracy of the emergency test call depicted in FIG. 6A. FIG. 6B illustrates the determination of an area 620 encompassed by a set of test locations recorded for a single emergency test call (in this case, the same test locations 615a-615c depicted in FIG. 6A). In some embodiments, the emergency location analysis system determines an area 620 encompassed by a set of locations recorded for a single emergency test call, calculate a value for the area 620, and incorporate the value of the area 620 into the calculation of the location accuracy for the emergency test call. FIG. 6D illustrates the determination of a distance 619 between a test location 615g and each of the other test locations 615h-615k recorded for the emergency test call depicted in FIG. 6D.

Calculating Location Accuracy Metric

In some embodiments, after calculating a location accuracy for one or more of the emergency test calls stored within the emergency test call database and associating the location accuracy with the attributes involved in the respective emergency test calls, the emergency location analysis system analyzes the emergency test call database to determine various attributes and combinations of attributes that frequently, or relatively frequently, produce inaccurate locations. In some embodiments, the emergency location analysis system analyzes the emergency test call database to determine attributes and combinations of attributes that produce location accuracy probabilities or metrics that fail to meet an accuracy threshold, which may be generated by the emergency location analysis system or manually set by an administrator of the emergency location analysis system.

For example, in some embodiments, the emergency location analysis system first determines a location accuracy for each attribute identified in the emergency test call database. In some embodiments, attributes identified in an emergency test call database include any of manufacturers, models, network carriers, battery levels, connection types (e.g., 3G or LTE), location sources (e.g., components used to generate test locations), operating systems, identifiers, accelerometer speeds, power saving statuses, or connectivity statuses (e.g., the presence of Bluetooth or Wi-Fi connections) of the test communication devices used to execute the emergency test calls for the emergency test call database. In some embodiments, attributes identified in the emergency test call database additionally or alternatively include any of times, dates, geographical areas, population densities of regions, or locations in which emergency test calls were executed. In some embodiments, attributes identified in the emergency test call database may additionally or alternatively include any of durations, destination numbers, or origination numbers of emergency test calls.

In some embodiments, for any particular attribute identified in the emergency test call database, the emergency location analysis system may query the emergency test call database for each entry (e.g., each record of an emergency test call) in the emergency test call database containing the particular attribute. In some embodiments, the emergency location analysis system can then create a set of distances (or location accuracies, as described above) by calculating, for each individual entry in emergency test call database containing the particular attribute, a distance between one or more of the test locations recorded in an individual entry and one or more of the corresponding ground-truth locations recorded in the individual entry. The emergency location analysis system can then calculate a location accuracy metric for the particular attribute using the set of distances or location accuracies. In some embodiments, the emergency location analysis system calculates a location accuracy metric for an attribute by calculating an average of each of the distances or location accuracies in the set of distances or location accuracies. In some embodiments, the emergency location accuracy system calculates a location accuracy metric for an attribute by comparing each location accuracy calculated for the attribute to an accuracy threshold. For example, for an emergency test call database comprising entries for emergency test calls made by the three test communication devices 410a-410c depicted in FIG. 4C, the attributes 413a-413c "Verizon," "AT&T," "Motorola," "RAZR2," and "CRZR" will be identified in the emergency test call database, wherein "Verizon" and "AT&T" are values for network carrier, "Motorola" is a value for device manufacturer, and "RAZR2" and "CRZR" are values for device model. In this example, the emergency location analysis system can calculate a location accuracy metric for the attribute "RAZR2" by first querying the emergency test call database for every entry including the attribute "RAZR2" (e.g., every emergency test call executed on a Motorola RAZR2 device) and calculating a location accuracy for each of the entries, as described above. For example, the emergency test database may comprise 10 entries for emergency test calls made by Motorola RAZR2 device (e.g., five emergency test calls made by test communication device 410a and five emergency test calls made by test communication device 410b), the ten entries producing location accuracies of: 10 m (e.g., the distance between the test locations and the ground-truth locations in this entry averaged to 10 meters), 15 m, 30 m, 25 m, 20 m, 40 m, 35 m, 10 m, 50 m, and 5 m.

In some embodiments, described herein is a method for determining a location accuracy metric for an attribute comprises: a) accessing a database comprising a set of entries, wherein each entry in the set of entries represents a unique phone call and comprises: i) a set of attributes associated with a test device from which the unique phone call was made; ii) a test location received from the test device during the unique phone call; and iii) a ground-truth location associated with the unique phone call; b) querying the database for each entry in the set of entries containing a first attribute in the set of attributes associated with the test device; c) creating a set of differences by calculating for each entry in the set of entries containing the first attribute in the set of attributes associated with the test device, a distance between the test location and the ground-truth location; and d) calculating, based on the set of differences, a location accuracy metric for the first attribute. In some embodiments, the unique phone call is a live emergency call made by a person in an actual emergency (e.g., not a test call), as described below with respect to FIGS. 10C and 10D. In some embodiments, the test location is a carrier-provided location. In some embodiments, the ground-truth location associated with the unique phone call is received from an emergency service provider (ESP) or an electronic device associated with an emergency responder.

Comparing Location Accuracy Metric to Accuracy Threshold

In some embodiments, after calculating a location accuracy for each of the entries in the emergency test call database including a particular attribute (e.g., the RAZR2 attribute in the example above), the emergency location analysis system then compares each of the location accuracies to an accuracy threshold, which is optionally generated by the emergency location analysis system or manually set by an administrator of the emergency location analysis system. As an example, an administrator of the emergency location analysis system sets the accuracy threshold to 35 m. In the example above, eight of the ten location accuracies (80%) meet or exceed the accuracy threshold. The emergency location analysis system is able to determine that the location accuracy metric for the RAZR2 attribute is 80%. However, a location accuracy and location accuracy metric may be calculated using other methodologies. For example, in some embodiments, the emergency location analysis system calculates a location accuracy metric for a particular attribute by calculating an average of the location accuracies associated with the particular attribute. For example, in the example above, the emergency location analysis system can calculate a location accuracy metric for the RAZR2 attribute by calculating the average of the location accuracies associated with the RAZR2 attribute to be 24 m. In some embodiments, a location accuracy metric is automatically generated for a particular attribute identified in the emergency test call database after the first instance in which the particular attribute is identified. In some embodiments, the location accuracy metric of a particular attribute identified in the emergency test call database is automatically updated with each occurrence of the particular attribute in an emergency test call.

Flagged (Problematic) Attributes

In some embodiments, after calculating a location accuracy for a particular attribute, the emergency location analysis system compares the location accuracy of the particular attribute to an accuracy threshold, which is optionally generated by the emergency location analysis system or manually set by an administrator of the emergency location analysis system. In response to the location accuracy of the particular attribute failing to meet the accuracy threshold, the emergency location system is able to flag the particular attribute as problematic or unreliable and add the particular attribute to a list of flagged attributes. For example, in the above example, the emergency location analysis system determines that an attribute with a location accuracy metric below 90% is a problematic attribute. Because the location accuracy metric calculated for the RAZR2 attribute (80%) is less than 90%, the emergency location analysis system optionally flags the RAZR2 attribute as a problematic or unreliable attribute and add the RAZR2 to a list of flagged attributes.

In some embodiments, described herein is a method for generating one or more flagged attributes comprises: a) accessing a database comprising a set of entries, wherein each entry in the set of entries represents a unique phone call and comprises: i) a set of attributes associated with a test device from which the unique phone call was made; ii) a test location received from the test device during the unique phone call; and iii) a ground-truth location associated with the unique phone call; b) calculating, for one or more entries in the set of entries, a respective distance between the test location and the ground-truth location; c) associating, for the one or more entries in the set of entries, the respective distance with each of the attributes in the set of attributes; d) calculating, for one or more attributes in the database, a location accuracy metric based on one or more respective distances associated with the one or more attributes; and e) flagging an attribute as a flagged attribute when the location accuracy metric of the attribute fails to meet an accuracy threshold.

Characteristic Engineering

Figure 7:
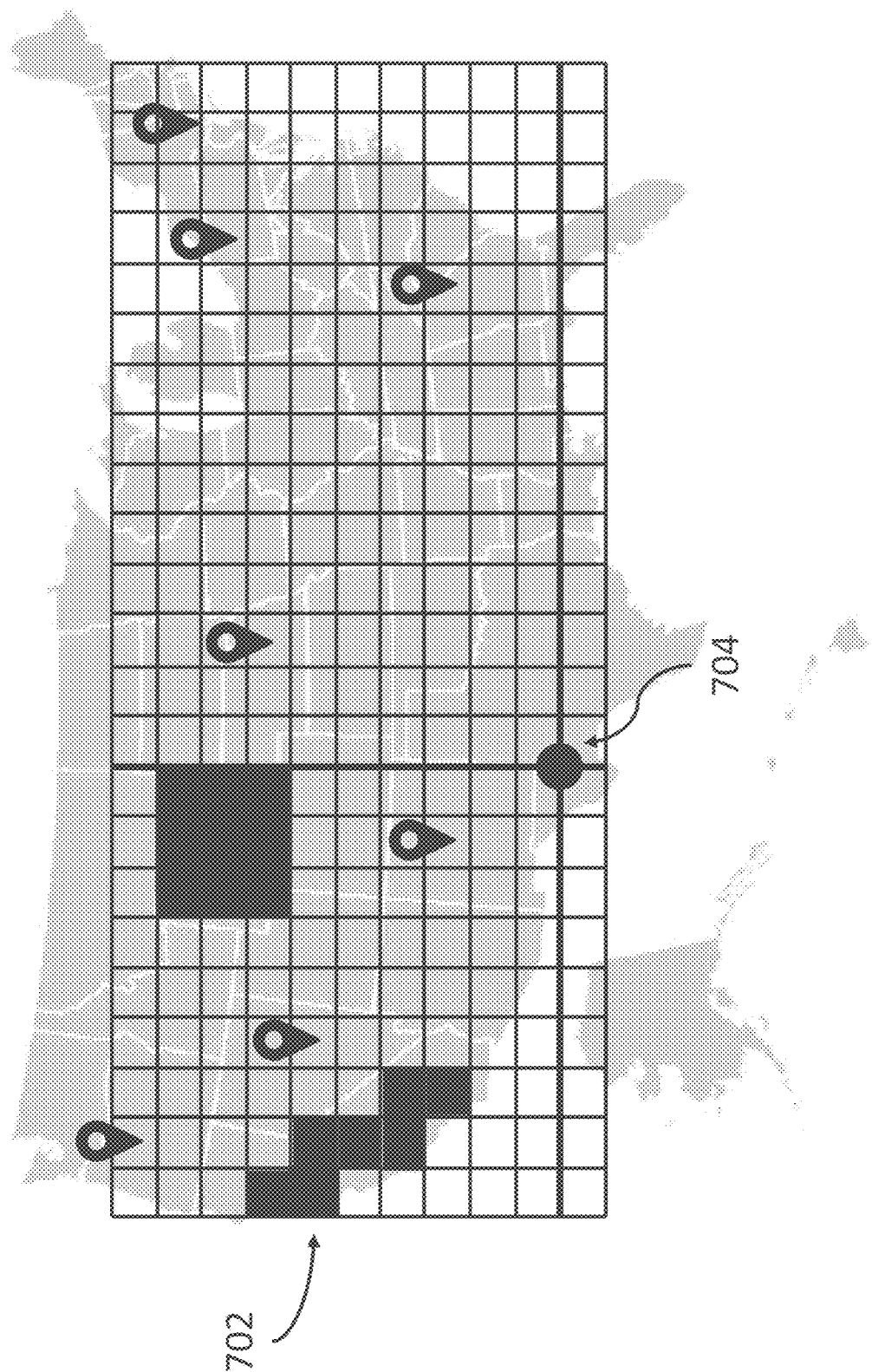
FIG. 7 illustrates an embodiment of feature engineering.

Although single attributes may influence the accuracy of a location generated by or for a communication device, it may also be the case that particular combinations of multiple attributes may combine to be the determining factor in generating accurate locations for or by a communication device. For example, calls made from Samsung communication devices using any network carrier may produce accurate locations nearly every time; however, Samsung communication devices using the Verizon network and generating a device-based hybrid location primarily using a Wi-Fi connection consistently produce inaccurate locations. For another example, Apple iPhone communication devices using a particular operating system (e.g., iOS 10) with Wi-Fi turned off may consistently produce inaccurate locations. In some embodiments, the emergency location analysis system can create or engineer a combination of attributes (hereinafter, "characteristic") using any number or combination of individual attributes recorded in the emergency test call database. For example, in some embodiments, the emergency location analysis system may engineer a characteristic comprising the Samsung (device manufacturer) and Verizon (network carrier) attributes. For another example, the emergency location analysis system may engineer a characteristic comprising the Samsung, Galaxy S6 (device model), and Verizon attributes. In another example, in some embodiments, the emergency location analysis system may engineer a characteristic using a device manufacturer attribute, a device model attribute, a network carrier attribute, and a geographic region attribute 702 (as depicted in FIG. 7). In another example, in some embodiments, the emergency analysis system may engineer a characteristic comprising a network carrier attribute and a particular latitude and longitude pair (or range of latitudes and longitudes) attribute 704 (as depicted in FIG. 7).

In some embodiments, the emergency location analysis system can calculate location accuracies and location accuracy metrics for a characteristic. For example, in some embodiments, the emergency location analysis system uses location accuracies generated for individual attributes, as described above, and combine the location accuracies to generate a characteristic location accuracy metric. For example, in some embodiments, if the location accuracies for a characteristic comprising the Samsung, Verizon, and Wi-Fi (as the primary location source) attributes are 10 m, 12 m, and 8 m, respectively, the emergency location analysis system calculates an average of the location accuracies to generate a characteristic location accuracy metric of 10 meters. For another example, in some embodiments, the emergency analysis system can generate a characteristic location accuracy metric for a particular characteristic by calculating a weighted average of the location accuracies of the attributes included in the characteristic. In another example, in some embodiments, for the characteristic described above comprising the Samsung, Verizon, and Wi-Fi attributes, if there are 8,000, 10,000, and 2,000 instances, respectively, of the respective attributes recorded in the emergency test call database, the emergency location analysis system can generate a characteristic location accuracy metric for the characteristic by multiplying the location accuracy of each of the included attributes by its percentage of the total instances and summing the result (e.g., (10 m×(8,000/20,000)+(12 m×(10,000/20,000))+8 m×(2,000/20,000)) to produce a characteristic location accuracy metric of 10.8 m. However, the emergency location analysis system may generate a characteristic location accuracy metric using location accuracies generated for individual attributes using alternative methods.

In some embodiments, the emergency location analysis system generates a characteristic location accuracy metric using only location accuracies for calculated for emergency test calls for which all of the individual attributes included in the characteristic are recorded. For example, for the characteristic described above comprising the Samsung, Verizon, and Wi-Fi attributes, although there may be 8,000, 10,000, and 2,000 respective instances of the respective attributes recorded in the emergency test call database, there may only be 1,000 entries in the emergency test call database in which each of the three attributes are recorded simultaneously. For example, there may only be 1,000 entries recorded for emergency test calls made by Samsung communication devices on the Verizon network wherein the primary source of the test location is a Wi-Fi connection. In this example, the emergency location analysis system can calculate a characteristic location accuracy (e.g., a distance between a test location and a corresponding ground-truth location) for each such entry. In some embodiments, the emergency location analysis system then calculates a characteristic location accuracy metric using the characteristic location accuracies in the same ways as the emergency location analysis may calculate a location accuracy metric for an individual attribute, as described above. However, the emergency location analysis is capable of calculating a characteristic location accuracy metric using characteristic location accuracies using other methods. In some embodiments, after a particular characteristic is engineered, a characteristic location accuracy metric for the particular characteristic is automatically updated with each occurrence of the particular characteristic in an emergency test call.

Emergency Call Mode

As mentioned above, various makes and models of communication devices may enter into an "emergency call mode"—not to be confused with an "emergency mode" that may be activated automatically or by a user of the device when the user is experiencing an emergency (e.g., a user may activate an "emergency mode" on their device when trapped in an elevator to preserve battery life)—that is automatically activated when the communication devices detect that a user has made an emergency call. The emergency call mode may affect various components of the communication device, which may in turn impact the communication device's ability to generate a device-based hybrid location.

For example, FIG. 8 depicts a sample of an emergency test call database 850. Depicted within the emergency test call database 850 are a series of emergency test call entries 852 representing emergency test calls made by the same test communication device. The first four emergency test calls represented in the emergency test call database 850 were made to non-emergency telephone number (415) 891-1911 and each have a reported accuracy radius of 3.9 meters. In each of the entries 852 shown for these emergency test calls, a speed and altitude of the test communication device at the time that the test location was generated is reported. In the remaining emergency test calls (beginning at emergency test call entry 852*a*) represented in the emergency test call database 850, emergency test calls were made to a genuine emergency telephone number, 9-1-1. In each of the entries 852 shown for these emergency test calls, the speed and the altitude of the test communication device at the time that the test location was generated are not reported. Additionally, the reported accuracy radius for these emergency test calls range from 23.422 meters to 65.881 meters, far greater (e.g., far less accurate) than the accuracy radius reported for the emergency test calls made to the non-emergency telephone number. The implication of the emergency test call entries 852 depicted in FIG. 8 is that the test communication device used to make these emergency test calls enters into an emergency call mode when the test communication device dials a call to a genuine emergency telephone number, and that some of the functions (e.g., the speed and altitude determining functions) of the test communication device are disabled or otherwise incapacitated, impacting the ability of the test communication device to generate or provide accurate locations.

In some embodiments, it is a purpose and advantage of the present disclosure to determine attributes (e.g., makes and models of communication devices, network carriers, etc.) or features (described above) that prompt communication devices to enter into an emergency call mode. In some embodiments, the emergency location analysis system determines that a particular attribute or feature prompts an emergency call mode by comparing test locations generated during emergency test calls including the particular attribute or feature made to non-emergency phone numbers to test locations generated during emergency test calls including the particular attribute or feature made to genuine emergency phone numbers. In some embodiments, the emergency location analysis system determines that a particular attribute or feature prompts an emergency call mode by comparing other attributes or features recorded during emergency test calls including the particular attribute or feature made to non-emergency phone numbers to corresponding attributes or features recorded during emergency test calls including the particular attribute or feature to genuine emergency phone numbers.

For example, in FIG. 8, the device manufacturer and device model of the test communication that executed an emergency test call represented by an emergency test call entry 852 is indicated by the phone number in the Caller column. As shown, the same test communication device, phone number 1 (646) 763-2413, is used to execute each of the emergency test calls represented in the emergency test call database depicted in FIG. 8. For example, the test communication device represented by phone number 1 (646) 763-2413 is a Samsung Galaxy S6. Thus, in this example, each of the emergency test call entries includes the Samsung (device manufacturer) and Galaxy S6 (device model) attributes and the feature comprising the Samsung and Galaxy S6 attributes. In some embodiments, to determine if the feature comprising the Samsung and Galaxy S6 attributes prompts an emergency call mode (e.g., if the Samsung Galaxy S6 communication device enters an emergency call mode when the device dials a genuine emergency telephone number), the emergency location analysis system can compare attributes (e.g., accuracy radius, speed, or altitude, as depicted in FIG. 8) recorded during emergency test calls made to non-emergency telephone numbers from the Samsung Galaxy S6 devices (as depicted in emergency test call entries 852a-852d) to the corresponding attributes recorded during emergency test calls made to genuine emergency telephone numbers from the Samsung Galaxy S6 devices (as depicted in emergency test call entries 852e-8521). For example, in some embodiments, the emergency location analysis system takes the average of the accuracy radii in 852a-852d and the average of the accuracy radii in 852e-8521 and calculates a difference between them. If the difference (in this case, a difference of 46.977 meters) exceeds a threshold (e.g., 20 meters), the emergency location analysis system may determine that the feature comprising the Samsung and Galaxy S6 attributes prompts an emergency call mode (e.g., the Samsung Galaxy S6 communication device enters an emergency call mode when the device dials a genuine emergency telephone number).

In some embodiments, the emergency location analysis system determines that a particular attribute or feature prompts an emergency call mode when an attribute (e.g., speed or altitude, as depicted in FIG. 8) recorded during an emergency test call including the particular attribute or feature made to a non-emergency telephone number is not recorded or generated during an emergency test call including the particular attribute or feature made to a genuine emergency telephone number. For example, as depicted in FIG. 8, the speed attribute is recorded for emergency test calls made to non-emergency telephone numbers by the test communication device represented by the Caller telephone number 1 (646) 763-2413 but is not recorded or generated during emergency test calls made to genuine emergency telephone numbers by the same test communication device. In some embodiments, the emergency location analysis system uses this information to determine that an attribute or feature associated with the test communication device prompts an emergency call mode. However, the emergency location analysis system may determine that a particular attribute or feature prompts an emergency call mode in any other way. In some embodiments, after determining that a particular attribute or feature prompts an emergency call mode, the emergency location analysis system can flag the particular attribute or feature and add the particular attribute or feature to the list of flagged attributes, as described above.

Location Improvement Rules

As mentioned above, in some embodiments, the emergency location analysis system analyzes the emergency test call database to improve upon location generated by or for communication devices. In some embodiments, the emergency location analysis system defines one or more location improvement rules using one or more attributes by: accessing a database (e.g., the emergency test call database) comprising a set of entries, wherein each entry in the set of entries represents a unique phone call (e.g., an emergency test call) and comprises: a set of attributes associated with a test device (e.g., a test communication device) from which the unique phone call was made, a test location received from the test device during the unique phone call, and a ground-truth location associated with the unique phone call; querying the database for each entry in the set of entries containing an attribute in the set of attributes associated with the test device matching the one or more attributes; creating a set of vectors by calculating, for each entry in the set of entries containing an attribute in the set of attributes associated with the test device matching the one or more attributes, a distance between the test location and the ground-truth location; and determining, based on the set of vectors a location improvement rule defined by the one or more attributes. In some embodiments, the one or more location improvement rules include a vector transformation or vector translation.

For example, in some embodiments, the emergency location analysis system analyzes the emergency test call database to identify attributes or features that produce inaccurate locations in consistent patterns. For example, while analyzing the emergency test call database, the emergency location analysis system may identify that a feature comprising the attributes "Verizon," "Motorola," and "RAZR2" (such as the test communication device 410a depicted in FIG. 4) consistently produces device-based hybrid locations 40-60 m northeast of their corresponding ground-truth locations. Thus, the emergency location analysis system determines that Motorola RAZR2 devices running on the Verizon network produce device-based hybrid locations that are inaccurate in a consistent pattern—off by 40-60 m to the northeast. In this example, the emergency location analysis system defines a location improvement rule for the feature that is a vector transformation of 50 m southwest. However, the emergency location analysis system can define location improvement rules using other methods.

Real-Time Location Analysis

In some embodiments of the present disclosure, an emergency management system employs an emergency location analysis system to validate a reported location associated with an emergency request (e.g., a 9-1-1 call or an emergency alert) by detecting an emergency request from a first device; identifying a reported location associated with the emergency request; identifying one or more attributes associated with the emergency request; determining a location accuracy metric for the emergency request using the one or more attributes; comparing the location accuracy metric to an accuracy threshold, wherein the reported location is converted to a validated location when the location accuracy metric meets the accuracy threshold; in response to the location accuracy metric meeting the accuracy threshold, providing the validated location to one or more recipients comprising a public safety answering point (PSAP).

In some embodiments of the present disclosure, an emergency management system employs an emergency location analysis system to improve the location accuracy associated with a reported location of an emergency request by detecting an emergency request from a first device; identifying a reported location associated with the emergency request; identifying one or more attributes associated with the emergency request; inputting the one or more attributes into the emergency location analysis system; defining one or more location improvement rules determined by the emergency location analysis system using the one or more attributes associated with the emergency request; applying the one or more location improvement rules to the reported location to generate an improved location; and providing the improved location to one more recipients comprising a public safety answering point (PSAP).

In some embodiments of the present disclosure, an emergency management system employs an emergency location analysis system to generate a predicted location associated with an emergency request by detecting an emergency request from a first device; identifying a reported location associated with the emergency request; identifying one or more attributes associated with the emergency request; inputting the one or more attributes into the emergency location analysis system to generate a predicted location for the emergency request; and providing the predicted location to one or more recipients, wherein the recipients comprise a public safety answering point (PSAP).

Figure 9:
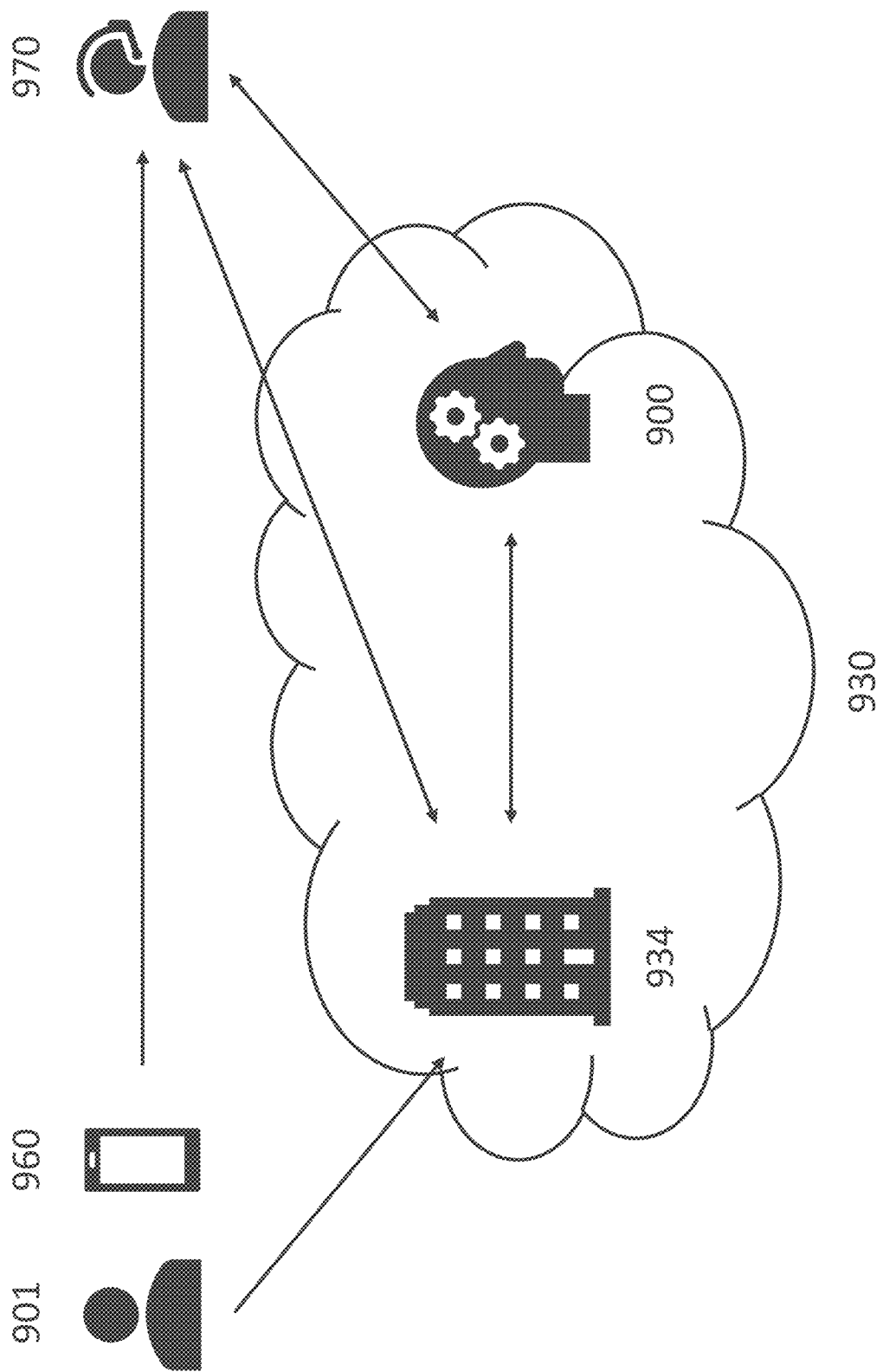
FIG. 9 depicts an embodiment of a system for analyzing a reported location.

FIG. 9 depicts an embodiment of a system for analyzing and providing locations to emergency service providers (e.g., public safety answering points (PSAPs), emergency dispatch centers, first responders, etc.). In some embodiments, the system includes a user 901, a communication device 960 associated with the user, an emergency management system (EMS) 930, a clearinghouse 934, an emergency location analysis system 900, and an emergency dispatch center 970 (e.g., a PSAP). In some embodiments, the clearinghouse 934 and the emergency analysis system 900 are comprised within the EMS 930. In some embodiments, an emergency response software, program, or application is installed on the communication device 960. In some embodiments, the clearinghouse 934 is communicatively coupled to the communication device 960, the emergency location analysis system 900, and the emergency dispatch center or PSAP 970. In some embodiments, the emergency location analysis system 900 is communicatively coupled to the emergency dispatch center or PSAP 970. In some embodiments, the communication device 960 is configured to execute an emergency call to the emergency dispatch center or PSAP 970. The emergency dispatch center or PSAP 970 may comprise a public safety answering point, such as a 9-1-1 calling center, or an emergency dispatch center, such as a fire station, hospital, or police station.

Figure 10A:
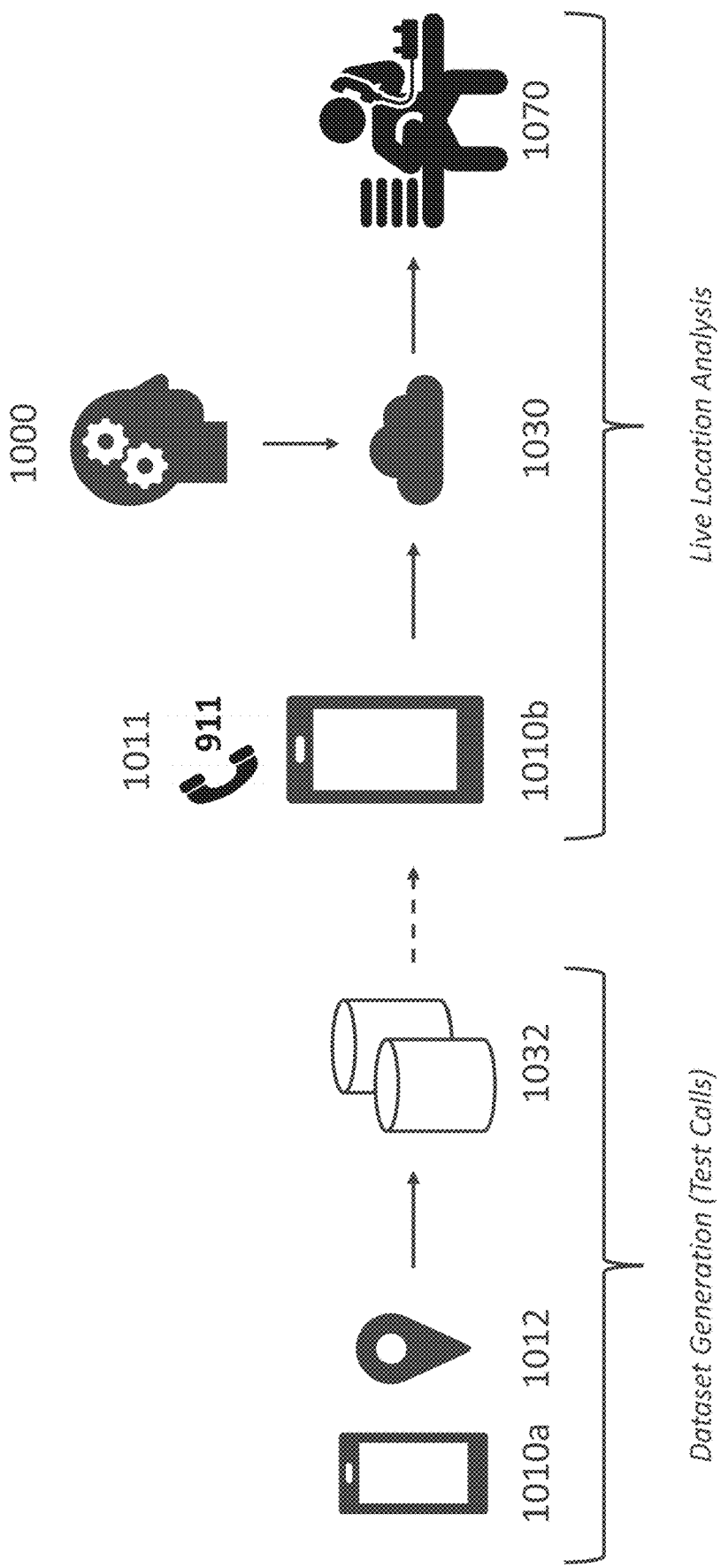
FIG. 10A, FIG. 10B, FIG. 10C, and FIG. 10D depict flow diagrams for analyzing a reported location.
Figure 10B:
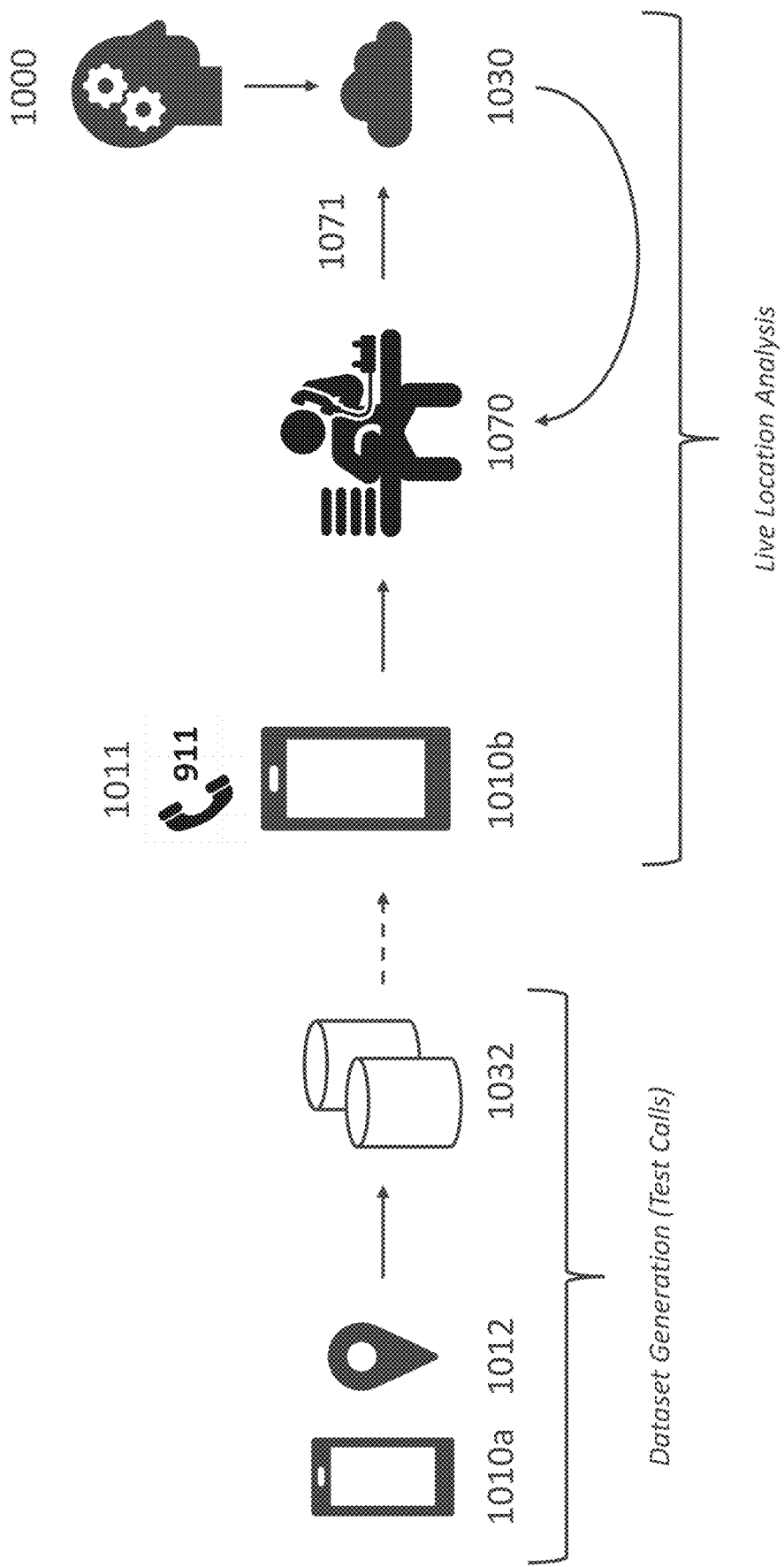

FIGS. 10A and 10B depict flow diagrams for analyzing and providing locations to emergency service providers. In some embodiments, a plurality of emergency test calls is executed from a plurality of test communication devices 1010a on a plurality of network carriers in a plurality of locations, as described above. For each of the emergency test calls, as described above, at least one test location is generated for or by a test communication device 1010a and at least one corresponding ground-truth location 1012 is received from a locationing device or locationing service, as described above. For each of the emergency test calls, as described above, the at least one test location and the at least one ground-truth location is recorded in an entry along with one or more attributes associated with the emergency test call in an emergency test call database 1032. In some embodiments, as described above, an emergency location analysis system can then analyze the emergency test call database 1032 to identify problematic devices, attributes, or combinations of devices and attributes that produce inaccurate locations, improve upon inaccurate locations generated by or for communication devices, and predict locations of communication devices subsequent to locations received from the communication devices. The process of executing a plurality of emergency test calls and storing the resultant data (e.g., test locations, ground-truth locations, and associated attributes) in an emergency test call database (as described above) can be referred to as "dataset generation." The process of detecting an emergency request, identifying a reported location and attributes associated with the emergency request, and analyzing the reported location using the attributes and the emergency test call database (e.g., test locations, ground-truth locations, and associated attributes) can be referred to as "live location analysis," as described below.

Detecting an Emergency Request

In some embodiments, when a person or user implicated in an emergency situation calls an emergency service provider (e.g., executes an emergency call 1011, such as by calling 9-1-1 in the United States) on a communication device 1010b, an emergency management system (EMS) 1030 detects an emergency request from the communication device 1010b. In some embodiments, the EMS 1030 detects the emergency request by receiving an emergency alert in the form of a short message service (SMS) message (including a text message or a data SMS), multimedia messaging service (MMS) message, or HTTP post containing information regarding the emergency request. In some embodiments, the SMS message, MMS message, or HTTP post is delivered to the EMS 1030 by the communication device 1010b, such as via an emergency response application installed on the communication device. In some embodiments, the SMS message, MMS message, or HTTP post is delivered to the EMS 1030 from a device manufacturer or network carrier.

Identifying a Reported Location

In some embodiments, after detecting an emergency request from a communication device, the EMS 1030 can identify a reported location associated with the emergency request. In some embodiments, the EMS 1030 identifies the reported location associated with the emergency request by receiving an emergency alert (e.g., an SMS message, MMS message, or HTTP post) containing a payload of information regarding the emergency request and extracting the reported location from the payload. In some embodiments, the emergency alert is delivered to the EMS 1030 by the communication device 1010*b*, such as via an emergency response application installed on the communication device. In some embodiments, the emergency alert is delivered to the EMS 1030 from a device manufacturer or network carrier. In some embodiments, the reported location is delivered to the EMS 1030 directly by the communication device 1010*b*.

Identifying One or More Attributes Associated with the Emergency Request

In some embodiments, after detecting an emergency request from a communication device, the EMS 1030 can identify one or more attributes associated with the emergency request. In some embodiments, the EMS 1030 identifies the one or more attributes associated with the emergency request by receiving an emergency alert (e.g., an SMS message, MMS message, or HTTP post) containing a payload of information regarding the emergency request and extracting the one or more attributes associated with the emergency request from the payload. In some embodiments, the emergency alert is delivered to the EMS 1030 by the communication device 1010*b*, such as via an emergency response application installed on the communication device. In some embodiments, the emergency alert is delivered to the EMS 1030 from a device manufacturer or network carrier. In some embodiments, the one or more attributes associated with the emergency request may include, but are not limited to: manufacturer, model, network carrier, battery level, connection type (e.g., 3G or LTE), location source (e.g., components used to generate the reported location), operating system, identifier, accelerometer speed, power saving status, or connectivity status (e.g., the presence of Bluetooth or Wi-Fi connections) of the communication device. In some embodiments, the one or more attributes associated with the emergency request may additionally or alternatively include the destination number or origination number of the emergency call. In some embodiments, the one or more attributes may additionally or alternatively include any of the time, date, geographical area, population density of the region, or location in which the emergency call was executed.

Determining a Location Accuracy Metric for the Emergency Request

In some embodiments, the EMS 1030 employs the emergency location analysis system 1000 to determine a location accuracy metric for the emergency request using the one or more attributes associated with the emergency request. In some embodiments, the EMS 1030 delivers the one or more attributes associated with the emergency request to the emergency location analysis system 1000. In some embodiments, the emergency location analysis system 1000 determines a location accuracy metric for the emergency request using the one or more attributes associated with the emergency request by accessing the emergency test call database. In some embodiments, the emergency location analysis system 1000 determines a location accuracy metric for the emergency request by: accessing an emergency test call database comprising a set of entries, wherein each entry in the set of entries represents a unique emergency test call and comprises: a set of attributes associated with a test communication device from which the unique emergency test call was made, a test location received from the test communication device during the unique emergency test call, and a ground-truth location associated with the unique emergency test call; querying the emergency test call database for each entry in the set of entries containing an attribute in the set of attributes associated with the test communication device matching the one or more attributes associated with the emergency request; creating a set of distances (or location accuracies) by calculating, for each entry in the set of entries containing an attribute in the set of attributes associated with the test communication device matching the one or more attributes associated with the emergency request, a distance between the test location and the ground-truth location; and calculating, based on the set of distances (or location accuracies), a location accuracy metric, as described above.

For example, in some embodiments, for an emergency call made to an emergency service provider using an Apple iPhone 6S on the AT&T network with no Wi-Fi connection, the EMS 1030 may identify Apple (device manufacturer), iPhone 6S (device model), AT&T (network carrier), and no Wi-Fi (device connectivity) as attributes associated with an emergency request generated on the Apple iPhone 6S. In some embodiments, the emergency location analysis system 1000 then queries the emergency test call database for each entry including the Apple attribute, every entry including the iPhone 6S attribute, each entry including the AT&T attribute, each entry including the no Wi-Fi attribute, or any combination thereof. In some cases, the technologies (e.g., GPS, Wi-Fi, Bluetooth, Cell, etc.) used in generating a device-based hybrid location have a significant impact on the accuracy of the device-based hybrid location, as depicted in Table 3, shown below. After querying the database for the relevant entries, in some embodiments, the emergency location analysis system 1000 then calculates a location accuracy (as described above) for each entry including the Apple attribute, a location accuracy for each entry including the iPhone 6S attribute, a location accuracy for each entry including the AT&T attribute, and a location accuracy for each entry including the no Wi-Fi attribute. Finally, the emergency location analysis system 1000 can then calculate a location accuracy metric (as described above) for the emergency request using each of the calculated location accuracies. For example, the emergency location analysis system 1000 may calculate a location accuracy metric for the emergency request by calculating an average or weighted average (as described above) of the calculated location accuracies. In another example, the emergency location analysis system 1000 may calculate a location accuracy metric for the emergency request by using the lowest (e.g., least accurate) location accuracy of the calculated location accuracies. However, the emergency location analysis system 1000 may calculate a location accuracy metric for the emergency request using other methods.

TABLE 3

Sample Accuracy for Location Determination Technologies

| Technology | | Fixes [A] | Fix Rate Occurrence [B] | % Fixes w/in threshold [C] | % Blended Fixes [B X C] |
|---|---|---|---|---|---|
| Technology 1 | Outdoor | 830 | 88.5% | 80.8% | 71.5% |
| | Indoor | 120 | 12.5% | 63.4% | 7.9% |
| | Total | 950 | | | 79.4% |
| Technology 2 | Outdoor | 120 | 19.9% | 79.8% | 15.9% |
| | Indoor | 830 | 79.2% | 80.2% | 63.5% |
| | Total | 950 | | | 79.4% |
| Technology 3 | Outdoor | 0.0 | 0.0% | 0.0% | 0.0% |
| | Indoor | 100 | 100.0% | 10.0% | 10.0% |
| | Total | 100 | | | 10.0% |

In some embodiments, the emergency location analysis system 1000 can determine a location accuracy metric for the emergency request by querying the emergency test call database for a location accuracy metric of each attribute in the one or more attributes associated with the emergency request that matches an attribute recorded in the emergency test call database, for which a location accuracy metric may have been previously calculated (as described above), and use each of the location accuracy metrics returned by the emergency test call database to determine a location accuracy metric for the emergency request. For example, if a user or person implicated in an emergency situation calls 9-1-1 from a Samsung Galaxy S6 on the Verizon network while connected to a Wi-Fi network, the EMS 1030 may identify Samsung (device manufacturer), Galaxy S6 (device model), Verizon (network carrier), and Wi-Fi (device connectivity) as attributes associated with an emergency request generated on the Samsung Galaxy S6. In some embodiments, the emergency location analysis system 1000 then queries the emergency test call database for a location accuracy metric for each of the Samsung, Galaxy S6, Verizon, and Wi-Fi attributes. In some embodiments, the emergency location analysis system calculates a location accuracy metric for the emergency request by calculating an average of the location accuracy metrics of the Samsung, Galaxy S6, Verizon, and Wi-Fi attributes. In some embodiments, the emergency location analysis system calculates a location accuracy metric for the emergency request by calculating a weighted average (as described above) of the location accuracy metrics of the Samsung, Galaxy S6, Verizon, and Wi-Fi attributes. In some embodiments, the emergency location analysis system 1000 calculates a location accuracy metric for the emergency request using the lowest (e.g., least accurate) location accuracy metric of the location accuracy metrics of the Samsung, Galaxy S6, Verizon, and Wi-Fi attributes. However, the emergency location analysis system 1000 may calculate a location accuracy metric for the emergency request using other methods.

For example, in some embodiments, the emergency location analysis system 1000 determines a location accuracy metric for the emergency request by comparing the one or more attributes associated with the emergency request to a list of flagged attributes (as described above). In some embodiments, in response to determining that an attribute comprised in the one or more attributes associated with the emergency request appears on the list of flagged attributes, the emergency location analysis system 1000 can assign a binary 0 for the location accuracy metric for the emergency request. In some embodiments, in response to determining that none of the attributes comprised in the one or more attributes associated with the emergency request appears on the list of flagged attributes, the emergency location analysis system 1000 can assign a binary 1 for the location accuracy metric for the emergency request. In some embodiments, in response to determining that an attribute comprised in the one or more attributes associated with the emergency request appears on the list of flagged attributes, the emergency location analysis system 1000 calculates a location accuracy metric for the emergency request by calculating a weighted average of the location accuracies calculated for each of the attributes comprised in the one or more attributes associated with the emergency request while weighing the location accuracy calculated for the attribute that appears on the list of flagged attributes more severely than the other attributes comprised in the one or more attributes.

In some embodiments, the emergency location analysis system 1000 determines a location accuracy metric for the emergency request by querying the emergency test call database for a location accuracy for one or more features identified in the one or more attributes associated with the emergency request matching a feature recorded in the emergency test call database, for which a feature location accuracy may have been previously calculated (as described above), and use the one or more feature location accuracies returned by the emergency test call database to determine a location accuracy metric for the emergency request. For example, in the Samsung Galaxy S6 example above, the emergency test call database may have previously engineered and calculated a feature location accuracy metric (as described above) for a feature comprising the Samsung, Galaxy S6, Verizon, and Wi-Fi attributes. In some embodiments, the emergency location analysis system 1000 queries the emergency test call database for this feature location accuracy metric and use it as the location accuracy metric for the emergency request. In some embodiments, the emergency location analysis system 1000 determines a location accuracy metric for the emergency request by applying the one or more attributes associated with the emergency request to a machine learning algorithm, as described below.

Comparing a Location Accuracy Metric to an Accuracy Threshold and Providing a Validated Location to One or More Recipients In some embodiments, after calculating a location accuracy metric of an emergency request, the EMS 1030 or emergency location analysis system 1000 compares the location accuracy metric for the emergency request to an accuracy threshold to validate the reported location. In many instances, in order to dispatch emergency help the location of an emergency (e.g., a dispatch location), an emergency service provider (e.g., an emergency dispatch center or public safety answering point (PSAP)) legally requires the dispatch location to have a high degree of accuracy (hereinafter, "dispatching accuracy threshold"). For example, an emergency service provider may require that a dispatch location has an accuracy radius of less than 50 meters. Accordingly, in such instances, it is necessary to determine whether or not a location generated by a communication device and reported to the emergency management system 1030 is accurate enough to deliver to an emergency service provider. In some embodiments, after comparing a location accuracy metric of an emergency request to an accuracy threshold, if the location accuracy metric meets or exceeds the accuracy threshold, the reported location associated with the emergency request is converted to a validated location and provided to one or more emergency server providers 1070 (e.g., a PSAP). In some embodiments, the accuracy threshold is a dispatching accuracy threshold. In some embodiments, after providing a validated location to the one or more recipients, the validated location is displayed on a PSAP display. In some embodiments, the EMS 1030 receives a location request 1071 for an emergency request from a PSAP, as depicted by FIG. 10B. In some embodiments, the emergency request is an emergency call made from a communication device to a PSAP. In some embodiments, the EMS 1030 receives a location request 1071 from a PSAP during an emergency call made from a communication device to a PSAP. In some embodiments, the EMS 1030 provides a validated location to a PSAP only after receiving a location request 1071 from the PSAP.

FIGS. 10A and 10B depict flow diagrams for analyzing and providing locations to emergency service providers. In some embodiments, as described above, a plurality of emergency test calls is executed from a plurality of test communication devices on a plurality of network carries in a plurality of locations. In such embodiments, for each of the emergency test calls, at least one test location is generated for or by a test communication device and at least one corresponding ground-truth location is received from a locationing device or locationing service, as described above. For each of the test emergency calls, the at least one test location and the at least one ground-truth location are recorded in an entry along with one or more attributes associated with the emergency test call in an emergency test call database. The emergency test call database can then be analyzed to identify problematic devices, attributes, or combinations of devices and attributes that produce inaccurate locations.

However, it is anticipated that a dataset for an emergency test call database (or the equivalent) could be generated in a number of different ways. For example, in some embodiments, a dataset for an emergency test call database 1032 is generated using data from live emergency calls. In one example, as depicted by FIGS. 10A and 10B, when a person experiences an emergency and executes an emergency call 1011a (e.g., the person dials 9-1-1) from a communication device 1010c, the EMS 1030 detects an emergency request and receives both a reported location generated by the communication device 1010c and one or more attributes associated with the emergency request (such as in the payload of an emergency alert, as described above). The emergency call 1011a is received by an emergency service provider (ESP; e.g., a PSAP) 1070a that responds to the emergency call. In responding to the emergency call, the ESP 1070a determines a ground-truth location associated with the emergency request. For example, in some embodiments, the ESP 1070a determines a ground-truth location associated with the emergency request by receiving an address from the person who executed the emergency call 1011a (e.g., a PSAP call taker asks the caller for their location and the caller verbally provides the PSAP caller with an address). In some embodiments, the ESP 1070a determines a ground-truth location associated with the emergency request when an emergency responder (e.g., a policeman) arrives at the scene of the emergency and records the ground-truth location (e.g., a set of coordinates or an address). Once the ESP 1070a has determined the ground-truth location associated with the emergency request, the ESP 1070a then transmits the ground-truth location associated with the emergency request to the EMS 1030. The EMS 1030 then records the reported location generated by the communication device 1010c, the ground-truth location determined by the ESP 1070a, and the one or more attributes associated with the emergency request as a data entry in an emergency test call database 1032. This process can be repeated for a plurality of live emergency calls, thereby generating a dataset of reported locations and corresponding ground-truth locations stored in the emergency test call database 1032.

In some embodiments, both a reported location generated by a communication device 1010c and an associated ground-truth location are sent to the EMS 1030 by the ESP 1070a. For example, in some embodiments, a communication device 1010c sends a reported location directly or indirectly to the ESP 1070a as part of an emergency request. In this example, the ESP 1070a can determine a ground-truth location associated with the emergency request, as described above, and then send both the reported location and the ground-truth location to the EMS 1030. In some embodiments, an emergency test call database 1032 is generated entirely using only data from live emergency calls made by people in actual emergencies (e.g., not test emergency calls). In some embodiments, an emergency test call database 1032 is generated using data from live emergency calls made by people in actual emergencies as well as data from test emergency calls.

Figure 10C:
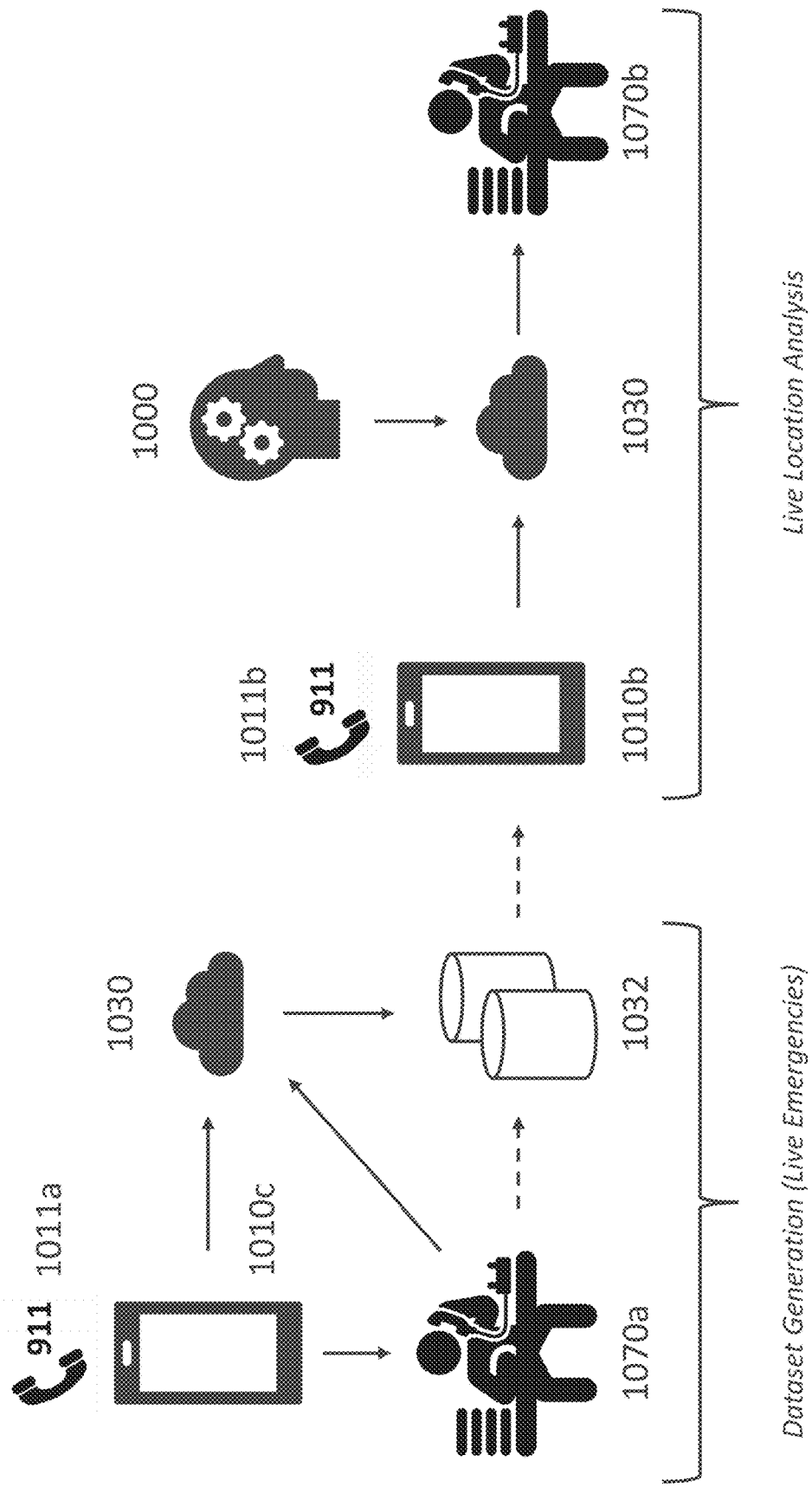
Figure 10D:
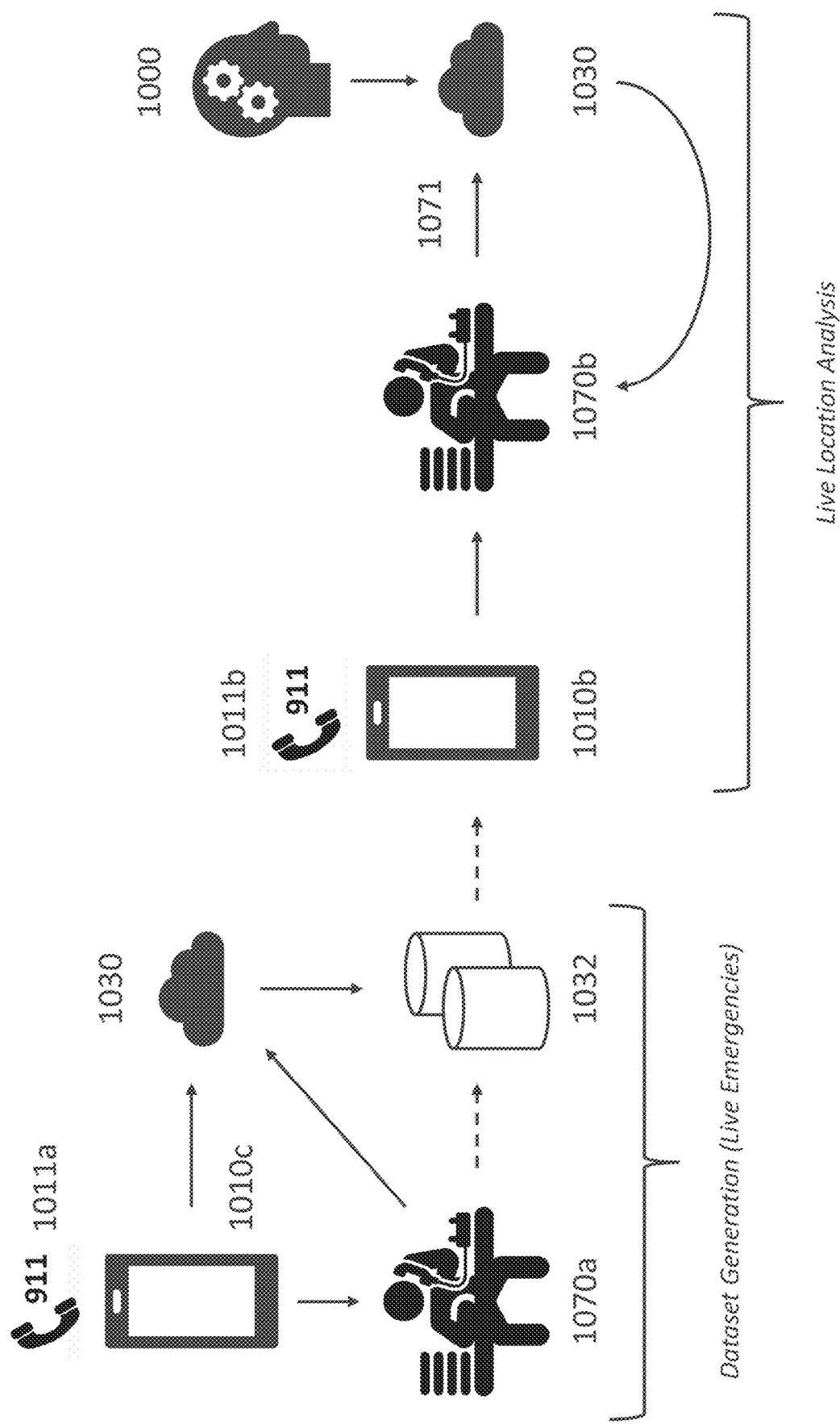

Analogous to the live location analysis processes depicted in FIGS. 10A and 10B, once the emergency test call database 1032 has been generated, the emergency location analysis system 1000 can then analyze the emergency test call database 1032 to identify problematic devices, attributes, or combinations of devices and attributes that produce inaccurate locations, improve upon inaccurate locations generated by or for communication devices, and predict locations of communication devices subsequent to locations received from the communication devices, as described above. As depicted by FIG. 10C, the emergency location analysis system 1000 can use the emergency test call database 1032 to calculate a location accuracy metric for reported location associated with a live emergency request, such as a 9-1-1 call 1011b from communication device 1010b, compare the location accuracy metric to a location accuracy threshold (also referred to as an "accuracy threshold"), and convert the reported location to a validated location if the location accuracy metric meets the location accuracy threshold, as described above. The EMS 1030 can then provide the validated location to an emergency service provider (ESP) 1070b. In some embodiments, as depicted by FIG. 10D, the EMS 1030 receives a location request 1071 for an emergency request from an ESP 1070b. In some embodiments, the emergency request is an emergency call 1011b made from a communication device 1010b to the ESP 1070b. In some embodiments, the EMS 1030 receives a location request 1071 from the ESP 1070b during an emergency call 1011b made from a communication device 1010b to the ESP 1070b. In some embodiments, the EMS 1030 provides a validated location to the ESP 1070b only after receiving a location request 1071 from the ESP 1070b.

In some embodiments, the accuracy threshold that the reported location is compared to is either assigned the value of a routing accuracy threshold or a dispatching accuracy threshold, wherein the dispatching accuracy threshold is higher than the routing accuracy threshold (e.g., the dispatching accuracy threshold has a greater degree of accuracy than the routing accuracy threshold). In many cases, when an emergency call is made, the call is routed to an emergency service provider (e.g., a PSAP) that is selected from multiple emergency service providers based on the proximity of the emergency service provider to the location of the emergency call. However, in many cases, this selection process must occur very quickly, and often an emergency service provider is selected for routing before an accurate location is determined for the emergency call, which can result in the selection of an emergency service provider that is not in fact the closest or most appropriate emergency service provider to receive or respond to the emergency call. In such cases, when a reported location is not accurate enough for dispatching, the reported location may still be accurate enough for routing the emergency call to a more appropriate emergency service provider. In some embodiments, the EMS 1030 or emergency location analysis system 1000 can compare a location accuracy metric determined for an emergency request to a first accuracy threshold, wherein the first accuracy threshold is a routing accuracy threshold; and in response to the location accuracy metric meeting or exceeding the first accuracy threshold, the EMS 1030 provides the validated location associated with the emergency request to one or more recipients comprising a PSAP and deliver an indication to the PSAP that the validated location is suitable for emergency routing. In some embodiments, the EMS 1030 or emergency location analysis system 1000 can compare a location accuracy metric determined for an emergency request to a second accuracy threshold, wherein the second accuracy threshold is a dispatching accuracy threshold and comprises a higher degree of accuracy than the first accuracy threshold; and, in response to the location accuracy metric meeting or exceeding the second accuracy threshold, the EMS 1030 provides the validated location associated with the emergency request to one or more recipients comprising a PSAP as suitable for emergency dispatching.

Figure 11:
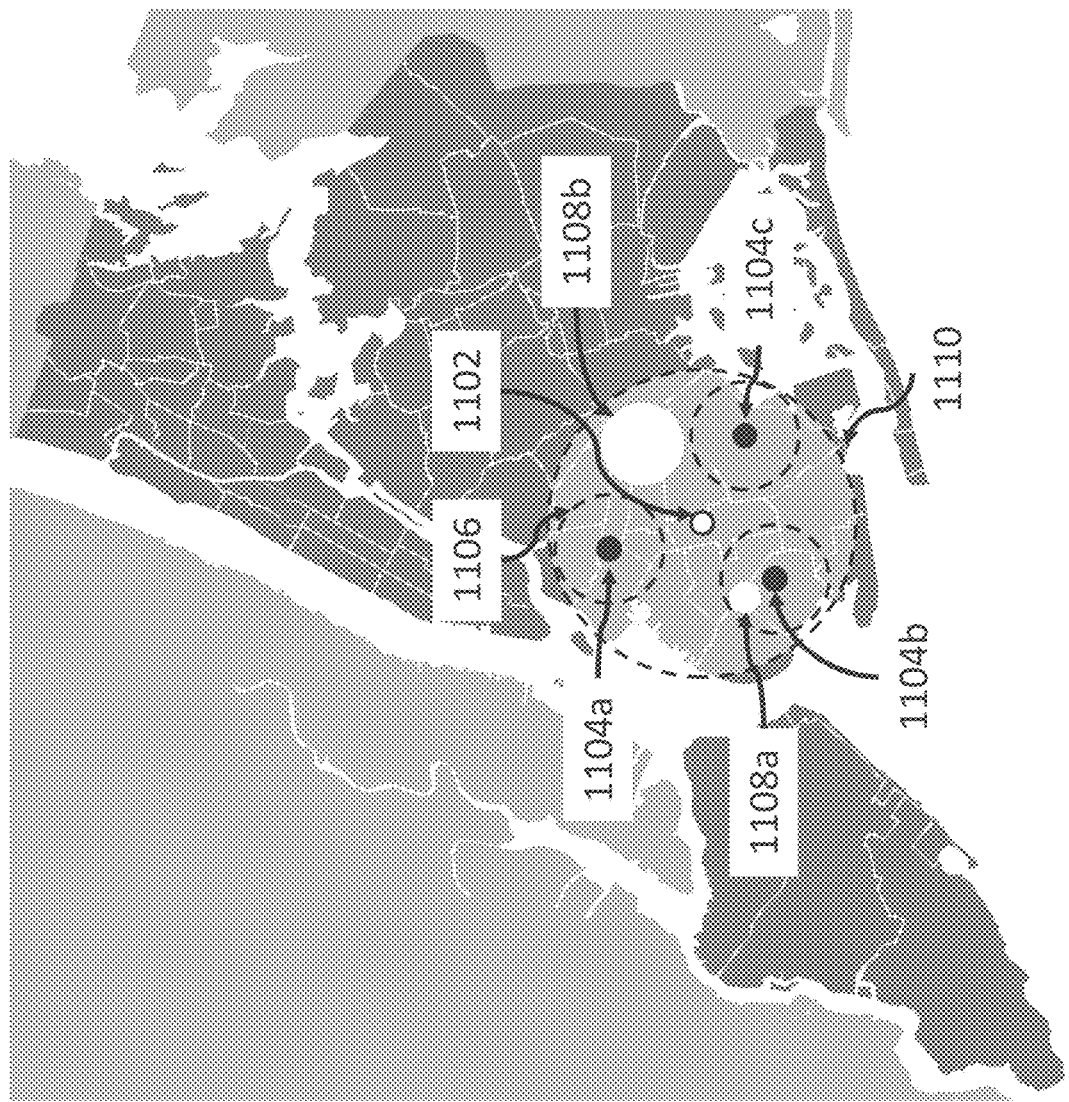
FIG. 11 depicts an embodiment of an emergency dispatch center routing and dispatching.

For example, FIG. 11 depicts an embodiment of an emergency dispatch center routing and dispatching in Brooklyn, N.Y. For example, a PSAP 1102 may have an authoritative jurisdiction 1110 defined by a circular geofence. If a location query is received from PSAP 1102, the credentials associated with the location query may be evaluated to identify the PSAP 1102. Before returning a validated location, the location analysis system may look up the authoritative jurisdiction 1110 of the PSAP 1102. If the validated location falls within the circular geofence, the system may provide the validated location to PSAP 1102. On the other hand, if the validated location falls outside the circular geofence, the system may not provide the validated location (e.g., may respond with "no location found" response). In some embodiments, if the validated location is a significant distance away from the geofence (e.g., above a distance threshold), the validated location may not be provided to the requesting ESP (PSAP 1102). In this way, the location analysis system may flag "bad" or "suspect" location as it is outside the geofence of the requesting party.

In some embodiments, a buffer region may be defined around the boundary of the geofence and the locations falling within the buffer region can be treated as locations falling within the geofence. In some embodiments, the buffer region may be 1 meter to 10 km, or between 200 meters to 5 km, preferably 2 km. Although FIG. 11 shows circular geofences (also referred to as proximity jurisdictions), it is understood that geofences may of any regular shape (e.g., square, rectangle, polygon) or irregular shapes.

In another example, the location analysis system differentially process authoritative jurisdictions, administrative jurisdictions and assigned jurisdiction. For example, the smaller circular geofences may define assigned jurisdictions 1106 of ESPs 1104a, 1104b and 1104c (e.g., police departments) within a larger authoritative jurisdiction 1110 of PSAP 1102. When a location query is received from an ESP (e.g., a police dispatcher in 1104a), the location analysis system may provide the validated location if it does not fall within its assigned jurisdiction 1106a, but within the authoritative region 1108.

In another example, a Brooklyn resident dials 9-1-1. A location 1108b is generated by the resident's phone and delivered to the EMS 1030. As depicted in FIG. 11, the location 1108b falls within the jurisdiction 1110 of public safety answering point (PSAP) 1102, so the resident's emergency call is routed to PSAP 1102. However, the location accuracy metric (represented by the radius of the white circle of location 1108b) of the location 1108b is too inaccurate for the PSAP 1102 to determine which emergency service provider 1104 to dispatch emergency help from (e.g., whether the location 1108b is closer to emergency service provider 1104a or 1104c). Worse yet, the location 1108b may be too inaccurate for the PSAP 1102 to be legally allowed to pick an emergency service provider 1104. In this case, instead of forgoing delivering the location 1108b to the PSAP 1102, the EMS 1030 may validate and deliver the location 1108b to the PSAP 1102 with an indication that the location 1108b is accurate enough for routing but not accurate enough for dispatching. In another example, a second Brooklyn visitor dials 9-1-1. A location 1108a is generated by the visitor's phone and delivered to the EMS 1030. In this case, the location accuracy metric of the location 1108a is easily accurate enough for routing the visitor's emergency call to PSAP 1102. Additionally, the location accuracy metric of the location 1108a is accurate enough for the PSAP 1102 to select emergency service provider 1104b to dispatch emergency help from. The location 1108a is both clearly discernible as closest to emergency service provider 1104b and completely confined within the jurisdiction 1106 of emergency service provider 1104b. In this case, the EMS (or location analysis system) may validate and deliver the location 1108a to the PSAP 1102 as suitable for dispatching.

In some embodiments, the EMS generates a suggestion (hereinafter, "dispatch suggestion) for which emergency service provider an emergency dispatch center or PSAP should select to respond to an emergency request. In some embodiments, the EMS accesses locations for emergency dispatch centers 1102 and emergency service providers 1104. In some embodiments, after detecting an emergency request, identifying a reported location associated with the emergency request, and validating the reported location (or generating an improved location or predicted location for the emergency request), the EMS accesses a set of locations for emergency service providers 1104 and determine, based on the reported location and the set of locations (e.g., a location for each of emergency service providers 1104a-1104c) for emergency service providers 1104, an emergency service provider 1104 most suitable for responding to the emergency request and generate a dispatch suggestion. In some embodiments, the EMS determines the emergency service provider 1104 based at least in part on the proximity of the emergency service provider 1104 to the reported location. In some embodiments, the EMS determines the emergency service provider 1104 based at least in part on the nature of the emergency (e.g., fire or medical). In some embodiments, the EMS determines the emergency service provider 1104 based at least in part on the equipment or personnel available at the emergency service provider. After generating a dispatch suggestion, the EMS provides the dispatch suggestion to one or more recipients, such as an emergency service provider 1104 or emergency dispatch center (or PSAP) 1102. In some embodiments, the EMS provides a dispatch suggestion to the one or more recipients in combination with a validated location, improved location, or predicted location. In some embodiments, the EMS provides the dispatch suggestion to the emergency service provider 1104 that was determined to be most suitable for responding to the emergency request.

Figure 12A:
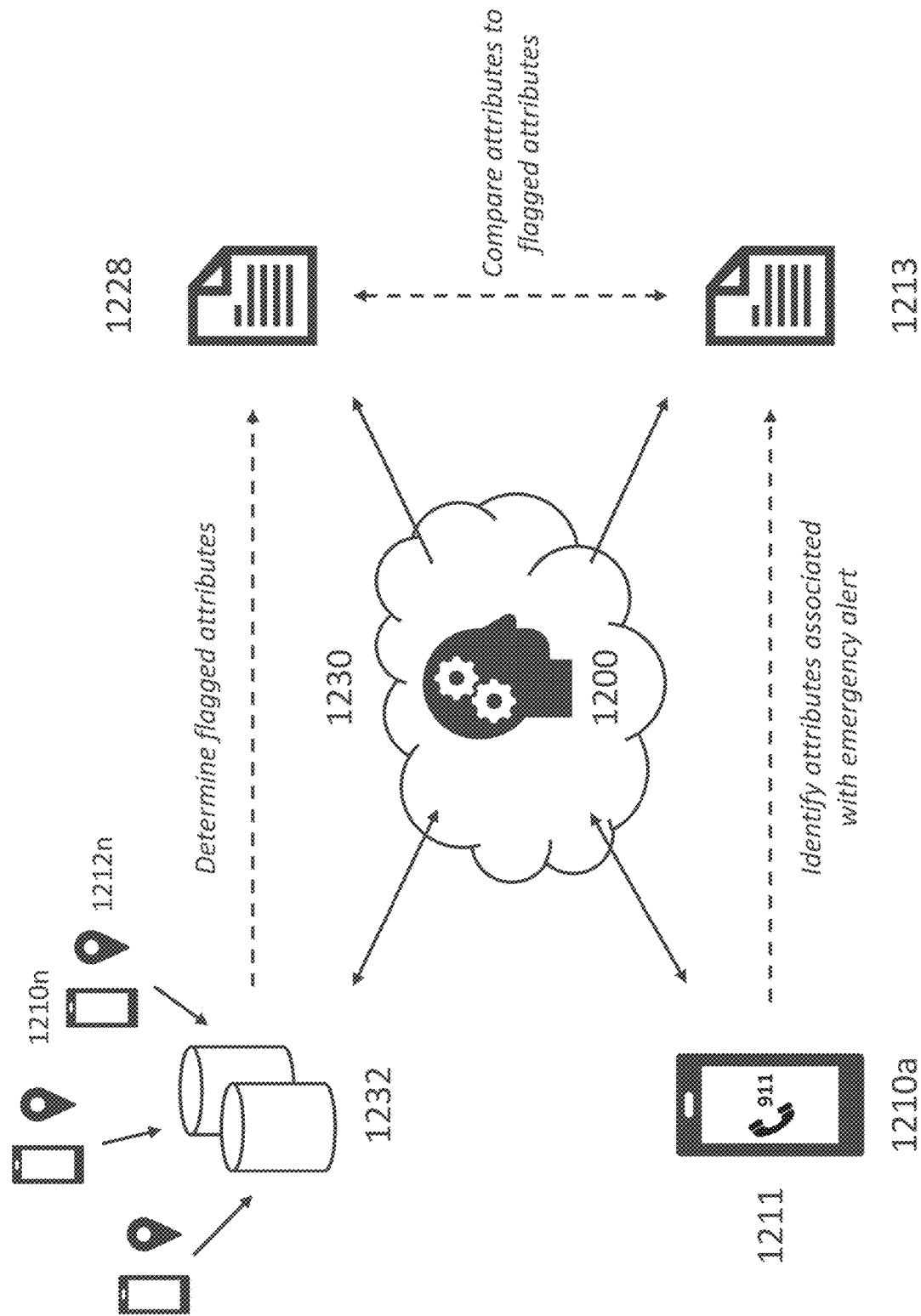
FIG. 12A and FIG. 12B depict embodiments of a process for analyzing a reported location.
Figure 12B:
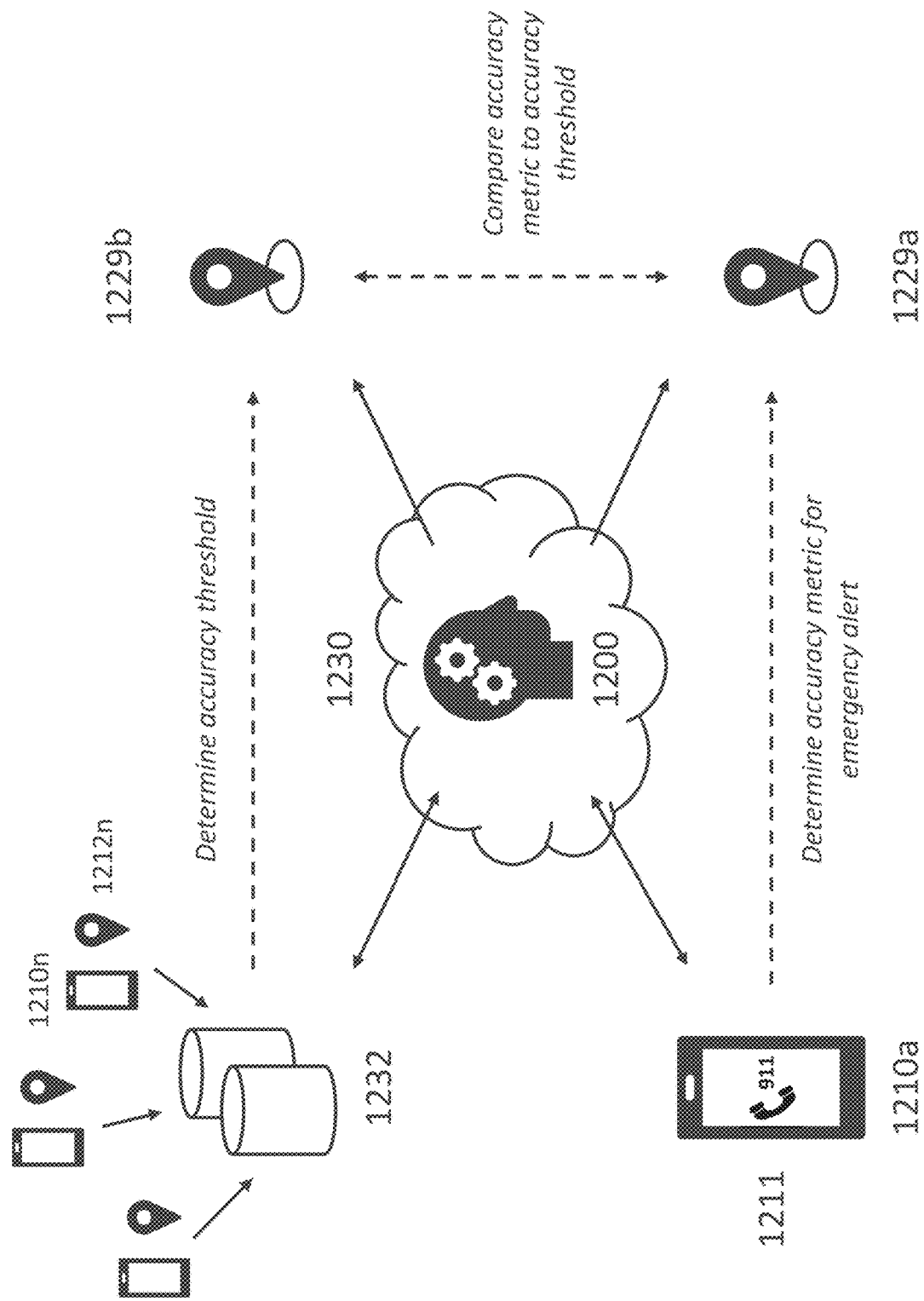

FIGS. 12A and 12B depict embodiments of a live location analysis process for validating a reported location. In some embodiments, an emergency management system (EMS) 1230 employs a location analysis system 1200 to detect an emergency request 1211 from a first device 1210; identify a reported location associated with the emergency request 1211; identify one or more attributes associated with the emergency request 1211; compare the one or more attributes to one or more flagged characteristics; and, in response to determining that none of the one or more attributes match any of the one or more flagged characteristics, convert the reported location into a validated location and provide the validated location to one or more emergency service providers. In some embodiments, the one or more flagged characteristics include one or more flagged attributes, as described above. In some embodiments, the one or more flagged characteristics include a location accuracy threshold, as described above. However, in some embodiments, the one or more flagged characteristics may include a single attribute, a combination of attributes, multiple combinations of attributes, the existence of various circumstances, or any other qualitative or quantitative characteristic.

FIG. 12A depicts an embodiment of a live location analysis process for validating a reported location in which the one or more flagged characteristics include one or more flagged attributes. As depicted in FIG. 12A, the location analysis system accesses an emergency test call database 1232 generated using data (test locations, ground-truth locations 1212n, and associated attributes, as described above) from a plurality of emergency test calls executed on a plurality a test communication devices 1210n (as described above) and analyzes the emergency test call database 1232 to determine one or more flagged attributes 1228 (as described above). When the emergency management system (EMS) 1230 detects an emergency request 1211 (e.g., a 9-1-1 call made from communication device 1210a), the EMS 1230 identifies a reported location and one or more attributes 1213 associated with the emergency request 1211 (as described above). The location analysis system 1200 can then compare the one or more attributes 1213 associated with the emergency request to the one or more flagged attributes 1228. In some embodiments, if none of the one or more attributes 1213 match any of the one or more flagged attributes 1228, the location analysis system 1200 converts the reported location into a validated location and the EMS 1230 provides the validated location to an emergency service provider (ESP; e.g., a PSAP) (as described above). In some embodiments, if any of the one or more attributes 1213 match any of the one or more flagged attributes 1228, the location analysis system 1200 forgoes converting the reported location into a validated location and the EMS 1230 forgoes providing the reported location to an ESP.

FIG. 12B depicts an embodiment of a live location analysis process for validating a reported location in which the one or more flagged characteristics include a location accuracy threshold. In some embodiments, as depicted by FIG. 12B, the location analysis system 1200 access an emergency test call database 1232 generated using data (test locations, ground-truth locations 1212n, and associated attributes, as described above) and analyzes the emergency test call database 1232 to determine a location accuracy threshold 1229b. In some embodiments, the location accuracy threshold 1229b is a predetermined value. When the emergency management system (EMS) 1230 detects an emergency request 1211 (e.g., a 9-1-1 call made from communication device 1210a), the EMS 1230 identifies a reported location and one or more attributes associated with the emergency request 1211. In some embodiments, the location analysis system can then use the one or more attributes associated with the emergency request 1211 and the emergency test call database 1232 to determine a location accuracy metric 1229a for the emergency request (as described above). In some embodiments, the location accuracy metric 1229a is included in a payload associated with the emergency request (e.g., a payload included in an emergency alert, as described above). Once the location accuracy metric 1229a has been determined for the emergency request, the location analysis system 1200 compares the location accuracy metric 1229a to the location accuracy threshold 1229b. In some embodiments, if the location accuracy metric 1229a meets or exceeds the location accuracy threshold 1229b, the location analysis system 1200 converts the reported location into a validated location and the EMS 1230 provides the validated location to an ESP (as described above). In some embodiments, if the location accuracy metric 1229a fails to meet or exceed the location accuracy threshold 1229b, the location analysis system forgoes converting the reported location into a validated location and the EMS forgoes providing the reported location to an ESP.

In some embodiments, a method for validating a reported location associated with an emergency request comprises: a) receiving a reported location associated with an emergency communication; b) identifying one or more attributes associated with the emergency communication; c) comparing the one or more attributes to one or more flagged characteristics, wherein any attribute that matches a flagged characteristic is flagged; and d) in response to determining that none of the one or more attributes match any of the one or more flagged characteristics, converting the reported location into a validated location and providing the validated location to one or more emergency service providers (ESOs). In some embodiments, the emergency communication is an emergency request. In some embodiments, the emergency communication is an emergency alert.

In some embodiments, a method for validating a reported location associated with an emergency request comprises: a) receiving a reported location associated with an emergency communication; b) identifying one or more attributes associated with the emergency communication; c) analyzing the one or more attributes based on one or more flagged characteristics, thereby generating a result indicating whether the reported location satisfies an accuracy requirement; and d) in response to the result indicating that the reported location satisfies the accuracy requirement, converting the reported location into a validated location and providing the validated location to one or more emergency service providers (ESPs).

In some embodiments, a method for validating a reported location associated with an emergency request comprises: a) receiving a reported location associated with an emergency communication; b) identifying one or more attributes associated with the emergency communication; c) analyzing the one or more attributes based on one or more flagged characteristics, thereby generating a result indicating whether the reported location satisfies an accuracy requirement; and d) performing one of the following based on the result in step c): i) in response to the result indicating that the reported location satisfies the accuracy requirement, converting the reported location into a validated location and providing the validated location to one or more emergency service providers (ESPs); or ii) in response to the result indicating that the reported location does not satisfy the accuracy requirement, not providing the reported location to the one or more ESPs.

In some embodiments, the validated location is not provided to the one or more ESPs if the validated location is not within one or more geofences associated with the one or more ESPs. For example, the location analysis system may identify the requesting party (e.g., using credentials in the location query) and look up the authoritative/administrative/assigned jurisdiction or administrative of the requesting party. If the reported location is not within the jurisdiction of the requesting party or a significant distance from the jurisdictional region or geofence (e.g., above a distance threshold, more than 10 kms, more than 50 kms, or more than 100 kms), the system may flag that reported location as "suspect" and not provide a validated location to the requesting party.

Location Prediction

Figure 13:
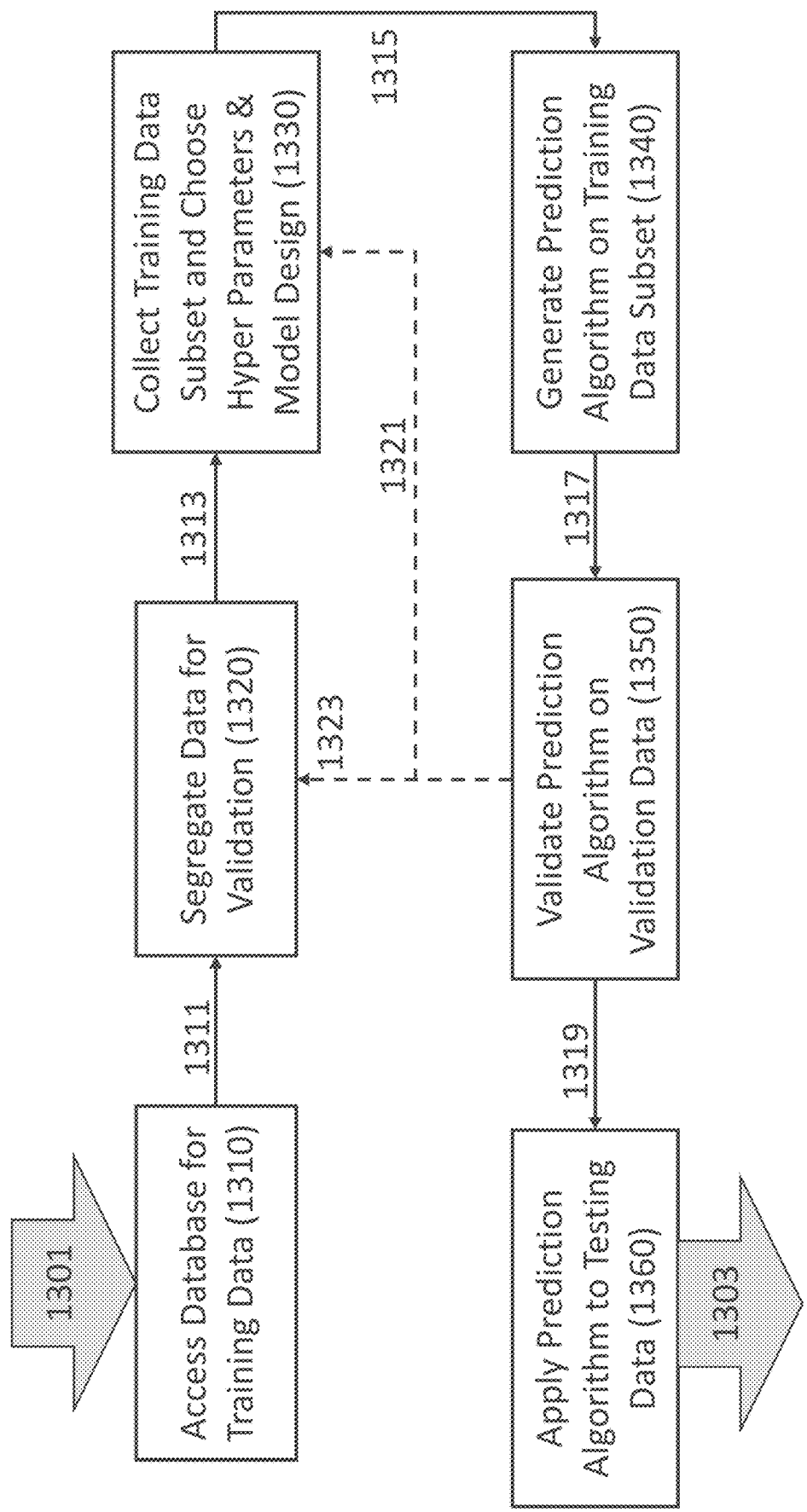
FIG. 13 illustrates an embodiment of a machine learning algorithm flow chart.

FIG. 13 illustrates a method used by the ELAS for analyzing location data for validation and prediction. In some embodiments, statistical methods (e.g., regression analysis) are used on the testing data for generating a prediction model. For example, matrix inversion may be used to solve for variables in the prediction model. In some embodiments, when a new emergency request comes in (e.g., a 9-1-1 call), the ELAS applies the attributes from the incoming call to the prediction model to obtain a validation or prediction.

In some embodiments, machine learning techniques are used for generating a prediction algorithm for location validation and prediction. Table 4 depicts various considerations for developing machine-learning schemas for location validation and prediction.

TABLE 4

Machine-learning Considerations

| Name | Description | Acceptance Criteria | Comments |
|---|---|---|---|
| Data organization | Training data (emergency call data including metadata) should be matched up and stored in a persistent data storage or database (e.g., dynamo). | Emergency call data includes ground-truth location, and is stored in dynamo | The ground-truth lat/lon and the calculated distance between device-based hybrid location (DBHL) and the ground-truth. |
| Engineered Location Features | A system to classify lat/lon locations designed to assist in training the models. | A classification algorithm for raw lat/lon | Bucketing and binning techniques may be used. |
| API endpoint | This endpoint should be able to take a POST request of emergency call data, and return a distance from ground-truth prediction | Returns a distance from ground-truth in meters. | |
| Input pipeline classes | The pipeline classes make it easy to read and collect the log data and transform into ML friendly formats | Fetch data from data storage (e.g., S3 or read from csv files), and return a dataframe which can be fed into a model from scikit or tensorflow. | See example of a DataFrameMapper. |
| Analytics | Analyze portions of the training dataset using a library to assist in creating visual aids, and statistics based on selected attributes (e.g., carrier, network type, etc.) | | |
| Model tuning | Model tuning may be automated through the use of grid search in Scikit or similar function in tensorflow | Automated tuning of hyper parameters can be implemented. | This may require input from admin, such as adjusting the parameters for the exhaustive search. |

A block diagram depicts an embodiment of a machine-learning algorithm in FIG. 13. As shown, the raw testing data (e.g., emergency calls and non-emergency test calls) may be stored in a database (e.g., database 107a in FIG. 1A). For example, "raw data consumption classes" may collect emergency request data (e.g., j son logs) from the database which may be saved in an s3 bucket in a cloud platform. In some embodiments, the data is pruned by verifying the integrity of the data and organizing it in the database. In some embodiments, the data is saved in a persistent database such as postgres, mysql, reddis. In some embodiments, the data may include "analysis classes" based on admin input (e.g., patterns in the data).

Next, in the exemplar algorithm shown in FIG. 13, the data is segregated in the Validation Module 1320 into training data (for training the prediction algorithm), validation data (for evaluation of algorithm) and test data (for making predictions) in various ways. In some embodiments, the training data is anywhere between 20-90% of the data, validation data between 0-30% of the data and testing data is between 1-20% of the data. In some embodiments, the data may be segregated into training data (75-80%), validation data (15-20%), testing data (2-5%). For example, Scikit modules are optionally used to segregate the data.

In the Design Module 1330, model design and hyperparameters are optionally selected for the prediction algorithm. In some embodiments, a neutral network (e.g., recurrent neural network, long-short-term memory (LS™), a convolutional neural network) or support vector machine (SVM) is chosen to for generating for predict algorithm. In some embodiments, SVM and neural networks are used in combination. In some embodiments, SVM is chosen when data is sparse. In some embodiments, LS™ is used for predicting location in a time sequence. For example, Tensorflow Library or Scikit can be used to find an appropriate model.

In some embodiments, the training data is inputted in a training module 1340 through an "input pipeline 1315" into the Training module 1340. In some embodiments, batch learning is used for training while in others on-line training will be implemented. As an example, new and processed training data are put in feeder classes to be inputted into the Training Module 1340. For example, gradient descent is optionally used in the Training Module 1340. In some embodiments, once data has been inputted, it is marked as used. In some embodiments, the output 1317 of the Training module may be validated in the Validation Module 1350. As an example, the validation error is minimized in an iterative manner.

The Testing Module 1360 applies the validated prediction algorithm to the test data. In some embodiments, the test data are segregated test data from the Segregation Module 1330. In some embodiments, the test data are on-going emergency calls. In some embodiments, the output pipeline 1303 provides the predictions that can be used by the ELAS for location validation and prediction.

In some embodiments, for validation, the ELAS obtains an output, which is a distance from ground-truth (in meters) using a regressor prediction algorithm. The predicted distance from ground-truth may be compared to one or more location accuracy thresholds to generate an output on whether the reported location should be provided to a PSAP or other recipients. In some embodiments, the ELAS determines a "hold" or "send" by on a classifier prediction algorithm. In some embodiments, statistical analysis and graphical display including location accuracy, loss, and baseline location accuracy are also generated as an output. In some embodiments, the output is in a format compatible with the PSAP1 (e.g., PSAP1 250 in FIG. 2B) and provided via a clearinghouse (e.g., clearinghouse 240 in FIG. 2B).

For prediction, in some embodiments, the ELAS determines the coordinates (lat-long) for the predicted location of the emergency. In some embodiments, the prediction location may also include an altitude in meters. In some embodiments, the ELAS calculates a location accuracy metric (e.g., accuracy radius, confidence) to determine the predicted location of the emergency. In some embodiments, the ELAS determines a probability distribution of the predicted location of the emergency.

Real-Time Location Improvement

As described above, in some embodiments, the emergency location analysis system analyzes the emergency test call database to improve upon location generated by or for communication devices. In some embodiments, the emergency location analysis system defines one or more location improvement rules using one or more attributes by: accessing a database (e.g., the emergency test call database) comprising a set of entries, wherein each entry in the set of entries represents a unique phone call (e.g., an emergency test call) and comprises: a set of attributes associated with a test device (e.g., a test communication device) from which the unique phone call was made, a test location received from the test device during the unique phone call, and a ground-truth location associated with the unique phone call; querying the database for each entry in the set of entries containing an attribute in the set of attributes associated with the test device matching the one or more attributes; creating a set of vectors by calculating, for each entry in the set of entries containing an attribute in the set of attributes associated with the test device matching the one or more attributes, a distance between the test location and the ground-truth location; and determining, based on the set of vectors a location improvement rule defined by the one or more attributes.

As mentioned above, in some embodiments, the emergency management system employs the emergency location analysis system to improve the location accuracy associated with a reported location of an emergency request by detecting an emergency request from a first device; identifying a reported location associated with the emergency request; identifying one or more attributes associated with the emergency request; inputting the one or more attributes into the emergency location analysis system; defining one or more location improvement rules determined by the emergency location analysis system using the one or more attributes associated with the emergency request; applying the one or more location improvement rules to the reported location to generate an improved location; and providing the improved location to one more recipients comprising a public safety answering point (PSAP). In some embodiments, the one or more location improvement rules include a vector transformation. In some embodiments, applying the one or more location improvement rules to a reported location to generate an improved location further comprises applying a vector transformation to the reported location. In some embodiments, the emergency request is an emergency call to a PSAP from the first device. In some embodiments, the EMS receives a location request from the PSAP during the emergency call. In some embodiments, the EMS and emergency location analysis system dynamically update and redeliver the improved location to the PSAP during the emergency call. In some embodiments, the improved location is dynamically updated on a periodic interval.

For example, in some embodiments, after the EMS detects an emergency request from a communication device, the EMS identifies a reported location associated with the emergency request, and identifies one or more attributes associated with the emergency request, as described above, the emergency location analysis system can identify an attribute or feature that produces inaccurate locations in a consistent pattern. For example, as in the Motorola RAZR2 example discussed above, while analyzing the emergency test call database, the emergency location analysis system may have previously identified that Motorola RAZR2 devices running on the Verizon network produce device-based hybrid locations that are inaccurate in a consistent pattern—off by 40-60 m to the northeast—and defined a location improvement rule for the feature comprising the attributes "Verizon," "Motorola," and "RAZR2" that is a vector transformation of 50 m southwest. In this example, if the EMS or emergency location analysis system identifies the attributes "Verizon," "Motorola," and "RAZR2" in the one or more attributes associated with an emergency request, the emergency location analysis system can transform or translate the reported location associated with the emergency request by 50 m southwest to generate an improved location for the emergency request. The EMS can then provide the improved location to one or more recipients comprising a public safety answering point (PSAP). In some embodiments, providing the improved location to the one or more recipients comprising a PSAP further comprises delivering an indication to the PSAP that the improved location is distinct from the reported location.

In some embodiments, applying one or more location improvement rules to a reported location to generate an improved location further comprises: calculating a distance between the reported location and a user-defined location; comparing the distance to a proximity threshold; and, in response to the distance meeting the proximity threshold, generating the improved location by snapping the reported location to the user-defined location. In some embodiments, the user-defined location is stored on the first device. In some embodiments, the user-defined location is received by the EMS through a mobile application installed on a communication device. In some embodiments, the user-defined location is a home or work address of a user associated with the communication device. For example, a user calls 9-1-1 using a communication device on which the user has installed an emergency response mobile application (e.g., emergency response application). The user has previously entered three user-defined locations through the emergency response mobile application: a home address, an office address, and a vacation home address. In this example, when the user calls 9-1-1, the mobile application delivers an HTTP post comprising information regarding an emergency request to the EMS. In this example, the information regarding the emergency request includes one or more attributes associated with the emergency request, a device-based hybrid location generated by the communication device (e.g., a reported location), and the three user-defined locations previously entered by the user. The EMS delivers the one or more attributes, the device-based hybrid location, and the user-defined locations to the emergency location analysis system. In this example, using the one or more attributes associated with the emergency request, the emergency location analysis system calculates a location accuracy metric for the emergency request and determines that the location accuracy metric does not meet an accuracy threshold. Thus, the EMS forgoes providing the device-based hybrid location to a PSAP. In this example, however, the emergency location analysis system also determines that the device-based hybrid location is within 50 meters of the vacation home address. In some embodiments, the emergency location analysis system then generates an improved location for the emergency request by snapping the device-based hybrid location to the vacation home address. In further embodiments, the EMS then provides the PSAP with the improved location (e.g., the vacation home address) with an indication that that the improved location is distinct from the device-based hybrid location. However, the emergency location analysis system may generate an improved location using other methods.

PSAP Display

FIGS. 14A and 14B depict examples of PSAP displays. In FIG. 14A, the PSAP display 1410 may have different sections such as call controls 1420 (for call handling), ALI display 1440 (basic information about the emergency) and enhanced data 1430. In some embodiments, the enhanced data 1140 includes latitude/longitude 1421, confidence 1423, radius 1425, and altitude 1427. In some embodiments, the ALI display 1440 displays location information (e.g., carrier-provided location with lower accuracy (300 meters) as compared to the enhanced data 1430 (more decimal places, 10.22 meters).

In some embodiments, the PSAP display 1410 includes a button 1429 for displaying additional information about the location data (e.g., accuracy is sufficient for dispatching or routing, source of location data or any other relevant information about the location data).

In some embodiments, the PSAP display 1410 includes a button 1431 for providing feedback about the location data (e.g., "good" or "bad" or "is the location helpful?"). In some embodiments, the PSAP personnel enters numerical value such as "ground-truth location", "location accuracy", "distance from ground-truth", etc. In some embodiments, the ELAS processes the feedback and input the information for data analysis. As an example, the PSAP enters the ground-truth location, which allows the emergency call to be used as test data for machine-learning.

It is contemplated that a responder display can be generated in a similar way. In some embodiments, one or more responders (e.g., in responder vehicles 282 & 284) provide feedback through responder devices about the location information. As an example, the responder enters the ground-truth location, which allows the emergency call to be used as test data for machine-learning. In some embodiments, the location where the responder assets or vehicles are parked can be used to ascertain a ground-truth location. Accordingly, in some embodiments, live emergency calls are used for training the machine-learning algorithm. Dfgdfgdfg In addition, in some embodiments, the PSAP display 1410 includes a button 1433 for additional information. In some embodiments, the additional information comprises information in the ADR database in the clearinghouse 240 in FIG. 2B.

The PSAP display 1450 in FIG. 14B shows a graphical display where the validated or predicted location is shown on a map. As shown, the validated location 1452 (depicted by X) is shown with a confidence circle 1459. On the display 1450, the carrier-provided location 1456 is also displayed, which is a distance 1457 from the validated location. In some embodiments, it is contemplated that carrier-provided location may be used as an attribute for location validation, when available. For example, the difference between the reported location and the carrier-provided location may be calculated and a large difference could be used as a flagged characteristic, as described in FIG. 12A.

Location Feedback

In some embodiments, after providing a validated location, an improved location, or a predicted location (as described below), the EMS receives feedback on the validated location, improved location, or predicted location. In some embodiments, the EMS receives feedback regarding the validated location, improved location, or predicted location from a PSAP (e.g., from a PSAP that the EMS delivered the location to). For example, in some embodiments, the EMS receives qualitative feedback on a location provided to a PSAP such as "Good," "Bad," "Helpful," or "Not Helpful." In some embodiments, the feedback is received from an emergency responder. In some embodiments, the feedback is received from the emergency responder after the emergency responder arrives at the validated location, improved location, or predicted location. In some embodiments, the feedback is generated from the selection of a feedback button on an electronic device associated with the emergency responder. In some embodiments, the feedback is generated from the selection of a feedback button on a PSAP display, as depicted in FIG. 14A.

In some embodiments, the EMS receives a ground-truth location pertaining to the emergency request from the PSAP; and pairs the ground-truth location with the reported location in a database. For example, after providing a PSAP with a validated location, improved location, or predicted location for an emergency request, the PSAP optionally dispatches an emergency responder to the validation location, improved location, or predicted location. In some cases, the PSAP later learns a ground-truth location corresponding to the reported location, such as by the emergency responder arriving at the true location of the emergency request. In such instances, the PSAP optionally provides the ground-truth location to the EMS, which is able to store the ground-truth location with the reported location in an emergency test call database. In some embodiments, the EMS may then treat the reported location, ground-truth location, and any attributes associated with the emergency request as an additional entry in the emergency test call base, just as if the emergency request had been an emergency test call, and analyze the additional entry as described above. For example, the emergency location analysis system may analyze these additional entries to better validate reported locations, identify problematic attributes or features, define location improvement rules, or predict locations. In this way, the EMS is able to gather additional data to better train the emergency location analysis system.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device. In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™ PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, sub-notebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Certain Terminologies

As referenced herein, an "emergency location analysis system" (ELAS) refers to a system that analyzes data associated with an emergency request (e.g., emergency call data and/or emergency test call data) for validation, improvement or prediction of location data. In some embodiments, ELAS applies a prediction algorithm or prediction model to the emergency request data to obtain a location accuracy metric (e.g., a distance from ground-truth, location accuracy, confidence). In some embodiments, the ELAS may apply one or more thresholds (e.g., a routing threshold) to determine if a reported location should be "sent" or "held" from one or more recipients (e.g., a public safety answering point or PSAP).

As used herein, a "recipient" refers to one or more persons, services, or systems that receive a request for assistance (e.g., an emergency alert). The recipient varies depending on the type of request. In some embodiments, a recipient is an emergency service. In some embodiments, a recipient is an emergency service when the request for assistance pertains to an emergency (e.g., a tier 2 emergency). In some embodiments, a recipient is an emergency dispatch center (e.g., PSAP). In some embodiments, a recipient is an emergency dispatch center, wherein the request is first routed through an emergency management system (e.g., request is sent to the EMS, but ultimately is sent to an EDC). In some embodiments, a recipient is a first responder (e.g., a communication device of a first responder). In some embodiments, a recipient is an associated device of a user or an account associated with the user. In some embodiments, a recipient is a non-emergency service or personnel, for example, a relative or friend. In such situations, a user of a communication device (or member device or second device) may not require emergency assistance, but does need help.

As referenced herein, an "emergency session" or "emergency call" refers to a communication session between a user and an emergency service (e.g., EDC, PSAP, emergency response personnel, etc.). In some embodiments, the communication session is a digital or analog phone call. In some embodiments, the communication session is a message such as an exchange of internet messages, text messages, or data messages, including SMS. In some embodiments, multimedia is exchanged during the communication session such as sound, image, or video files. In some embodiments, the communication is a data stream (e.g., video feed).

As referenced herein, "emergency communication" refers to a communication regarding the emergency. In some embodiments, the communication is a phone call, a message, a data stream, or any combination thereof. In some embodiments, the communication comprises a phone call, a message, a data stream, or any combination thereof.=

As referenced herein, "municipalities" and "counties" refer to a local government or an administrative division of a state that will be responsible for providing dispatchers, first responders, or emergency response personnel during emergency situations. A "county" refers to a political and administrative division of a state in both urban and rural areas. In contrast, a "municipality" refers to a town or district that has local government particularly in population centers including incorporated cities, towns, villages and other types of municipalities. Depending on the location, emergency response for different types of emergencies may be provided by either the municipality or the county administration.

As referenced herein, a "geofence" is a virtual perimeter for a real-world geographic area. A geofence could be dynamically generated—as in a radius around a point location, or a geofence can be a predefined set of boundaries (such as school zones or neighborhood boundaries). The use of a geofence is called geofencing, and one example of usage involves a location-aware device of a location-based service (LBS) user entering or exiting a geofence. Entry or exit from a geofence could trigger an alert to the device's user as well as messaging to the geofence operator. The geofence information, which could contain the location of the device, could be sent to a mobile telephone or an email account.

In the context of emergency services, one or more geofences may correspond to the authoritative region of an ESP. In many cases, the ESP is a public entity such as a public safety answering points ("PSAP), a PSS (e.g. a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats.

For emergency response, an emergency service provider (public or private entities) may be given jurisdictional authority to a certain geographical region or jurisdiction (also referred to as "authoritative jurisdiction"). However, in many cases, an ESP may have an area of administration not based on authority, but based on various factors such as capacity, resources, funding requirements, or practical limitations (also referred to as an "administration jurisdiction"). In some cases, an area or region is assigned to an ESP or responder for planning and resource allocation, although the ESP or responder may respond to emergencies outside the area (e.g., a police beat) (also referred to as an "assigned jurisdiction"). For example, the geofences 1106 may define assigned jurisdiction of police officers 1104a, 1104b and 1104c within the authoritative jurisdiction 1110 of a police station 1102.

As referenced herein, a public safety service (PSS) refers to a local, state, or federal government agency or institution that is responsible for providing safety, security, or medical services to members of the public. Examples of public safety services include fire departments, police departments, and hospitals. As used herein, public safety services do not refer to emergency dispatch centers, such as public safety answering points (PSAPs), as described below. Examples of PSS include a fire department, a police department, a hospital, an urgent care center, a national highway organization, a National Guard organization, a crisis management center, an emergency medical dispatcher and an emergency command center, etc.

As used herein, an emergency service provider (ESP) refers to any individual, agency, or institution (public or private) that provides emergency services. ESPs include, but are not limited to PSSs, as described above, emergency dispatch centers (e.g. PSAPs), private entities (e.g. tow truck operators/agencies, etc.). The ESP agency refers to the entity or organization, which typically has one or more administrators. In addition, the ESP may include one or more staff members. In some embodiments, emergency responders may be members of the ESP.

As referenced herein, "emergency service providers" (ESPs) may include organizations and institutions that may provide assistance in an emergency. For example, law enforcement, fire, emergency medical services commonly handle many emergency requests. In addition, specialized services may also be included, such as Coast Guard, Emergency management, HAZ-MAT, Emergency roadside assistance, animal control, poison control, social services, etc. Emergency service providers, emergency response personnel, emergency dispatch center, and public safety access points may be used to refer to the organizations, systems, and/or personnel that provide emergency response services and/or coordination of such services.

As referenced herein, a public safety answering point (PSAP) refers to a call center responsible for answering calls to an emergency telephone number for police, firefighting, and ambulance services. Trained telephone operators (also referred to as call-takers) are also usually responsible for dispatching these emergency services. The Federal Communications Commission (FCC) of the United States government maintains a PSAP registry. The registry lists PSAPs by an FCC assigned identification number, PSAP Name, State, County, City, and provides information on any type of record change and the reason for updating the record. The FCC updates the registry periodically as it receives additional information.

As used herein, a "911 authority" refers entities or organizations that have been given authority by the government to service 911 or emergency calls within a specific area (the "authoritative region"). Examples of 911 authorities include PSAPs and various types of PSS such as regional agencies and emergency command centers.

As referenced herein, an "emergency responder" refers to any person or persons responsible for addressing an emergency situation. A first responder is a specific type of emergency responder. In some embodiments, a first responder refers to government personnel responsible for addressing an emergency situation. In some embodiments, an emergency responder is responsible for a particular jurisdiction (e.g., a municipality, a township, a county, etc.), also referred to as its authoritative jurisdiction. A geospatial representation of an authoritative jurisdiction is referred to as a "geofence." In some embodiments, an emergency responder is assigned to an emergency by an emergency dispatch center (hereinafter, "EDC") or an emergency service provider (ESP), such as a PSS or a PSAP. In some embodiments, an emergency responder responds to a request for emergency assistance placed by a user via a communication device. In some embodiments, an emergency responder includes one or more firefighters, police officers, emergency medical personnel, community volunteers, private security, security personnel at a university, or other persons employed to protect and serve the public and/or certain subsets of the population.

As referenced herein, an "accuracy requirement" refers to a rule, condition, or metric that a location is required to satisfy in order to meet the accuracy requirement. In some embodiments, an accuracy requirement comprises a requirement that the one or more attributes associated with an emergency communication do not match a flagged characteristic. In some embodiments, an accuracy requirement comprises a requirement that the reported location satisfies an accuracy metric threshold. In some embodiments, an accuracy metric threshold comprises a confidence interval for a location being within a threshold. For example, the confidence interval can be a 95% confidence interval that the actual location is estimated or predicted to be within a certain proximity or threshold of the reported location. In some embodiments, the proximity or threshold is about 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 250, 300, 350, 400, 450, or 500 meters of the reported location. In some embodiments, the location is an address. In some embodiments, an accuracy requirement comprises a rule that a location automatically satisfies or fails the requirement. For example, an accuracy requirement may indicate that all smartphones on a particular cell carrier network within a particular geographic region (e.g., a specific county, or a region of the carrier network, or location is obtained through a particular cell tower(s)) automatically fail the requirement. Such rules can be based on information indicative of location accuracy such as, for example, ground truth data or experimentation indicating that certain attributes or combinations of attributes result in a high likelihood of inaccurate location.

As referenced herein, an "Emergency Management System" ("EMS") refers to a system that receives and processes emergency alerts from subjects and forwards them to the EDC. Various embodiments of the EMS are described in U.S. patent application Ser. No. 14/856,818, and incorporated herein by reference. The "Emergency Dispatch Center" ("EDC") refers to the entity that receives the emergency alert and coordinates the emergency assistance. In some embodiments, the EDC is a public organization run by the municipality, county, or city, or alternatively, is a private organization. In some embodiments, emergency assistance (e.g., emergency response personnel and/or resources) is provided is in the form of medical, caregiver(s), firefighting, police, military, paramilitary, border patrol, lifeguard, security services, or any combination thereof. In some embodiments, an EDC is a public safety answering point ("PSAP"). Generally, the EDC and EMS are distinct entities. In some embodiments, the EDC comprises an EMS integrated into the EDC.

As used herein, a "device" is a digital processing device configured to perform one or more tasks. In some embodiments, a device is a communication device comprising one or more communication components for sending and receiving information over one or more communication channels.

As used herein, a "communication device" refers to a communication device with a communication component, which allows for the sending and receiving of information over a wireless channel, a wired channel, or any combination thereof (e.g., sending/receiving information over the Internet). In some embodiments, the communication device is a mobile phone (e.g., a smart phone) capable of making a phone call via a cellular network such as an emergency call (e.g., a 9-1-1 call) or a test emergency call (e.g., a simulated emergency call to a test number). Other communication devices include a laptop, a desktop, a tablet, a radio (e.g., a two-way radio), and a vehicular communication system. In some embodiments, a communication device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, a communication device is an Internet of Things (IoT) device. In some embodiments, the communication device is a sensor for sensing environmental or health indicators. In some embodiments, the sensor may include a sensing component and a communication component. In some embodiments, the communication device is a sensor in a sensor network or a device that controls a sensor network.

In some embodiments, a communication device is a wearable device (e.g., a communication device worn by a user). In some embodiments, a wearable device comprises one or more sensors.

As used herein, a "mobile wireless device" refers to a device that is portable and communicates wirelessly. In some embodiments, a user wears or carries the mobile wireless device on the user's person or in the user's vehicle. Examples of mobile wireless devices include mobile or cellular phones, and wearable devices (e.g., smart watch, fitness tracker, wearable sensor, smart glasses, etc.).

As used herein, an "associated device" refers to a communication device that is associated with the triggering device. For example, a user may be using several communication devices such as a mobile phone, a wearable, a home security system, a car computer. The user may have registered these devices with his or her account and linked these devices with a user name, user number(s), email address(es), home or other physical address(es). In some embodiments, associated devices may include communication devices of a second user who is associated with user, e.g., a husband and wife, a father and son, a patient and doctor, friends, work colleagues, etc. In some cases, the user may have added the second user as an emergency contact, a member of a group, etc. In some cases, user may have agreed to share location and other data with the second user. In some embodiments, the second user may be someone who is frequently contacted by the user and the communication device identifies the second user from the "Recently called" or "Frequently called" list. In some embodiments, the associated devices may be devices that are proximal or near-by to the triggering device such as obtained through a Wi-Fi scan. In some embodiments, an associated device is proximal to the triggering device when the location of the associated device is within 1, 5, 10, 15, 20, 25, 30, 35, 40, 45, 50, 60, 70, 80, 90, 100, 200, 300, 400, or 500 meters of the location of the triggering device, including increments therein.

As used herein, an "emergency alert" refers to a communication relating to an emergency or a potential emergency. As used herein, an emergency alert is "associated" with a device or user when the emergency alert relates to an emergency or potential emergency involving the device or user. In some embodiments, an emergency alert comprises data associated with a device (or user thereof). In some embodiments, an emergency alert comprises data associated with an electronic device sending the alert or another device. For example, in some embodiments, an emergency alert comprises data associated with a device, wherein the data set comprises current and/or past location data. In another example, the data set comprises current and/or past health data associated with the user of an electronic device. In other embodiments, an emergency alert is sent and/or received separately from data associated with a device. For example, in some embodiments, an alert is sent first, and the recipient subsequently queries the device that sent the alert for data associated with the emergency and/or device or user involved in the emergency as part of an emergency flow script.

As used herein, an "emergency request" refers to a request or message sent to a recipient asking for help. In some embodiments, a request for assistance is an emergency request for assistance (e.g., the request is associated with an emergency situation) such as, for example, an emergency alert. In some embodiments, an emergency alert comprises a request for assistance. In some embodiments, a request for assistance is associated with an emergency situation. In some embodiments, a request for assistance comprises an emergency indication. In further embodiments, an emergency indication is selected from one or more of the group consisting of traffic accident, police emergency, medical emergency, and fire emergency.

In some embodiments, a request for assistance is associated with a non-emergency situation (e.g., request for a tow truck after car breaks down). In some embodiments, a request for assistance is associated with a device sending the request. In other embodiments, a request for assistance is associated with a device not sending the request (e.g., a proxy request on behalf of a second device and/or a member device in a group of devices). As used herein, a request is "associated" with a device or user when the request relates to an emergency or non-emergency situation involving the device or user. In some embodiments, a request comprises data associated with a device (or user thereof). In some embodiments, a request comprises a data set associated with a device. For example, in some embodiments, a request comprises a data set associated with a device, wherein the data set comprises current location data, phone number, device type, device ID, device manufacturer, cellular carrier, etc. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency. In some embodiments, the data is transferred through an alternate channel as the emergency request (which may be initiation of an emergency call). For example, an emergency call may be established using a cellular connection, while the location data from the device may be sent via an alternate channel via an EMS.

As used herein, a "user" refers to one or more person or persons associated with a device (e.g., communication device, device of a first responder, etc.). In some embodiments, a user utilizes a device to place an emergency call. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, "administrator" or "admin" refers to a person or entity that administers and manages the ELAS system. In some embodiments, the admin inputs accuracy thresholds and other parameters. In some embodiments, the admin does model tuning for machine-learning algorithms.

As used herein, "communication link" refers to a communication pathway from a device (e.g., communication device) to another device or to an intermediate device (e.g., a router) on a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). A communication link refers to the point-to-point communication channels, point-to-point and end-to-end data sessions, and the physical hardware facilitating the communication channel(s) (e.g., antennas used to communicate/transmit information). In some embodiments, a data session comprises session parameters and the network route taken from one device to another device.

As referenced herein, "geographic location,", "location," all refer to a geographic point or area. In some embodiments, a location is an exact latitudinal and longitudinal coordinate or an area encompassing, for example, a city block, a neighborhood, a city, a county, a stretch of highway, a park, a recreation area, a sports stadium, a convention center, an area block (e.g., a 1×1 square mile area block), or other area. In some embodiments, a location refers to a physical address (e.g., a dispatchable address).

As referenced herein, "data" refers to electronic information. In some embodiments, data is emergency data (e.g., data relating to one or more emergencies or emergency communications). In some embodiments, data is divided into current and historical data. In some embodiments, current data refers to relatively recent data (e.g., within the past 15 minutes), while historical data refers to relatively old data (e.g., older than 15 minutes). In some embodiments, current data comprises real-time and near real-time data.

As referenced herein, "data stream" refers to incoming data being sent and/or received. In some embodiments, a data stream comprises current emergency data. In some embodiments, a data stream refers to incoming emergency communications/data.

As used herein, "variable" refers to a parameter used within a model. For example, a linear regression model having a formula $Y=C_0+C_1 x_1+C_2 x_2$ has two predictor variables or parameters, x1 and x2, and coefficients for each parameter, $C_1$ and $C_2$ respectively. The predicted variable in this example is Y. In some embodiments, values are entered for each predictor variable or parameter in a model to generate a result for the dependent or predicted variable (e.g., Y). As used herein, "average" refers to a statistical measure of a plurality of values. In some embodiments, an average is mean, median, or mode.

As referenced herein, an "attribute" refers to any quantitative or qualitative value associated with a phone call or a communication device used to execute a phone call. In some embodiments, attributes may be considered as metadata. Example attributes include, but are not limited to: manufacturer and model of a communication device, network carrier information, time of a phone call, geographical area, zone or population density, outdoor or indoor location, device battery level, type of connection, source of location, reported location accuracy, reported location confidence, operating system of a communication device, an identifier of a communication device, accelerometer speed, power saving status, or Wi-Fi status of a communication device. As referenced herein, a "characteristic" refers to an attribute, a combination of attributes, or a manipulation of attributes or values associated with attributes.

As referenced herein, an "accuracy threshold" or a "location accuracy threshold" is a value that a location accuracy metric can be measured against. In some embodiments, a reported location is converted to a validated location if a location accuracy metric determined for the reported location meets or exceeds an accuracy threshold. In some embodiments, an accuracy threshold is generated by an emergency location analysis system. In some embodiments, an accuracy threshold is manually set by an administrator of an emergency location analysis system. For example, in an embodiment wherein location accuracy metrics are expressed in meters, an accuracy threshold may likewise be expressed in meters (e.g., 35 m). A location accuracy metric for a reported location meets or exceeds the accuracy threshold when the location accuracy metric is less than the accuracy threshold (e.g., the reported location is equally or more accurate than the accuracy threshold requires).

As referenced herein, a "flagged attribute" is an attribute that an emergency location analysis system has determined produces inaccurate locations. As referenced herein, a "flagged characteristic" is an attribute, combination of attributes, or manipulation of attributes or values associated with attributes that an emergency location analysis system has determined produces inaccurate locations. For example, in some embodiments, if an emergency location analysis system receives a reported location with an associated attribute that the emergency location analysis system has previously identified as a flagged attribute or flagged characteristic, the emergency location analysis system does not convert the reported location into a validated location. In some embodiments, one or more flagged characteristics include an accuracy threshold. For example, in some embodiments, when an emergency location analysis system receives a reported location associated with one or more attributes, the emergency location analysis system can determine a location accuracy metric for the one or more attributes and compare the location accuracy metric to the accuracy threshold included in the one or more flagged characteristics. In this example, if the location accuracy metric does not meet or exceed the location accuracy threshold, the emergency location analysis system does not convert the reported location into a validated location.

As used herein, "location accuracy metric" refers to a measure for quantifying the accuracy of a location as compared to a ground-truth or actual location. In some embodiments, the location accuracy metric is a distance (e.g., a distance from ground-truth). In some embodiments, the location accuracy metric is expressed in meters. In some embodiments, the location accuracy metric is a likelihood or probability. In some embodiments, the location accuracy metric is a confidence.

As referenced herein "a test device" refers to a device or an assembly of devices that can be used for making test emergency calls. Typically, the test device is paired with a locationing device for obtaining ground truth location for the test device.

In some embodiments, the ground-truth location is obtained using a locationing device (e.g., a GPS device in an outdoor setting). In some embodiments, the ground-truth location is obtained using a locationing method (e.g., a call made from a pre-surveyed building).

For example, a reported location may be received from a device (directly or via a third-party server) in addition to other data and associated metadata. Data regarding various attributes associated with an emergency alert received from the device is collected and a location accuracy metric is calculated using various techniques (e.g., statistical methods or a machine-learning algorithm). In some embodiments, statistical tools/methods (e.g., linear regression) are used for generating a prediction model. In some embodiments, the prediction model is generated using a machine-learning algorithm. A prediction model can be a formula comprising parameters that determine the likely location of the emergency. For example, a prediction model can be a multiple linear regression model or a formula that generates a distance from ground truth based on attribute(s) (e.g., device model, cell carrier, type of location, source of device-based location) of an incoming emergency call. The attributes may be entered into the model. A prediction model can be a classifier or trained algorithm generated by the application of a machine learning algorithm to a data set comprising location data.

As used herein, "feedback about location" refers to feedback from the EDC (e.g., PSAP) or ESPs that are assigned to respond to the emergency request. In some embodiments, the feedback about location may be inputted into the ELAS for validation, improvement and/or prediction. In some embodiments, the feedback about location is used for identifying problematic attributes and features. In some embodiments, the feedback about location may be analyzed and converted into data that may be inputted in the machine-learning algorithm. For example, a PSAP dispatcher may give feedback that a location was "bad" and that information could be used to identify an emergency request that should be "held" for training the algorithm, even when the ground-truth location is not known.

EXAMPLES

The following illustrative examples are representative of embodiments of the invention described herein and are not meant to be limiting in any way.

Just In Time, an emergency response company, aids emergency personnel (such as public safety answering points (PSAPs) and first responders) by generating accurate locations from mobile devices during emergencies and delivering them directly to the emergency personnel. Traditionally, PSAPs are only technologically capable of receiving telephone calls with no additional data. Thus, when an emergency call is made to a PSAP from a mobile phone (with a dynamic and uncertain location), PSAP operators must speak directly to a person implicated in an emergency to determine the person's location. Unfortunately, many people implicated in emergencies are unable to articulate their location or don't even know it—and even if they do, the time spent articulating their location to the PSAP operator can often be the difference between life and death. Just In Time knows just how critical it is to quickly and accurately provide locations during emergencies to emergency personnel.

Just In Time's technology generates locations from mobile devices using combinations of a number of different location technology sources included in the mobile devices, such as GPS, Wi-Fi, and Bluetooth. However, not all mobile devices are the same, and not all mobile devices are created equal. Neither are all cellular network carriers, cellular towers, location technology sources, etc. To understand these differences, Just In Time travels around the country testing various mobile devices on various network carriers at various locations to create an emergency test call database. At each location, Just In Time dials an emergency call number (e.g., 9-1-1) or a functional equivalent (e.g., a particular network carrier's unique imitation emergency call number) on each of the various mobile devices. During each emergency call, at least two locations are recorded—one location generated from the mobile device that placed the call, and a "ground-truth" location (e.g., a high fidelity, "true" location from which the emergency call was placed) from a GPS device coupled to the mobile device. The location generated from the mobile device during the emergency call and the ground-truth location can be compared to determine a location accuracy (e.g., how close the location generated from the mobile device is to the true location from which the emergency call was placed). For each emergency call, the at least two locations, all of the attributes of the mobile device (e.g., make, model, network carrier, location technology source, etc.), and other data pertaining to the emergency call (e.g., the number dialed, the length of the call, day and time, etc.) are stored together in an entry in the emergency test call database.

Just In Time also develops a real-time location engine (e.g., a system of network servers, databases, programs, and software) to analyze the emergency test call database through various algorithmic techniques, such as machine learning and neural networks. The real-time location engine analyzes the emergency test call database and determines which circumstances (e.g., combinations of mobile device model, network carrier, location, location technology source, etc.) produce the most accurate—and least accurate—locations during emergency calls. Using this information, Just In Time can preemptively (or in real-time during a live emergency call) determine whether or not a location generated from a mobile device during an emergency call is accurate enough to be delivered to a PSAP, for whom an accurate location is of critical importance.

Example 1

In one instance, Jacob is in the backyard of his ranch style house in rural Virginia tilling his yard when he has a stroke. Petrified, Jacob reaches into his pocket and pulls out his cell phone—a Samsung Galaxy S8 running on the Verizon wireless network with Just In Time's location technology installed on the phone—and calls 9-1-1. Just In Time's location technology automatically identifies that Jacob has placed an emergency call to 9-1-1, indicating that he is in need of help, and generates a device-based hybrid location for the current location of cell phone. Although the coverage of the Verizon wireless network in Jacob's rural town is not the strongest, Jacob and his phone are outside, giving the GPS unit within Jacob's phone a clear line of sight to a satellite, and still within range of the Wi-Fi network set up in Jacob's home. The device-based hybrid location is sent to Just In Time's emergency management system, along with a list of attributes of Jacob's Samsung Galaxy S7, wireless carrier, and more.

Just In Time's emergency management system transfers the device-based hybrid location and attributes to Just In Time's real-time location engine, which instantly begins analyzing the location and attributes in reference to the emergency test call database. The real-time location engine identifies each entry in the emergency test call database that includes any one of the attributes associated with Jacob's emergency call—Samsung, Galaxy S7, Verizon, the location technology source (GPS, Wi-Fi), etc.—and determines the location accuracy of each of the entries. The real-time location engine analyzes this data, cross-references the data with all previous analysis of the emergency test call database, performs more statistical analyses, and determines the probability (e.g., location accuracy probability) that the device-based hybrid location generated from Jacob's phone is accurate enough to dispatch an emergency responder to. In this case, the real-time location engine determines that the device-based hybrid location received from Jacob's phone has a >99% chance of being within 50 meters of Jacob's true location and a 95% chance of being within 25 meters of Jacob's true location, easily surpassing the accuracy threshold for emergency dispatching.

A 9-1-1 operator at a PSAP answers Jacob's emergency call and asks what the nature of Jacob's emergency is. Unfortunately, due to the stroke, Jacob's speech is impaired, but he barely manages to utter "stroke" amidst a string of other inaudible words. The 9-1-1 operator understands that Jacob is suffering from a stroke and asks Jacob for his address. However, Jacob is unable to effectively articulate his address. Fortunately, the PSAP has already requested a location for Jacob from Just In Time. By the time the 9-1-1 operator makes the decision to dispatch an ambulance for Jacob, Just In Time's real-time location engine has already received a location from Jacob's cell phone and determined that the location is more than suitable for emergency dispatching. Relieved, the 9-1-1 operator dispatches an ambulance to Jacob's location and the ambulance arrives as soon as possible.

Example 2

In another instance, Nancy is walking home alone at 3 AM after a fun night out with her friends in Manhattan, N.Y. Halfway home, she begins to feel as though she is being followed. Moments later, she hears footsteps quickening behind her. Nancy turns to look behind her and sees a man she does not know but recognizes from the club she and her friends just left accompanied by two other men and quickly approaching her. When the men realize that Nancy has noticed them, they begin to chase after her. Nancy takes her cell phone—an old Apple iPhone 6 running on the AT&T wireless network with Just In Time's mobile app downloaded—out of her purse and begins to run while calling 9-1-1.

In this case, when Nancy calls 9-1-1, Just In Time's emergency management system receives an SMS text generated by the Just In Time mobile app including a device-based hybrid location generated from Nancy's cell phone and a list of attributes of Nancy's phone and her emergency call. The emergency management system identifies that Nancy's phone is an Apple iPhone 6 running on AT&T's cellular network, and that the location technology source of the device-based hybrid location generated from Nancy's phone is the GPS unit built into the phone. Because the phone is an older model, the Apple iPhone 6, the GPS unit is significantly weaker than the state of the art. Additionally, Nancy is in the heart of Manhattan, surrounded by skyscrapers that impede a clear line of sight between satellites and Nancy's phone. The emergency management system then transfers all of this information to Just In Time's real-time location engine. The real-time location engine identifies each entry in the emergency test call database that includes any one of the attributes associated with Nancy's emergency call—Apple, iPhone 6, AT&T, the location technology source (GPS), etc.—and determines the location accuracy of each of the entries. The real-time location engine analyzes this data, cross-references the data with all previous analysis of the emergency test call database, performs more statistical analyses, and determines the probability that the device-based hybrid location generated from Nancy's phone is accurate enough to dispatch an emergency responder to. In this case, the real-time location engine determines that there is a <60% chance that the device-based hybrid location generated from Nancy's phone is within 50 meters of her true location. Thus, the location fails to meet the required location accuracy for dispatching.

A 9-1-1 operator at a PSAP answers Nancy's emergency call and asks Nancy what the nature of her emergency is. Running and out of breath, Nancy frantically tells the operator that she is being chased by a group of men that she does not know. The operator quickly asks Nancy for her location while concurrently sending a location request to Just In Time for Nancy's location. Unfortunately, Nancy trips on an uneven sidewalk and tumbles to the ground, dropping her phone before she can tell the operator where she is. With her assailants bearing down on her, Nancy gets up and continues to run, leaving her phone behind.

Dismayed, the 9-1-1 operator looks for a location for Nancy from Just In Time, but is notified from Just In Time that there is no location accurate enough for dispatching, but there is a Just In Time Advanced Location available. Nancy had previously provided her home address through the Just In Time mobile app downloaded on her phone. Although the device-based hybrid location generated by her phone was potentially inaccurate, the reported location was within a 500-meter radius of her home address. To generate an improved or "advanced" location, Just In Time's emergency management system snaps Nancy's device-based hybrid location to her home address. The 9-1-1 operator selects to receive the Advanced Location (Nancy's home address) and dispatches a policeman to the location. Moments later, Nancy reaches her apartment building and attempts to her open her door before the group of men can catch her. Just before the men reach her, a police car arrives on the scene, and the men flee.

Example 3

In a third instance, Rebecca is walking her dog, Charlie, through the woods in Rock Creek Park in Washington, D.C. Rebecca is scrolling through Instagram on her phone, a Samsung Galaxy S8 running on the T-Mobile wireless network, when Charlie takes off after a squirrel. Caught by surprise, Rebecca is jerked by Charlie's leash and badly twists her ankle over a tree root. She falls to the ground and is in too much pain to get up, so she dials 9-1-1 on her phone, which has Just In Time's location technology pre-installed. Upon dialing 9-1-1, a device-based hybrid location is generated from Rebecca's phone and sent to Just In Time's emergency management system, along with a list of attributes of Rebecca's Samsung Galaxy S8, wireless carrier, and more.

Just In Time's emergency management system transfers the device-based hybrid location to Just In Time's real-time location engine, which instantly begins analyzing the location and attributes in reference to the emergency call database. The real-time location engine identifies each entry in the emergency test database that includes any one of the attributes associated with Rebecca's emergency call—Samsung, Galaxy S8, T-Mobile, the location technology source, etc.—and determines the location accuracy of each of the entries. The real-time location engine analyzes this data, cross-references the data with all previous analysis of the emergency test call database, performs more statistical analyses, and determines the probability that the device-based hybrid location generated from Rebecca's phone is accurate enough to dispatch an emergency responder to. In this case, during previous analyses, the real-time location engine has determined that Samsung Galaxy S8 phones running on the T-Mobile wireless network without Wi-Fi connections (in the case of Rebecca, there is no Wi-Fi access in Rock Creek Park) consistently generate inaccurate device-based hybrid locations. This may happen for any number of reasons—for example, when an emergency call is placed, the phone may enter into an emergency call mode in which the vast majority of the device's functions are disabled. Because Rebecca's emergency call matches these attributes—Samsung, Galaxy S8, T-Mobile, no Wi-Fi—the real-time location engine determines that the device-based hybrid location generated by Rebecca's phone fails to meet the required location accuracy for dispatching.

A 9-1-1 operator at a PSAP answers Rebecca's emergency call and asks Rebecca what the nature of her emergency is. Rebecca tells the operator that she has severely injured her ankle in Rock Creek Park and is unable to walk. The operator asks Rebecca for her location; however, Rebecca and Charlie had been wandering around in Rock Creek Park and she had lost track of their exact location. The operator then checks for a location for Rebecca from Just In Time, but is notified from Just In Time that there is no location accurate enough for dispatching, but there is a Just In Time Advanced Location available. The PSAP operator selects to receive the Just In Time Advanced Location.

Just In Time has previously tested enough emergency calls using Samsung Galaxy S8 phones on the T-Mobile network without Wi-Fi access that the real-time location engine was able to determine a location improvement rule for the device-based hybrid locations generated under these circumstances—90% of the time, the ground truth locations for these calls were within 20 meters of a location 100 meters southeast of the device-based hybrid location. To generate an improved or "advanced" location for Rebecca, Just In Time's emergency management system translates the device-based hybrid location generated from Rebecca's phone 100 meters southeast and delivers the advanced location to the PSAP. The operator dispatches an ambulance to the advanced location, which finds Rebecca and Charlie waiting to be saved.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer-implemented method for improving location accuracy associated with a reported location by an emergency location analysis system, the method comprising:

identifying a reported location and one or more attributes associated with an emergency alert, wherein the reported location is a device-based hybrid location generated by an electronic device that initiated the emergency alert;

applying a location improvement rule to the reported location based on the one or more attributes associated with the emergency alert to generate an improved location, wherein applying the location improvement rule comprises:

calculating a distance between the reported location and a user-defined location, wherein the user-defined location is submitted through the electronic device by a user of the electronic device;

comparing the distance to a proximity threshold; and in response to the distance meeting the proximity threshold, generating the improved location by snapping the reported location to the user-defined location; and providing the improved location to one or more recipients comprising a public safety answering point (PSAP).

2. The method of claim 1, further comprising providing the reported location in addition to the improved location to the one or more recipients including the PSAP.

3. The method of claim 1, wherein the user-defined location is a work or home address.

4. The method of claim 1, wherein the emergency alert is associated with an emergency call.

5. The method of claim 1, further comprising receiving a location request from the PSAP and providing the improved location to the one or more recipients including the PSAP in response to receiving the location request from the PSAP.

6. The method of claim 1, further comprising delivering an indication to the PSAP that the improved location is distinct from the reported location.

7. An emergency location analysis system for improving location accuracy associated with a reported location, comprising:
   a network server comprising at least one processor configured to:
      identify a reported location and one or more attributes associated with an emergency alert, wherein the reported location is a device-based hybrid location generated by an electronic device that initiated the emergency alert;
      apply a location improvement rule to the reported location based on the one or more attributes associated with the emergency alert to generate an improved location, wherein applying the location improvement rule comprises:
         calculating a distance between the reported location and a user-defined location, wherein the user-defined location is submitted through the electronic device by a user of the electronic device;
         comparing the distance to a proximity threshold; and
         in response to the distance meeting the proximity threshold, generating the improved location by snapping the reported location to the user-defined location; and
      provide the improved location to one or more recipients comprising a public safety answering point (PSAP).

8. The system of claim 7, wherein the at least one processor is further configured to provide the reported location in addition to the improved location to the one or more recipients including the PSAP.

9. The system of claim 7, wherein the user-defined location is a work or home address.

10. The system of claim 7, wherein the emergency alert is associated with an emergency call.

11. The system of claim 7, wherein the at least one processor is further configured to receive a location request from the PSAP and provide the improved location to the one or more recipients including the PSAP in response to receiving the location request from the PSAP.

12. The system of claim 7, wherein the at least one processor is further configured to deliver an indication to the PSAP that the improved location is distinct from the reported location.

* * * * *